(12) United States Patent
Mori et al.

(10) Patent No.: US 7,782,747 B2
(45) Date of Patent: Aug. 24, 2010

(54) OPTICAL INFORMATION RECORDING MEDIUM INCLUDING SUPER RESOLUTION REPRODUCING FILM, METHOD FOR REPRODUCING OPTICAL INFORMATION RECORDING MEDIUM, AND OPTICAL INFORMATION PROCESSING APPARATUS USING OPTICAL INFORMATION RECORDING MEDIUM

(75) Inventors: Go Mori, Nara (JP); Hideharu Tajima, Ikoma-gun (JP); Nobuyuki Takamori, Kitakatsuragi-gun (JP); Masaki Yamamoto, Nara (JP); Yasuhiro Harada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1209 days.

(21) Appl. No.: 11/367,637

(22) Filed: Mar. 3, 2006

(65) Prior Publication Data

US 2006/0203696 A1    Sep. 14, 2006

(30) Foreign Application Priority Data

Mar. 3, 2005  (JP) .............................. 2005-059698
Feb. 22, 2006  (JP) .............................. 2006-045848

(51) Int. Cl.
    *G11B 3/70*    (2006.01)
(52) U.S. Cl. ..................... 369/284; 369/288; 428/64.4
(58) Field of Classification Search ............... None
    See application file for complete search history.

(56) References Cited

U.S. PATENT DOCUMENTS 5,304,440 A * 4/1994 Ono et al.
6,961,300 B2 * 11/2005 Cheong et al. .......... 369/275.1
2004/0032822 A1 * 2/2004 Tsai et al.
2004/0247815 A1 * 12/2004 Takamori et al. ........ 428/64.4
2004/0264355 A1 * 12/2004 Takamori et al. ........ 369/275.2
2005/0213487 A1 * 9/2005 Yamamoto et al. ......... 369/288

FOREIGN PATENT DOCUMENTS

WO    WO2002-058060 A1 *    5/2004

OTHER PUBLICATIONS

U.S. Appl. No. 11/197,661, filed Aug. 3, 2005.*

* cited by examiner

*Primary Examiner*—Paul Huber
(74) *Attorney, Agent, or Firm*—Edwards Angell Palmer & Dodge LLP; David G. Conlin; David A. Tucker

(57) ABSTRACT

In order to realize (A) an optical information recording medium in which information is stored in high density and can be precisely and securely reproduced, (B) a method for reproducing the optical information recording medium, and (C) an optical information processing apparatus using the optical information recording medium, an optical information recording medium 1, 2, or 3 of the present invention includes: (a) a substrate 12, having pits and/or grooves, each of which is made up of a rise and a recess, and each of which corresponds to recorded information that is optically reproduced by irradiation of a light beam; and (b) at lease one super resolution reproducing film 13, which has an optical property to be changed in response to a temperature increase caused by the irradiation of the light beam, the optical property of the super resolution reproducing film being reversibly changed depending on a temperature change in the super resolution reproducing film. The optical information recording medium 3 of the present invention further includes a recording layer.

30 Claims, 15 Drawing Sheets

OPTICAL ABSORPTION EDGE WAVELENGTH: 375nm
WAVELENGTH OF REPRODUCTION BEAM: 408nm

OPTICAL ABSORPTION EDGE WAVELENGTH: 375nm
WAVELENGTH OF REPRODUCTION BEAM: 408nm

RESOLUTION LIMIT OF OPTICAL SYSTEM: 0.16 μm

RESOLUTION LIMIT OF OPTICAL SYSTEM: 0.16 μm

OPTICAL ABSORPTION EDGE WAVELENGTH: 375nm
WAVELENGTH OF REPRODUCTION BEAM: 408nm

OPTICAL INFORMATION RECORDING MEDIUM INCLUDING SUPER RESOLUTION REPRODUCING FILM, METHOD FOR REPRODUCING OPTICAL INFORMATION RECORDING MEDIUM, AND OPTICAL INFORMATION PROCESSING APPARATUS USING OPTICAL INFORMATION RECORDING MEDIUM

This Nonprovisional application claims priority under 35 U.S.C. §119(a) on patent application Ser. No. 2005/59698 filed in Japan on Mar. 3, 2005, and patent application Ser. No. 2006/45848 filed in Japan on Feb. 22, 2006, the entire contents of which are hereby incorporated by reference.

FIELD OF THE INVENTION

The present invention relates to an optical information recording medium, a method for reproducing the optical information recording medium, and an optical information processing apparatus using the optical information recording medium. More specifically, the present invention relates to, e.g., (i) an optical information recording medium from which information is either optically reproduced or optically recorded by way of a light beam such as a laser beam, and whose recording density is improved by providing a layer whose optical property changes depending on temperature; (ii) a method for reproducing the optical information recording medium; and (iii) an optical information processing apparatus.

BACKGROUND OF THE INVENTION

In conjunction with the development of digitalization in the information society, a demand has arisen for a writable medium that allows high density recording/reproduction.

In light of this a writable optical information recording mediums having various medium structures for improving recording capacities; and methods for realizing the high density recording/reproduction have been proposed. See the following examples (I) through (IV) of such methods:

(I) A method of shortening the wavelength of laser light for use in the recording/reproduction.

(II) A method of increasing NA (Numerical Aperture) of an objective lens for collecting light on an optical information recording medium.

(III) A method of providing a plurality of recording layers in an optical information recording medium.

(IV) A method of practically reducing a light spot diameter of laser light by forming, in an optical information recording medium, a mask layer (also referred to as "light shutter layer") for shielding a part of the light.

Now, consider the proposed conventional method (IV) of the methods of arranging the medium. The method (IV) is such a method that: the part of the light is shielded so that the size of an aperture is practically reduced, with the result that resolution is improved. However, this causes decrease of intensity of a signal generated from a fine recording pit, with the result that influence of noise becomes great.

In light of this, the following methods (V) and (VI) are proposed in view of the method (IV):

(V) A method of providing a super resolution film using a nonlinear optical property for the sake of attaining a super resolution reproducing effect.

(VI) A method of providing a mask layer for improving the resolution by using a near field light, which is generated by causing localized plasmon diffusion by means of light irradiation and which has a wavelength shorter than that of the propagated light.

Each of the methods is not a mere method of shielding the part of the light so that the size of the aperture is practically reduced as described above, but is a method of using the light. Specifically, in the methods, the property of the light and the property of the film are changed so that a new effect is obtained. For this reason, the method (IV) can be labeled as an "aperture type method", whereas each of the methods (V) and (VI) can be labeled as a "non-aperture type method".

Conventionally, such an aperture type method as the method (IV) has been proposed. However, the non-aperture type methods such as the methods (V) and (VI) have been actively proposed recently for the purpose of attaining a better effect. Examples of the methods (IV), (V), and (VI) are respectively described in Patent document 1, Patent document 2, and Patent document 3.

Disclosed in Patent document 1 (Japanese Unexamined Patent Publication Tokukaihei 05-89511/1993 (published on Apr. 9, 1993)) is a super resolution reproducing method. The super resolution reproducing method employs a transparent substrate on which pits and a phase change material layer are formed. The phase change material layer can be crystallized after being melted. When light (readout light) for use in readout is irradiated to the phase change material layer, the phase change material layer is partially melted in the spot of the readout light, with the result that the phase change material layer is brought into a liquid phase. Accordingly, reflectance for the readout light is changed. This allows for super resolution reproduction. After the readout is finished, the phase change material layer is brought back to the crystal phase.

On the other hand, Patent document 2 (WO2002/058060 (published on Jul. 25, 2002)) discloses an optical disk apparatus that uses an optical disk having a side (side to which laser light is irradiated from the objective lens) in which a super resolution film is formed under a protective layer formed under a recording layer storing information, and that uses reflectance change in the recording material of the optical disk so as to carry out information recording/reproduction. The super resolution film is made of a microcrystalline compound conductor, and has an absorption edge close to a wavelength of reproduction light emitted from a reproduction optical system of the optical disk apparatus. Further, by causing crystals in the super resolution film to be aligned in a specific manner, the super resolution film is brought to have the nonlinear optical property with respect to the reproduction light. This allows for the super resolution effect. The super resolution effect is also obtained when using a substrate including (i) rises and recesses each corresponding to recorded information, and (ii) a super resolution film similar to the above super resolution film. This is because the super resolution film is brought to have the nonlinear optical property with respect to the reproduction light, also in this case.

Further, Patent document 3 (Japanese Unexamined Patent Publication Tokukai 2004-14093/2004 (published on Jan. 15, 2004) discloses a read-only optical disk (playback-only optical disk; reproduction-only optical disk) using a zinc oxide nano thin film allowing for the near field effect.

However, each of the techniques disclosed in Patent documents 1 through 3 suffers from the following problems.

With respect to Patent document 1, a material such as the phase change material of which the mask layer (light shutter layer) is made exhibits the mask effect when being melted by increasing the temperature of the material to a certain temperature or greater. The material thus melted is highly flowable, so that the composition and the shape of the material are likely to be changed from those in its initial state. Therefore, the mask layer provided in the optical information recording medium exhibits the mask effect when being melted by increasing the temperature of the mask layer to the certain temperature or greater. However, as the optical information recording medium is recorded and/or reproduced over and over, the composition and the shape of the mask layer are so changed that the mask effect is gradually deteriorated. Specifically, substantially no mask effect is exhibited after recording and/or reproducing the optical information recording medium several thousand times. For this reason, the optical information recording medium described in Patent document 1 is insufficient in terms of durability, stability, and reliability.

Further, conventionally proposed as a material having a property similar to that of the phase change material described in Patent document 1 is a thermochromism material. The thermochromism material is a material whose transmittivity is changed in response to a chemical structure change caused by absorption of heat. Specific examples of such a thermochromism material whose transmittivity is changed in response to the temperature change include: (i) an organic thermochromism material obtained by adding alkali to lactone, fluorane, or the like; (ii) an organic thermochromism material obtained by adding an organic acid to leuco pigment or the like. For example, Japanese Unexamined Patent Publication Tokukaihei 05-12715/1993 exemplifies, as the thermochromism material, a material only consisting of organic materials.

However, the chemical structure of each of such organic materials is also changed by absorption of heat, so that the organic materials are defective in terms of thermal stability. Therefore, as the recording and/or reproduction are carried out over and over, the mask layer is so deteriorated that the mask effect is gradually deteriorated. Specifically, substantially no mask effect is exhibited after carrying out recording and/or reproduction several thousand times. In other words, such durability for the repeated recording/reproduction is unpractical. Thus, as is the case with Patent document 1, the optical information recording medium having such a mask layer is insufficient in terms of the durability, stability, and reliability.

As such, each of the materials exemplified above is defective in terms of the thermal stability, and does not have practical durability for the repeated recording/reproduction.

In the meanwhile, the super resolution film described in Patent document 2 uses the linear optical property of each of the group II-VI compound semiconductors (group II compounds: Zn and Cd; group VI compounds: S, Se, and Te), for attainment of the super resolution reproduction. However, the following general problems arise in adopting each of the above materials as the nonlinear optical material: (1) highly pure and large crystals are required; (2) it is difficult to carry out crystal uniformity control upon film formation; (3) acceptability is low in a crystal orientation angle or the like; (4) strong light intensity is required for the attainment of the nonlinear optical property; (5) optical damage resistance is low; and the like.

In Patent document 2, for attainment of a great nonlinear optical property, the film formation needs to be carried out in such a manner that the nonlinear optical material is dispersed in a glass matrix which serves as a grain boundary layer and which contains $SiO_2$ and the like. Further, grain diameters need to be controlled for attainment of a better nonlinear optical property.

However, for the formation of such a super resolution film made of the materials, a mixture target needs to be sputtered or several mixture targets need to be sputtered simultaneously.

Such a film forming method actually makes it difficult to solve the aforementioned problems. That is, the nonlinear optical material is thus mixed with the film forming materials, so that it is difficult to obtain highly pure and large crystals of the nonlinear optical material, or to secure uniformity of the crystals thereof. Moreover, the nonlinear optical material is deposited on the priming layer in which the materials of various types are mixed, so that the nonlinear optical material is influenced by the priming layer. This makes it difficult to obtain (i) stable growth of the crystals, and (ii) preferred crystal orientation. Moreover, the film forming method makes it difficult to carry out the grain diameter control.

Further, required for the attainment of the nonlinear optical property in the optical recording/reproduction of the optical information recording medium described in Patent document 2 is light whose light intensity is stronger than that of light currently used for the optical recording/reproduction. However, this optical information recording medium is weak in terms of the optical damage resistance, and therefore suffers from problems of reproduction stability and durability.

As described above, it is difficult to control the property of each material for use in the optical information recording medium described in Patent document 2. Moreover, the materials therefor are limited, so that freedom in medium designing is low. This is not practical.

In the meanwhile, the optical recording/reproduction of the optical disk disclosed in Patent document 3 uses the near field light whose light intensity is stronger than that of the light used in the normal optical recording/reproduction. In cases where irradiation of such light is carried out over and over for the recording/reproduction, the entire medium including the substrate and the thin film are likely to be deteriorated. Therefore, the optical disk suffers from problems in reproduction stability and durability. Further, the zinc oxide nano thin film needs to be sandwiched between light transmitting dielectric thin films, and the film thickness of each of the light transmitting dielectric thin films needs to be controlled very carefully at a precision of several-nm order. This makes it difficult to carry out the property control in the optical disk described in Patent document 3, and to carry out the medium designing thereof, and to achieve implementation thereof.

SUMMARY OF THE INVENTION

The present invention is made in view of the need for high density recording/reproduction. An object of the present invention is to provide (i) an optical information recording medium which stores information in density higher than the resolution limit of the reproduction optical system, but which allows the information to be precisely and securely reproduced; and (ii) a method for reproducing the optical information recording medium.

To achieve this object, an optical information recording medium of the present invention includes: a substrate, having pits and/or grooves, each of which is made up of a rise and a recess, and each of which corresponds to recorded information that is optically reproduced by irradiation of a light beam; and at least one super resolution reproducing film The at least one super resolution reproducing film is made of a metal oxide having a crystalline structure, and has an optical property to be changed in response to a temperature increase caused by the irradiation of the light beam at least during the reproduction of the information Also, the optical property of the super resolution reproducing film is reversibly changed depending on a temperature change in the super resolution reproducing film.

According to the above structure, the light beam irradiated to the pits and/or grooves provided on the substrate in the form of the rises and recesses causes the temperature increase of the super resolution reproducing film, with the result that the optical property of the super resolution reproducing film is changed. Specifically, the optical property is changed only within a certain portion of the super resolution reproducing film in the spot. In other words, the optical property of the super resolution reproducing film is changed, i.e., is deteriorated or improved in a portion whose temperature is increased by the light beam irradiated to the substrate. On the other hand, the optical property thereof is unchanged in a portion whose temperature is not increased, i.e., is low. This makes it possible that the size of the reproduction region, i.e., the pits and/or grooves formed in the substrate is reduced to the size smaller than the beam spot on the super resolution reproducing film. Accordingly, reproduction can be selectively carried out with respect to the region whose size is smaller than the size of the spot of the light beam. This makes it possible to provide an optical information recording medium in which information is stored in high density but from which the information can be precisely and securely reproduced.

Further, according to the above structure, the optical property of the super resolution reproducing film is reversibly changed in response to the temperature change of the super resolution reproducing film. Therefore, when the beam irradiation is ended, the temperature of the portion whose optical property has been changed in response to the irradiation of the light beam is decreased and the optical property of the super resolution reproducing film is brought back to the optical property that the super resolution reproducing film had before the beam irradiation. This makes it possible to more uniformly maintain the optical property in the low temperature portion of the super resolution. Thus, the above structure allows realization of an optical information recording medium that is excellent in terms of the reproduction stability, the durability, and the reliability.

Further, according to the above structure, the super resolution reproducing film is made of the metal oxide having the crystalline structure, so that the band gap energy is more uniform in the super resolution reproducing film as compared with a super resolution reproducing film having no crystallinity. This causes the optical property thereof to be changed greatly in response to the temperature change. Specifically, the change of the optical property of the super resolution reproducing film in response to the temperature change is relatively great. This allows a great super resolution reproducing effect. Further, the metal oxide is inexpensive and safe. This makes it possible to realize an optical information recording medium whose cost is low and which imposes a small environmental burden. Further, the metal oxide is stable, so that the durability is improved.

Note that it is preferable to select, as the material for the super resolution reproducing film, a material that is never melted in response to the temperature increase caused by the light beam irradiation. This prevents melting of the portion whose optical property is changed in response to the temperature increase caused by the light beam irradiation, so that the optical property that the portion of the super resolution reproducing film has after the light beam irradiation can be maintained more uniformly. This is effective in more uniformly maintaining the optical property in the low temperature reproduction portion to be emerged during next reproduction. This allows improvement of the durability and the reliability.

To achieve the object, an optical information recording medium of the present invention includes: a substrate; a recording layer for optically storing information, which is optically reproduced by irradiation of a light beam; and at least one super resolution reproducing film, which is made of a metal oxide having a crystalline structure, and which has an optical property to be changed in response to a temperature increase caused by the irradiation of the light beam during the reproduction of the information, the optical property of the super resolution reproducing film being reversibly changed depending on a temperature change in the super resolution reproducing film.

As is the case with the foregoing structure, this structure including the recording layer in which the information is stored makes it possible to selectively carry out reproduction with respect to a region whose size is smaller than the spot size of the irradiated reproduction light beam. This makes it possible to provide an optical information recording medium in which information is stored in high density but from which the information can be precisely and securely reproduced.

Note that, in cases where the optical information recording medium includes the recording layer, the substrate may be either (i) a substrate having pits and/or grooves corresponding to recorded information, or (ii) a flat substrate having no pit and/or groove corresponding to the recorded information.

Further, according to the above structure, the optical property of the super resolution reproducing film is reversibly changed in response to the temperature change of the super resolution reproducing film. Therefore, when the beam irradiation is ended, the temperature of the portion whose optical property has been changed in response to the irradiation of the light beam is decreased and the optical property of the super resolution reproducing film is brought back to the optical property that the super resolution reproducing film had before the beam irradiation. This makes it possible to more uniformly maintain the optical property in the low temperature portion of the super resolution. Thus, the above structure allows realization of an optical information recording medium that is excellent in terms of the reproduction stability, the durability, and the reliability.

To achieve this object of the present invention, an optical information recording medium of the present invention includes: a substrate, having pits and/or grooves, each of which is made up of a rise and a recess, and each of which corresponds to recorded information that is optically reproduced by irradiation of a light beam; and at least one super resolution reproducing film, which is made of a metal oxide having a crystalline structure, and which has an optical property to be changed in response to a temperature increase caused by the irradiation of the light beam at least during the reproduction of the information The metal oxide has one or more diffraction peaks in an X ray diffraction spectrum that is obtained as a result of an X ray diffraction using Cu-K$\alpha$1 radiation, and that is an X ray diffraction intensity plot with 2$\theta$ scan. The optical property of the super resolution reproducing film is reversibly changed depending on a temperature change in the super resolution reproducing film.

To achieve the object of the present invention, an optical information recording medium of the present invention includes: a substrate; a recording layer for optically storing information, which is optically reproduced by irradiation of a light beam; and at least one super resolution reproducing film, which is made of a metal oxide having a crystalline structure, and which has an optical property to be changed at least in response to a temperature increase caused by the irradiation of the laser. The metal oxide has one or more diffraction peaks in an X ray diffraction spectrum that is obtained as a result of an X ray diffraction using Cu-Kα1 radiation, and that is an X ray diffraction intensity plot with 2θ scan. The optical property of the super resolution reproducing film is reversibly changed depending on a temperature change in the super resolution reproducing film.

The metal oxide has one or more diffraction peaks in the X ray diffraction spectrum that is obtained as a result of the X ray diffraction using the Cu-Kα1 radiation, and that is an X ray diffraction intensity plot with 2θ scan. In other words, the metal oxide has one or more diffraction peaks in the X ray diffraction spectrum that is obtained by using the 2θ/θ scan X ray diffraction method using the Cu-Kα1 radiation.

When the X ray (Cu-Kα1 radiation) is irradiated to a metal oxide having a specific crystalline structure, the X ray is diffracted in a specific direction, depending on (i) types of atom in crystals, and (ii) alignment (arrangement) thereof. The direction in which the X ray is diffracted is expressed by the following Bragg's formula:

$$2d \sin \theta = \lambda$$

where "d" indicates a lattice constant, "2θ" indicates a diffraction angle, and "λ" indicates the wavelength of the X ray. The 2θ/θ scan X ray diffraction method is a method for scanning to measure, with the use of a detector, the linear velocity of the X ray in an angle difference between (i) the direction (sample direction) in which the X ray enters the sample, and (ii) the direction (detector angle) in which the X ray is diffracted. The angle difference corresponds to the diffraction angle 2θ, and is changed by changing the entering direction of the X ray and the diffraction direction thereof. The measuring is carried out while changing the entering direction and the diffraction direction of the X ray. Further, the X ray diffraction spectrum is a spectrum obtained by plotting the linear velocity of the X ray, which liner velocity is obtained according to the diffraction angle 2θ. The metal oxide having the specific crystalline structure has a diffraction peak in a specific diffraction angle 2θ of the X ray diffraction spectrum thus obtained through the plotting.

In other words, such a "metal oxide having the specific crystalline structure" has a diffraction peak specific to the metal oxide, in the X ray diffraction spectrum. On the other hand, there is no diffraction peak in the case of a "metal oxide having no crystalline structure", such as a material in the amorphous state in which atoms are irregularly oriented.

To achieve the object, a method of the present invention for reproducing the aforementioned optical information recording medium includes the step of: reproducing information in accordance with a fine recording mark having a size equal to or smaller than a resolution limit of a reproduction light beam.

The above structure makes it possible to reproduce the information in accordance with the fine recording mark which never allows reproduction of the information when using a normal method. Thus, such a simple method allows improvement of the recording density.

To achieve the object, an optical information processing apparatus of the present invention for at least reproducing the aforementioned optical information recording medium, the optical information processing apparatus reproducing information in accordance with a fine recording mark having a size equal to or smaller than a resolution limit of a reproduction light beam.

More specifically, the optical information processing apparatus of the present invention includes: light irradiating means for irradiating the light beam to the optical information recording medium so as to change a temperature in a spot of the light beam on the super resolution reproducing film, so that a first portion and a second portion are emerged in the spot, the first portion being in a change state in which the optical property is changed, the second portion being in an initial state in which the optical property is maintained to be identical to the optical property obtained before the irradiation of the light beam.

According to the above structure, the light irradiating means irradiates the light beam to the optical information recording medium so as to emerge, within the spot of the light beam, (i) the first portion that is in the change state in which the optical property is changed in response to the temperature change of the super resolution reproducing film, and (ii) the second portion that is in the initial state in which the optical property is maintained to be identical to the optical property that the super resolution reproducing film had before the irradiation of the light beam. This makes it possible to reproduce the information in accordance with the fine recording mark which never allows reproduction of the information when using a normal method. Further, the optical information processing apparatus of the present invention can carry out reproduction or recording with respect to the high density optical information recording medium as such, but has substantially the same structure as that of the conventional apparatus. Therefore, no cost increase is required in manufacturing the optical information processing apparatus of the present invention.

Thus, the reproducing method and the optical information processing apparatus are not greatly different from, i.e., are substantially the same as the conventional reproducing method and the conventional optical information processing apparatus, respectively; however, the reproducing method and the optical information processing apparatus make it possible to precisely and securely reproduce the information stored in density higher than the resolution limit of the reproduction optical system. Moreover, the use of the reproducing method and the optical information processing apparatus allows realization of information processing on the optical information recording medium that is excellent in terms of the reproduction stability, the durability, and the reliability.

Additional objects, features, and strengths of the present invention will be made clear by the description below. Further, the advantages of the present invention will be evident from the following explanation in reference to the drawings.

DESCRIPTION OF THE EMBODIMENTS

Embodiment 1

Figure 1:
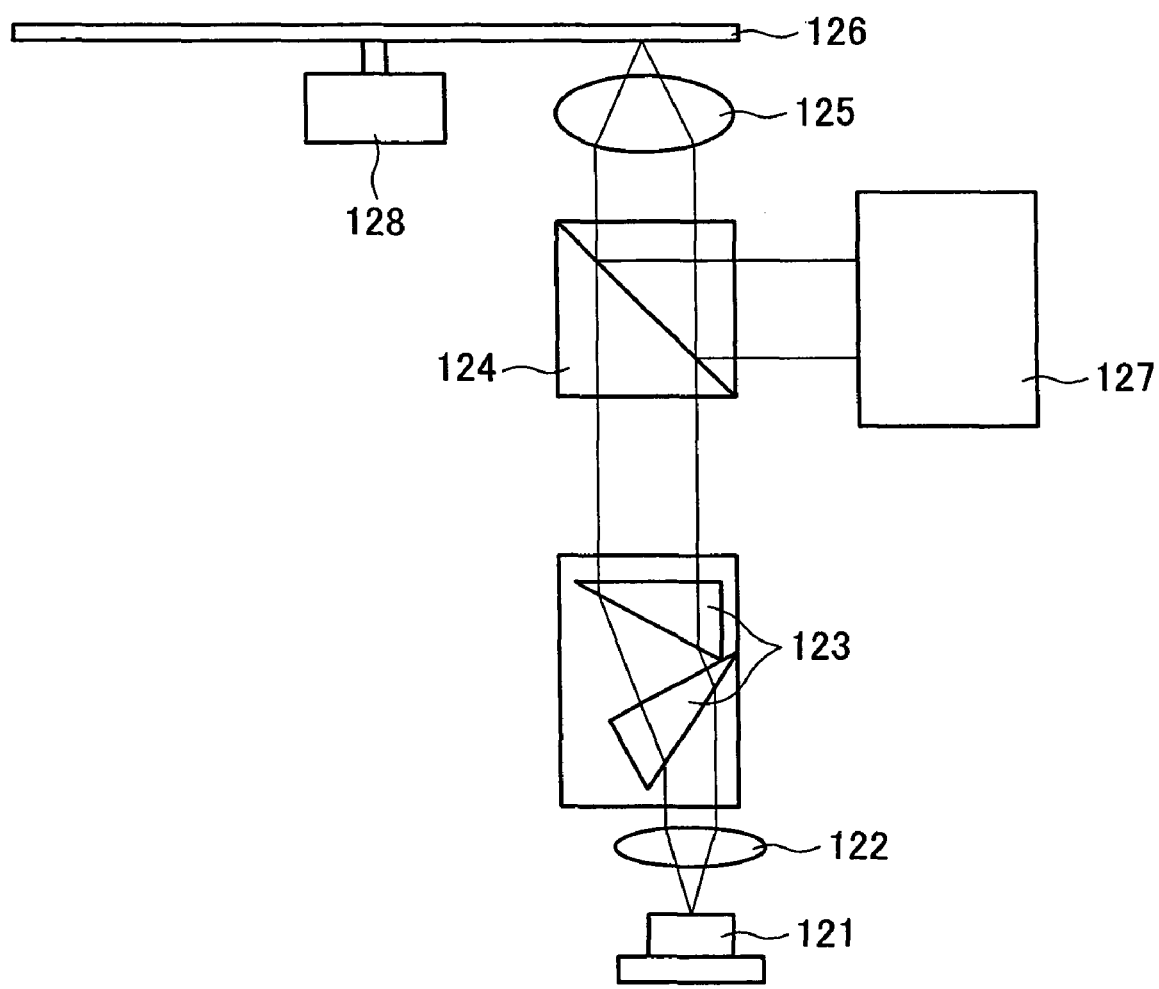
FIG. 1 is a diagram schematically illustrating one example of a recording/reproducing apparatus that can record information onto an optical information recording medium of the present invention and can reproduce information therefrom.

One embodiment of an optical information recording medium of the present invention will be described below with reference to FIG. 1 through FIG. 17.

Firstly explained is a major structure of a recording/reproducing apparatus (optical information processing apparatus) which can record information onto the optical information recording medium and which can reproduce information therefrom.

The recording/reproducing apparatus includes a laser light source, light collection optical means, relative movement means, photoelectric conversion means, servo means, address information detection means, reproduction signal demodulation circuit, and the like.

A specific example of the laser light source is a semiconductor laser emitting light whose wavelength is 405 nm; or the like.

The light collection optical means collects, on the optical information recording medium, laser light (laser beam) emitted from the laser apparatus. The light collection optical means includes optical components such as a light collection lens and a beam splitter.

The relative movement means causes the light collection optical means and the optical information recording medium to make relative movement. The relative movement means includes a linear actuator, a swing arm, and the like. The movement encompasses at least either one of (i) rotation movement or parallel movement of the optical information recording medium, and (ii) movement that the light collection lens provided in the light collection optical means moves in a direction orthogonal to the optical axis of the light collection lens.

The photoelectric conversion means converts (i) light reflected by the optical information recording medium, into (ii) an electric signal in accordance with a level of the reflected light. The servo means carries out auto-focusing of the laser light and tracking thereof. The address information detection means detects address information in accordance with an electric signal obtained by carrying out readout from an address information mark provided in the optical information recording medium. The reproduction signal demodulation circuit reproduces the recorded information in accordance with the light reflected by the optical information recording medium.

The laser source, the light collection means, photoelectric conversion means, and the servo means of these components are contained in an optical head, which is caused by the relative movement means to make the relative movement with the optical information recording medium. Alternatively, the laser source and the photoelectric conversion means can be contained in a casing different from a casing in which the light collection means is contained.

Further, it is preferable that the recording/reproducing apparatus of the present embodiment further include means for adjusting an angle between the laser light to be collected and the optical information recording medium. This makes it possible to prevent the light spot from being displaced due to occurrence of aberration.

FIG. 1 is a block diagram illustrating a general optical system which is provided in the recording/reproducing apparatus as the optical head and which handles, as the optical information recording medium, an optical disk having a circular plate shape. The optical system includes a semiconductor laser 121, a collimator lens 122, a beam shaping prism 123, a beam splitter 124, an objective lens 125, and a detection optical system 127.

The semiconductor laser 121 serves as the light source, and emits the laser light. The laser light thus emitted from the semiconductor laser 121 is converted into substantially parallel light by the collimator lens 122. Then, the parallel light is so shaped by the beam shaping prism 123 as to have light intensity distribution corresponding to a substantially circular shape. Thereafter, the parallel light whose light intensity distribution corresponds to the substantially circular shape passes through the beam splitter 124, and is collected on the optical information recording medium 126 by the objective lens 125. The light thus collected is so reflected by the optical information recording medium 126 as to come back to the beam splitter 124, and is split by the beam splitter 124 so as to be guided into the detection optical system 127.

The optical information recording medium 126 is rotated by a spindle motor 128. This makes it possible to scan a spot, to which the light is irradiated, on the optical information recording medium 126. The detection optical system 127 recognizes a signal in accordance with (i) a change in the polarization direction of the reflected light, (ii) a change in the intensity of the reflected light, and the like, with the result that the data stored in the recording mark of the optical information recording medium 106 is read out. Simultaneously with this, the detection optical system 127 detects (i) a defocusing signal indicative of defocusing of the spot of the light irradiated to the optical information recording medium 26, and (ii) a track position displacement signal. Then, the detection optical system 127 feeds back the detection results to a driving system to the objective lens 125 so that the displacement of the light spot is corrected. Note that the objective lens 125 of the optical system is so set as to have a numerical aperture (NA) of, e.g., 0.65.

It is preferable that such an optical information recording/reproducing apparatus can record and reproduce, as the optical information recording medium 126, (i) the optical information recording medium of the present invention, i.e., the optical information recording medium adopting the super resolution medium technique; and (ii) a normal optical information recording medium using no super resolution medium technique. In order to accommodate this, the optical information recording/reproducing apparatus is arranged so that each of the gain of the detector, the intensity of reproduction light, the intensity of recording light, recording waveform, rotation speed of the optical information recording medium is switchable depending on a case of using the optical information recording medium of the present invention, and on a case of using the normal optical information recording medium. Such switching can be controlled electrically, so that the optical system does not need to be modified greatly from that of an apparatus for recording and reproducing only the normal optical information recording medium.

Note that the wording "light irradiation means" encompasses the laser light source, the light collection optical means, and the relative movement means, so that the "light irradiation means" of the optical information recording/reproducing apparatus shown in FIG. 1 corresponds to a member including the semiconductor laser 121, the collimator lens 122, the beam shaping prism 123, the beam splitter 124, and the objective lens 125.

The following explains a structure of an optical information recording medium of the present embodiment.

Figure 2:
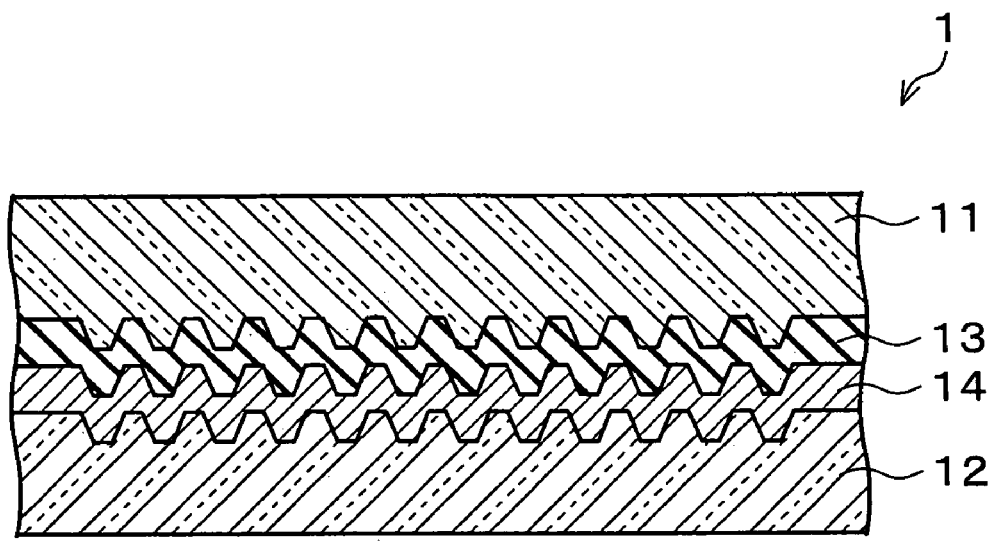
FIG. 2 is a cross sectional view partially illustrating a major portion of the optical information recording medium according to one embodiment of the present invention.
Figure 3:
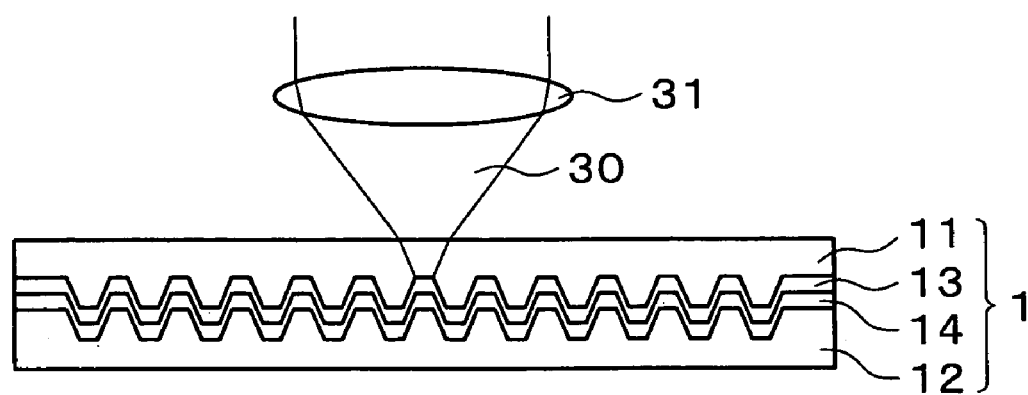
FIG. 3 is a cross sectional view schematically illustrating the optical information recording medium according to the embodiment of the present invention.

See FIG. 2 and FIG. 3. The optical information recording medium of the present embodiment is a read-only (playback-only; reproduction-only) optical information recording medium 1 in which a transparent resin layer 11, a super resolution reproducing film 13, a reflecting film 14, and a substrate 12 are provided in this order from a side receiving a reproduction beam 30 serving as a light beam for reproducing the optical information recording medium 1. In other words, the optical information recording medium 1 is so arranged that: the reflecting film 14 is provided on the substrate 12, the super resolution reproducing film 13 is provided on the reflecting film 14, and the transparent resin layer 11 is provided on the super resolution film 13. Such a structure allows the reproduction beam 30 to enter from the transparent resin film 11 to the inner surface of the substrate 12 via the super resolution reproducing film 13 and the reflecting film 14. The inner surface of the substrate 12 refers to a surface facing the reflecting film 14.

The transparent resin layer 11 is substantially transparent at least in the wavelength of the reproduction beam 30 so as not to prevent the entry of the reproduction beam 30. This allows the reproduction beam 30 to enter the optical information recording medium 1 through the transparent resin layer 11. A material of which the transparent resin layer 11 is not particularly limited. Examples thereof include: (i) thermoplastic transparent resins (plastics) such as polycarbonate, amorphous polyolefin, thermoplastic polyimide, PET (polyethylene terephthalate), PEN (polyethernitrile), and PES (polyethersulfone); (ii) heat-curing transparent resins such as heat-curing polyimide and UV-curing acryl resin; and (iii) a combination of them.

It is suitable that the transparent resin layer 11 normally has a thickness of approximately 1 μm to approximately 100 μm; however, the transparent resin layer 11 may have a thickness of approximately 0.1 mm to approximately 1.2 mm. In this case, the optical information recording medium 1 has a suitable strength. Note that a layer made of another transparent material may be used instead of the transparent resin layer 11. Examples of the transparent material include: glass, and a combination of the glass and the transparent resin. In this case, it is suitable that the layer made of such a transparent material have a thickness of approximately 0.1 mm to approximately 1.2 mm.

The substrate 12 is required to render a suitable strength to the optical information recording medium 1. An optical property of a material of which such a substrate 12 is made is not particularly limited. That is, the substrate 12 may be transparent or non-transparent. Examples of the material of which the substrate 12 is made include: (i) glass; (ii) thermoplastic transparent resins such as polycarbonate, amorphous polyolefin, thermoplastic polyimide, PET, PEN, and PES; (ii) heat-curing transparent resins such as heat-curing polyimide and UV-curing acryl resin; (iii) metals; and (iv) a combination of them.

Provided on the inner surface (the surface facing the reflecting film 14) of the substrate 12 are (i) pits, each of which corresponds to the recorded information and each of which forms rise and recess; and (ii) guiding grooves. Note that both each of the pits and each of the grooves may be provided, or either one of the pit and the groove may be provided.

The thickness of the substrate 12 is not particularly limited; however, it is appropriate that the substrate 12 has a thickness of, e.g., approximately 0.1 mm to approximately 1.2 mm. Further, the pit has a pitch of approximately 0.1 μm to 1.6 μm, and has a height (distance from the bottom (recess) to the top (rise)) of approximately 30 nm to approximately 200 nm. Further, it is appropriate that: the guiding groove has a pitch of approximately 0.3 μm to 1.6 μm, and has a depth of approximately 300 nm to approximately 200 nm.

Provided on the substrate 12 are the reflecting film 14 and the super resolution reproducing film 13. The super resolution reproducing film 13 has an optical property that is changed in the wavelength of the reproduction beam 30 in response to temperature increase caused by the irradiation of the reproduction beam 30. As shown in FIG. 2, the super resolution reproducing film 13 and the reflecting film 14 are provided in this order from the side receiving the beam, i.e., the side in which the transparent resin layer 11 is provided.

The super resolution reproducing film 13 is made of a half-transparent (translucent) material whose optical property is reversibly changed in response to the temperature change, and contains a material by which the optical property is changed in the wavelength of the reproduction beam in response to the temperature increase. Suitably used for the material is a material by which the optical property of the super resolution reproducing film 13 is changed in a specific wavelength region in response to the temperature increase. Specifically, suitably used as the material is a material by which the light transmittivity of the super resolution reproducing film 13 is changed in a range of 10% to 90% in response to temperature increase from 20° C. to 200° C.

Conventionally, various materials have been proposed as the above material; however, the present embodiment uses a metal oxide whose forbidden bandwidth (band gap energy) is so changed by the temperature as to shift an optical absorption edge wavelength of the metal oxide, and whose optical property in the reproduction wavelength is accordingly changed. Further, it is preferable that the metal oxide be not amorphous but have a crystalline structure. This is because the band gap energy of the metal oxide is never broadly distributed and is converged in the vicinity of a certain value, with the result that the optical property in the reproduction wavelength can be greatly changed. Specific examples of such a metal oxide include either transparent semiconductors or dielectrics, such as ZnO (zinc oxide), $SnO_2$ (tin oxide (IV)), $CeO_2$ (cerium oxide (IV)), NiO (nickel oxide (II)), $NiO_2$, $In_2O_3$ (indium oxide (III)), $TiO_2$ (titanium oxide (IV)), $Ta_2O_3$ (titanium oxide (III)), $VO_2$ (vanadium oxide (IV), and $SrTiO_3$. Among these materials, ZnO (zinc oxide) is particularly preferable.

The thickness of the super resolution reproducing film 13 can be adjusted in accordance with (i) a material to be used, and (ii) a condition in the formation. It is appropriate for the super resolution reproducing film 13 to have a film thickness of, e.g., approximately 5 nm to approximately 800 nm. A super resolution reproducing film 13 having a sufficiently thick film thickness (100 nm or thicker) can make better use of multiple interferences, so that the optical property can be greatly changed in response to the temperature increase. On the other hand, a super resolution reproducing film 13 deposited to also have a thick film thickness has a surface having rises and recesses less definite than those of the substrate. Moreover, such a super resolution reproducing film 13 is disadvantageous in terms of a its formation process and cost. In light of this, it is preferable that the super resolution reproducing film 13 have a film thickness of 300 nm or thinner. It is particularly preferable that the super resolution reproducing film 13 be made of ZnO (zinc oxide) and have a film thickness of 100 nm to 300 nm.

Note that Patent document 3 discloses the read-only optical disk utilizing the zinc oxide nano thin film using the near field; however, the optical disk using the zinc oxide nano thin film is different from that of the present application in terms of a reproduction principle. Specifically, the read-only optical disk disclosed in Patent document 3 uses the near field effect obtained in the zinc oxide nano thin film, so that the zinc oxide nano thin film needs to be sandwiched between the light transmitting dielectric thin films, and the film thickness of each of the light transmitting dielectric thin films needs to be controlled very carefully at a precision on the order of several-nm. Further, the light intensity stronger than the intensity of the light used in the normal optical recording/reproduction is required for the generation of the near field light, so that the irradiation of such light for the recording/reproduction is likely to cause deterioration of the entire medium including the substrate and the thin film. As such, the optical disk disclosed in Patent document 3 has problems in the reproduction stability and durability. Further, the zinc oxide nano film is a relatively thin film having a film thickness of 100 nm or less.

In contrast, the optical information recording medium of the present invention has such a relatively thick film that has a film thickness of, preferably, 100 nm or greater, in order to use the multiple interferences of light and the band gap of the semiconductor as described below. As such, each of the invention of the present invention and the invention described in Patent document 3 relates to an optical disk using a zinc oxide film; however, the inventions of the present invention and Patent document 3 are different in terms of their respective principles of operation and their structure.

It is preferable that the reflecting film 14 be made of a metal film having a high reflectance. Specific examples of such a metal film having the high reflectance include: an Al (aluminum) film; a Au (gold) film; a Ag (silver) film; a Cu (copper) film; a film made of either an alloy including any of the films, or an alloy including any of the films and another element; and the like.

The thickness of the reflecting film 14 is not particularly limited, and can be adjusted so as to realize a desired reflectance. Therefore, the reflecting film 14 has a film thickness of, e.g., approximately 5 nm to approximately 100 nm. The reflecting film 14 thus formed reflects the reproduction beam 30 so that the multiple interferences occur between the super resolution reproducing film 13 and the reflecting film 14. This allows the optical property of the super resolution reproducing film 13 to be changed efficiently.

The above description explains the super resolution reproducing film 13 and the reflecting film 14; however, the reflecting film 14 is not necessarily required as long as the super resolution reproducing film 13 works to allow for (i) the optical property change caused in response to the temperature change, and (ii) the reflecting of the light. Specifically, the reflecting film 14 is not required in cases where the super resolution reproducing film 13 has a large refractive index, and where a difference between the refractive index of the super resolution reproducing film 13 and the refractive index of each of the other film and the resin renders reflectance sufficient for the reproduction.

Such a structure makes it possible to realize a read-only optical information recording medium 1 having no writable recording film, such as a CD (compact disk), a CD-ROM (compact disk read only memory), a DVD (digital versatile disk), and a DVD-ROM (digital versatile disk read only memory).

The following explains a method for reproducing the optical information recording medium 1.

See FIG. 3. An optical system including (i) a laser source such as the semiconductor laser 121 shown in FIG. 1, and (ii) a light collection lens 31 corresponding to the objective lens 125 shown in FIG. 1 is used to emit the reproduction beam 30 so that the reproduction beam 30 comes to the inner surface (the surface on which at least either the pit or the groove is formed) of the substrate 12 via the transparent resin layer 11 so as to be reflected by the inner surface. The reflected light is detected by an optical head (not shown). This allows reproduction of the optical information recording medium 1. Note that, in the apparatus used in the present embodiment, the reproduction beam 30 emitted from the laser source has a wavelength of 408 nm, and the objective lens has a numerical aperture NA of 0.65.

The irradiation of the reproduction beam 30 to the optical information recording medium 1 is carried out so that the light beam spot on the super resolution reproducing film 13 has a high temperature portion and a low temperature portion.

Figure 4:
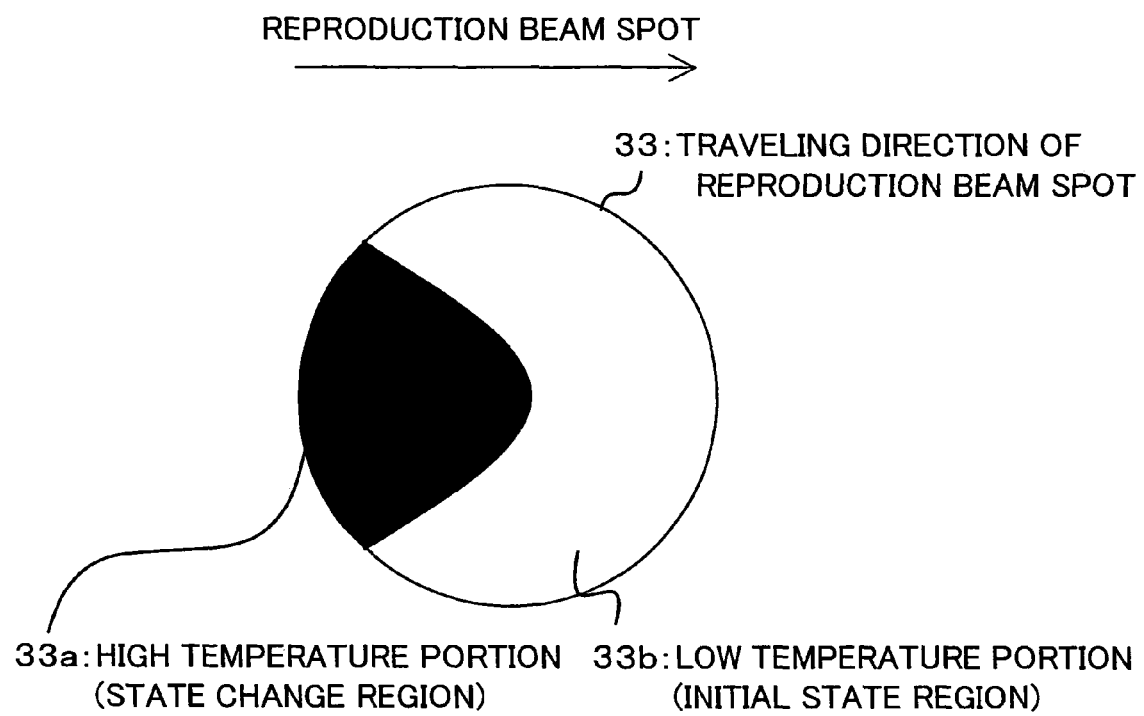
FIG. 4 is an explanatory diagram illustrating an optical property change in a super resolution reproducing film, specifically, illustrating temperature distribution and reflectance distribution in a reproduction beam spot on the super resolution reproducing film.

For example, see FIG. 4 illustrating a reproduction beam spot 33 of the reproduction beam 30 that is irradiated to the side, on which the transparent resin 11 is provided, of the read-only optical information recording medium 1 so as to scan the read-only optical information recording medium 1 in a predetermined direction. In the beam spot 33, temperature gradient is realized in the traveling direction of the reproduction beam spot 33. Specifically, a high temperature portion 33a (first portion in a change state) is created in a rear portion of the light beam spot 33 on the surface of the super resolution reproducing film 13, whereas a low temperature portion 33b (second portion in an initial state) is created in a front portion thereof. The rear portion of the light beam spot 33 refers to a portion positioned in the rear side with respect to the traveling direction of the reproduction beam spot 33, whereas the front portion of the light beam spot 33 refers to a portion positioned in the front side with respect to the traveling direction thereof. The high temperature portion 33a has a temperature of, e.g., 80° C. or higher, and the low temperature portion 33b has a temperature, e.g., higher than the room temperature but lower than 80° C.

The optical property of the lower temperature portion 33b of the super resolution reproducing film 13 in the wavelength of the reproduction beam 30 is maintained to be in the initial state. On the other hand, the optical property of the high temperature portion 33a of the super resolution reproducing film 13 in the wavelength of the reproduction beam 30 is changed. In other words, the super resolution reproducing film 13 is in the initial state at a temperature, e.g., higher than room temperature but lower than 80° C., and the super resolution reproducing film 13 is in the optical property change state at a temperature of, e.g., 80° C. or greater. This causes the super resolution reproducing film 13 to have regions whose optical properties are different from each other: (i) a preceding portion corresponding to the lower temperature portion 33b of the reproduction beam spot 33, and (ii) a subsequent portion corresponding to the higher temperature portion 33a thereof. Note that the wording "room temperature" refers to, e.g., a temperature of 30° C.

In the reproduction of the normal read-only optical information recording medium, the light is diffracted by the pits and/or the grooves positioned in the beam spot 33, and is reflected so that the light intensity is modulated, with the result that the signal corresponding to each of the pits and/or the grooves is detected. However, no super resolution reproducing film 13 is provided in such a normal read-only optical information recording medium, so that the optical property is uniform in the normal read-only optical information recording medium even though the high temperature portion 33a and the low temperature portion 33b are created in the reproduction beam spot 33 by the beam irradiation. This makes it impossible to carry out the reproduction of an optical information recording medium having pits and grooves whose sizes are equal to or smaller than the resolution limit of the optical system. However, the use of the optical information recording medium 1 using the super resolution reproducing film 13 makes it possible to create, in the reproduction beam spot 33, the aforementioned portions whose optical properties are different from each other.

Although it is unknown and impossible to prove how the creation of such regions in the beam spot 33 contributes to the detection of the signal corresponding to the pits and/or the grooves, it is considered that the distribution in the optical property inside the beam spot 33 contributes to the super resolution reproduction of the optical information recording medium 1 of the present embodiment.

This makes it possible to reduce the size of a reproduction region in each of the pits and/or the grooves provided in the surface (recorded information surface) of the substrate 12, so that the size of the reproduction region is smaller than the size of the reproduction beam spot 33 of the reproduction beam 30 irradiated to the super resolution reproducing film 13 and the reflecting film 14. The size of the reproduction region can be smaller as such, so that the reproduction resolution limit can be improved. Accordingly, stronger reproduction signal intensity is attained. This makes it possible to securely reproduce the information corresponding to the fine pits and/or the grooves provided in the surface (recorded information surface) of the substrate 12, particularly, the information corresponding to the pits and/or grooves whose sizes are equal to or smaller than the resolution limit of the reproduction beam.

As described above, the optical information recording medium of the present embodiment uses the super resolution reproducing film 13 for the purpose of reproducing the information corresponding to each of the fine recording marks which are provided in the surface (recorded information surface) of the substrate 12 as the pits and/or the grooves, and which have sizes equal to or smaller than the resolution limit of the reproduction beam.

Explained next are the band gap energy and the optical absorption edge.

Generally, an insulator such as a transparent dielectric, or a semiconductor has conduction electrons whose energy levels are discontinuous, so that there exists the energy forbidden band, i.e., the band gap. The insulator or the semiconductor has a fermi level in the band gap, so that energy transition of the conduction electrons is carried out from a valence band to a conduction electron band across the band gap. Similarly, the band gap works for light absorption.

Specifically, light having energy equal to or higher than the band gap energy is absorbed so as to cause optical transition of the electrons from the valence band to the conduction electron band. That is, such light having energy equal to or higher than the band gap energy is absorbed, but light having energy lower than the band gap energy is not absorbed and passes through the insulator or the semiconductor. Such a photon energy level determining whether or not light is absorbed in the insulator or the semiconductor is termed "optical absorption edge" or "optical band gap". Further, the wavelength of light having photon energy corresponding to the optical absorption edge is termed "optical absorption edge wavelength".

A thin film or the like does not have ideal crystallinity and is partially distorted, defective, or amorphous. Such a thin film partially absorbs light having energy slightly lower than the energy corresponding to the optical absorption edge, and absorbs light having the optical absorption edge wavelength. Moreover, as the crystallinity of the thin film deteriorates, i.e., as the thin film becomes amorphous, cyclic order in the crystallinity is lost. Accordingly, the forbidden band, i.e., the band gap deviates from a theoretical value so as to be distributed. The broader the distribution becomes, the less the light is absorbed at the theoretical value. In contrast, as crystallinity specific to the material of the thin film is better, the band gap has a fixed value, with the result that the optical absorption edge comes close to each of the theoretical value and a bulk value. In other words, good crystallinity specific to the material of the thin film allows absorption of light having a specific wavelength. Accordingly, the transmittivity of the thin film greatly depends on the wavelength of the light.

Figure 5:
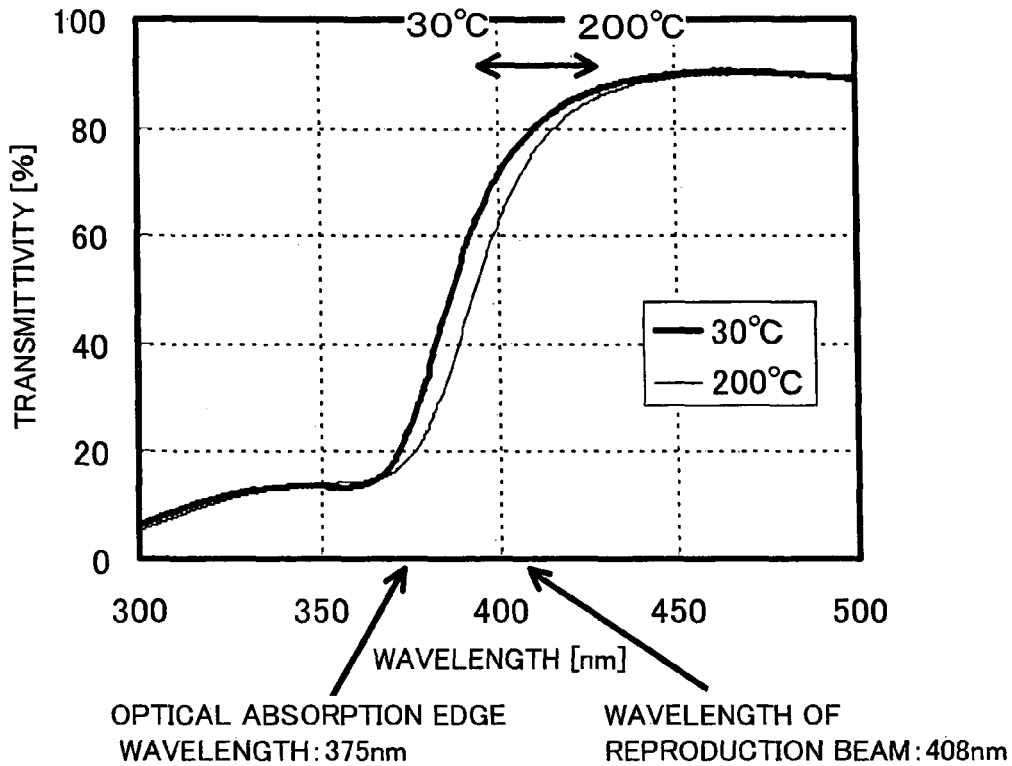
FIG. 5 is a graph illustrating one example of a change of the spectroscopic transmittivity property of the super resolution reproducing film of the optical information recording medium (Example 1) according to the present invention in response to a temperature change.

FIG. 5 illustrates spectroscopic transmittivity properties, in the vicinity of the optical absorption edge, of the super resolution reproducing film 13 made of a ZnO film having a film thickness of 140 nm. The spectroscopic transmittivity properties thus illustrated are respectively obtained when the super resolution reproducing film 13 has a low temperature (30° C.) and has a high temperature (200° C.). Now, consider the dependency of the transmittivity of the ZnO film on the wavelength of the light (light interference occurs but this is not essential in explanation here, so that explanation of the light interference is omitted). The super resolution reproducing film 13 partially absorbs light having energy lower than the energy corresponding to the optical absorption edge (375 nm), i.e., light having a wavelength (approximately 430 nm) longer than the optical absorption edge wavelength. As the energy of the light becomes higher, i.e., as the wavelength of the light becomes shorter so as to come closer to the optical absorption edge wavelength, the light is absorbed more in the super resolution reproducing film 13. The super resolution reproducing film 13 almost completely absorbs light having a wavelength (375 nm) corresponding to the optical absorption edge. It is said that ZnO has band gap energy of 3.3 eV (equivalent to a wavelength of 375 nm), and this matches well with the above examination result. Strictly speaking, the light having the wavelength corresponding to the optical absorption edge is not completely absorbed; however, this is because the ZnO film has a film thickness of 140 nm, which is thinner than the half of the measured wavelength (wavelength of 300 nm to 500 nm), as is the case with Examples described later. It was confirmed that a ZnO film having a film thickness thicker than 140 nm completely absorbs the light having the wavelength corresponding to the optical absorption edge.

Explained next are (i) the optical absorption edge, and (ii) a change of the optical absorption edge in response to a temperature change.

Generally, the band gap energy of the semiconductor or the insulator is decreased in response to temperature increase. For example, the technical field of a semiconductor laser suffers from such a problem that heat due to a temperature environment and/or driving causes a change of the band gap energy, with the result that an oscillation wavelength is changed. For attainment of an oscillation wavelength stable in a wide temperature range, a material has been developed so as to reduce such a dependency of the band gap energy on the temperature.

As described above, the band gap and the optical absorption edge are essentially the same, so that the energy corresponding to the optical absorption edge becomes lower in response to the temperature increase, i.e., the wavelength corresponding to the optical absorption edge becomes longer in response to the temperature increase. In other words, especially a region between (i) a wavelength in the vicinity of the optical absorption edge wavelength, and (ii) the wavelength of the reproduction beam are shifted to the longer-wavelength-side of the graph (hereinafter, referred to as "transmittivity spectrum") illustrating the dependency of the transmittivity of the super resolution reproducing film 13.

Specifically, see FIG. 5. In response to the temperature increase, a region between (i) a wavelength in the vicinity of the wavelength of 430 nm longer than the wavelength (408 nm) of the reproduction beam, and (ii) a wavelength shorter than the wavelength (408 nm) of the reproduction beam is shifted to the longer-wavelength-side of the transmittivity spectrum of FIG. 5. Now, see the transmittivities each corresponding to the wavelength (408 nm) of the reproduction beam. It is apparent that the temperature increase causes the change of the optical property (specifically, the transmittivity) of the super resolution reproducing film 13.

Thus, in cases where the optical absorption edge wavelength is close to the wavelength (408 nm) of the reproduction beam at normal temperature (room temperature), the change of the optical property of the super reproducing film 13 is noticeable as shown in FIG. 5.

In view of this, it is preferable that the super resolution reproducing film 13 be a film whose optical absorption edge wavelength (lower limit of an absorption band in the ultraviolet/visible region) is shorter than the wavelength of the reproduction beam 30, and whose optical absorption edge wavelength is shifted to be longer in response to the temperature change so that the optical property corresponding to the wavelength of the reproduction beam 30 is changed. For example, in cases where the reproduction beam 30 has a wavelength falling within a range from 379 nm to 415 nm (e.g., 408 nm), it is preferable that the super resolution reproducing film 13 be a ZnO film whose optical absorption edge wavelength is approximately 375 nm at the normal temperature.

When the irradiation of the reproduction beam 30 causes temperature increase so that the high temperature portion 33a is created in such a ZnO film, the optical absorption edge wavelength is caused to become longer as shown in FIG. 5. This causes a change of the spectroscopic transmittivity of the ZnO film in the wavelength of the reproduction beam 30. Note that the light transmittivity of the low temperature portion 33b having a temperature lower than the high temperature portion 33a is maintained to be in the initial state. When the beam spot 33 is displaced from the high temperature portion 33a created in response to the temperature increase, the temperature in the high temperature portion 33a is decreased, with the result that the absorption edge wavelength having become long becomes as short as the absorption edge wavelength used to be. Accordingly, the optical property of the ZnO film is brought back to the initial state.

Further, it is preferable to use an effect of the light interference for the sake of adjusting the change of the transmittivity of such a super resolution reproducing film 13. The light interference occurs between (i) light reflected by one surface of the super resolution film 13, and (ii) light reflected by the other surface thereof. In cases where the optical information recording medium is designed and manufactured in view of such a light interference, it is preferable to evaluate a change of the reflectance of the optical information recording medium, rather than evaluate the change of the reflectance of the super resolution reproducing film. In other words, it is preferable that the reflectance of the entire optical information recording medium be adjusted. This is because it is difficult to evaluate only the transmittivity of the super resolution reproducing film provided in the optical information recording medium.

Now, consider a case where the optical information recording medium is so designed that the super resolution reproducing film 13 has a film thickness of 100 nm or thicker. In this case, the light interference occurs between (i) the light reflected by the surface of the super resolution reproducing film 13, and (ii) the light reflected by the other surface thereof. Therefore, the reflectance is determined by thus designing the optical information recording medium including the super resolution reproducing film 13 and the reflecting film 14. In other words, such designing makes it possible to set the reflectance of the optical information recording medium so that the reflectance thereof is large in the vicinity of the optical absorption edge of the super resolution reproducing film 13. This makes it possible to greatly change the optical property of the super resolution reproducing film 13 (difference between the high temperature portion 33a and the low temperature portion 33b in terms of the optical property in the wavelength of the reproduction beam 30). Accordingly, strong reproduction signal intensity is securely attained. Further, in cases where the super resolution reproducing film 13 has a film thickness of 300 nm or thinner, the rises and the recesses formed in the substrate is definite in such a super resolution reproducing film 13 formed on the substrate. This is advantageous in terms of the process and the cost.

The above description deals with the transmittivity property and the function of only the super resolution reproducing film 13; however, the optical information recording medium 1 needs to be designed in consideration of the actual structure including all the films. Specifically, the optical information recording medium 1 of the present embodiment needs to be designed in consideration of (i) the super resolution reproducing film 13, and (ii) the multiple optical interferences occurring between the interface with the reflective film 14 and the interface with the transparent resin layer 11.

Figure 6:
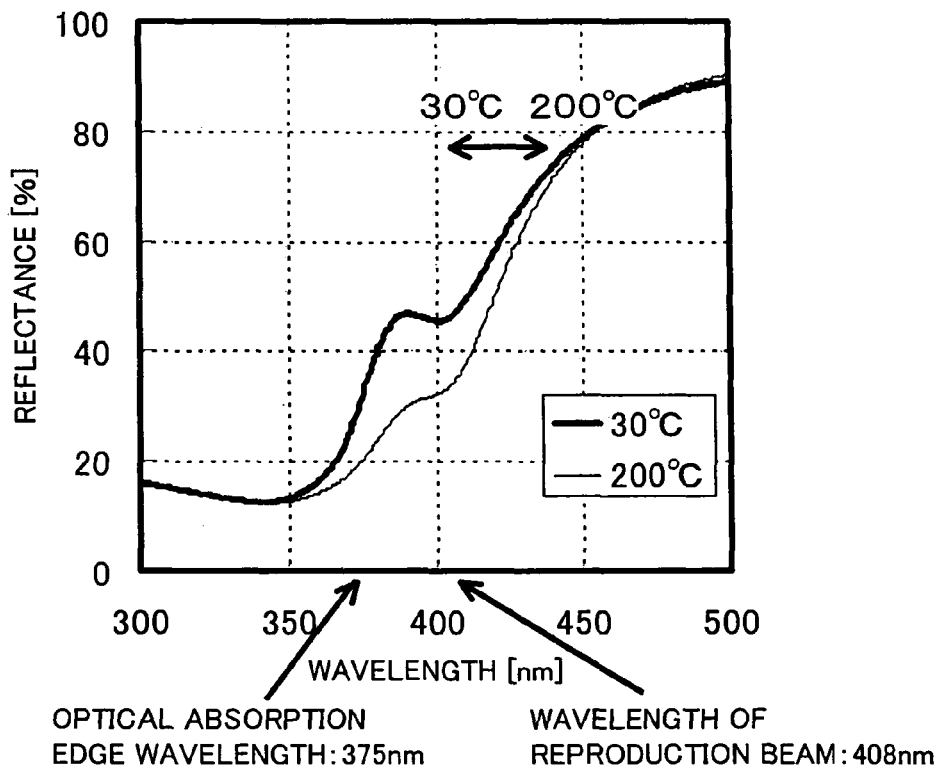
FIG. 6 is a graph illustrating an example of a change of the spectroscopic reflectance property of the super resolution reproducing film of the optical information recording medium (Example 1) according to the present invention in response to a temperature change.

FIG. 6 illustrates spectroscopic reflectance properties of an optical information recording medium having a structure similar to the optical information recording medium 1 except that no transparent resin layer 11 is provided, i.e., a structure in which the super resolution reproducing film 13 and the reflecting film 14 are provided but no transparent resin layer 11 is provided. Specifically, FIG. 6 illustrates (i) a spectroscopic reflectance property, which corresponds to each of wavelengths in the vicinity of the optical absorption edge of the super resolution reproducing film 13 and which is obtained when the super resolution reproducing film 13 has a low temperature (30° C.); and (ii) a spectroscopic reflectance property, which corresponds to each of wavelengths in the vicinity of the optical absorption edge of the super resolution reproducing film 13 and which is obtained when the super resolution reproducing film 13 has a high temperature (200° C.). The super resolution reproducing film 13 is made of a ZnO film having a film thickness of 140 nm, and the reflecting film 14 is made of an AlNi alloy film having a film thickness of 50 nm. Measurement of the spectroscopic reflectance property was carried out by irradiating the light to the optical information recording medium via the super resolution reproducing film 13, as is the case with the actual optical information recording medium 1. The following explains the reflectance of such an optical information recording medium 1, and the reflectance of the structure identical to that of Example 1 described later.

The optical property (specifically, the reflectance) of the optical information recording medium (see FIG. 6) having the ZnO film having a thickness of 140 nm is changed in the wavelength (408 nm) of the reproduction beam in response to the temperature change.

As such, the above explanation made solely for the super resolution reproducing film 13 is also true in this case, i.e., the temperature distribution in the beam spot can be used to cause the change of the optical property of a part of the super resolution reproducing film 13 provided in each of (i) the actual optical information recording medium 1 such as that of the present embodiment, and (ii) the same structure as that of Example 1 described later.

Such an optical absorption wavelength change in the super resolution reproducing film 13 is caused in response to the change, which is caused by the temperature change, of the forbidden band (band gap) of the metal oxide semiconductor. A similar effect can be obtained in cases where the super resolution reproducing film 13 is made of a material other than ZnO. Examples of such a material include: (i) metal oxides such as $SnO_2$, $CeO_2$, NiO, $NiO_2$, $In_2O_3$, $TiO_2$, $Ta_2O_5$, $VO_2$, and $SrTiO_3$, (ii) a mixture made of a combination thereof, (iii) a mixture including a combination thereof, and (iv) a solid solution including the combination thereof. Further, the material of which the super resolution reproducing film 13 is made is not particularly limited as long as the material allows (i) realization of the technical idea of the present invention, and (ii) the effect of the present application. For example, the material of which the super resolution reproducing film 13 is made may be a material obtained through either element doping or element substitution.

Explained next is crystallinity. Important in considering the crystallinity are not only (i) the state such as mono-crystal, poly-crystal, and amorphous which are found in a general bulk material, but also (ii) each alignment property of crystals. The wording "alignment property" refers to such a tendency that crystals randomly oriented in an ordinary state are preferentially aligned or grow in a specific direction.

It is known that, in a crystalline thin film manufactured in accordance with a normal deposition method such as the sputtering method, crystals are most likely to be oriented in the direction of the normal line of a surface of the thin film, i.e., the crystals are likely to be oriented in the same direction, so that the crystals are easily aligned such that respective surfaces of the crystals are oriented in the same direction. The direction of the normal line refers to a direction perpendicular to the surface of the thin film. This is disclosed in, e.g., 1.7 of p. 26 of Patent document 2; Paragraph [0004] of Japanese Unexamined Patent Publication Tokukaihei 05-238887/1993; or Paragraphs [0007] and [0008] of Japanese Unexamined Patent Publication Tokukaihei 06-145977/1994.

Further, for application of such a thin film to that in the optical information recording medium of the present application, the film thickness and the property of the thin film need to be uniform as much as possible. So, the substrate is generally rotated during film formation. In this case, the normal line of the surface of the thin film corresponds to the rotation axis of the substrate, so that the crystals are likely to be aligned in the direction of the normal line. However, due to the rotation of the substrate, the crystals are likely to be further randomly oriented in the in-plane direction of the thin film. Therefore, the crystalline thin film is likely to have a poly-crystalline structure in which the alignment property is special as follows: the crystals are preferentially oriented in the direction of the normal line of the surface of the thin film, but are randomly oriented in the in-plane direction thereof. Further, the crystals can be aligned in a different manner, depending on (i) a film formation material, (ii) a film formation condition, or (iii) a crystalline structure of a material for the substrate. In some cases, it is possible to manufacture (i) a thin film having a mono-crystalline structure, and (ii) a thin film having a poly-crystalline structure in which crystals are randomly oriented in all the directions.

Hereinafter, the present specification assumes that each of the wordings "crystalline structure" and "crystallinity" has a meaning contrary to the wording "amorphous" indicating a disorderly structure, i.e., indicates that a material has a specific cyclic orderly structure of crystals; however, each of the wordings disregards whether or not each of the crystals has the alignment property (orientation). Further, the present specification assumes that the wording "alignment property (orientation)" is used for the property by which the crystals are aligned in the film-surface direction, mainly in the direction the normal line of the surface of the thin film.

As described above, the optical property in the super resolution reproducing film 13 used in the present embodiment is changed in response to the band gap change caused by the temperature change. This is considered to contribute to the super resolution reproduction. Moreover, as the crystallinity of the thin film deteriorates, i.e., as the thin film becomes amorphous, the cyclic order in the atom arrangement is lost. Accordingly, the forbidden band, i.e., the band gap deviates from a theoretical value so as to be distributed, and the distribution becomes broad. This prevents the light from being absorbed at the theoretical value. In contrast, as the crystallinity specific to the material of the thin film is better, the band gap has a fixed value, with the result that the optical absorption edge comes close to each of the theoretical value and a bulk value. Accordingly, the transmittivity of the thin film greatly depends on the wavelength of the light in cases where the crystallinity specific to the material of the thin film is good. It is considered that this greatly changes (i) the spectrum shift caused by the temperature change, and (ii) the optical property in the reproduction wavelength.

Further, in cases where the crystallinity after the temperature change caused by the information readout is substantially the same as the crystallinity before the temperature change, the optical information recording medium is advantageous in terms of the repeated reproduction. A reason of this is as follows. the optical property is reversibly changed, there is no change in the phase state, and the atoms are moved less. This allows realization of an optical information recording medium which is excellent in terms of reproduction stability, durability, and reliability.

Further, the metal oxide generally has a high melting point, and is a stable material. For example, although Zn (zinc metal) has a relatively low melting point of 420° C. and a relatively low boiling point of 907° C. for a metal, ZnO has a very high melting point of 1975° C. Therefore, the laser irradiation normally never causes the optical information recording medium to have a temperature equivalent to such a melting point. For example, the recording is carried out at a temperature of approximately 600° C. or greater that corresponds to the melting point of a phase change recording material practically used in the DVD-RAM. Accordingly, the metal oxide is never melted due to the normal information reproduction using the laser irradiation, so that the crystalline structure is not changed. In other words, while the crystalline structure is retained, the optical property is changed. For example, see how the transmittivity spectrum is changed due to the temperature change. The shape of the spectrum is not changed, but is shifted. This indicates that the crystalline structure is retained and the structure of the optical information recording medium is therefore substantially unchanged even when the temperature is changed. In other words, the change caused by the temperature change is not the structural change in the crystalline phase, but is a mere change in the electronic state.

As described above, the present invention uses the change of the band gap in the transparent semiconductor, which change is caused by the temperature change. Therefore, the crystalline structure is not changed, so that the structure in the optical information recording medium is not changed due to the temperature change. Therefore, it is difficult for the composition and the shape of the optical information recording medium to be changed. This makes it possible to provide an optical information recording medium which is excellent in terms of the durability.

The optical information recording medium of the present embodiment can be manufactured in accordance with, e.g., the following method.

Firstly, a metal film serving as the reflecting film 14, and the super resolution reproducing film 13 are formed in this order on the substrate 12 having the surface (recorded information surface) on which the pits and/or the grooves both corresponding to the recorded information are provided. The film formation is carried out in accordance with the magnetron sputtering method. In view of the material of which the super resolution reproducing film 13 is made, the sputtering may be carried out with the substrate 12 heated at a temperature of several hundred ° C. This is done to improve the crystallinity. Further, the super resolution reproducing film 13 may be formed by carrying out the sputtering with respect to a metal target under an Ar gas stream containing oxygen. Alternatively, the super resolution reproducing film 13 may be formed by carrying out the sputtering with respect to a sintered compact etc., that is the metal oxide. Further, the super resolution property is possibly varied due to a film formation condition; however, any one of the aforementioned methods can be used as long as a desired property is obtained.

Finally, a UV curing acryl resin or the like is provided on the super resolution film 13 in accordance with the spin coating method in order to protect the information recorded surface, the reflecting film 14, and the super resolution reproducing film 13, and is cured by UV light irradiation. This allows formation of the transparent resin layer 11.

Note that the explanation herein assumes a case where the recording/reproduction beam is irradiated to the information recording medium 1 via the transparent resin layer 11; however, the reproduction beam may be irradiated to an optical information recording medium of the present invention via the substrate 12. In this case, the optical information recording medium has a similar layer structure to that of the optical information recording medium 1, but is different in that the respective positions of the super resolution reproducing film 13 and the reflecting film 14 are inverse to those in the optical information recording medium 1. In such a structure, it is preferable that the protecting layer be provided on the surface, opposite to the surface meeting the super resolution reproducing film 13, of the reflecting layer 14.

In the structure, it is preferable that the substrate 12 be made of a material which never prevents the reproduction beam from passing therethrough, and which renders appropriate strength to the optical information recording medium. Examples of the material include: (i) glass; (ii) thermoplastic transparent resins such as polycarbonate, amorphous polyolefin, thermoplastic polyimide, PEN (polyethernitrile), and PES (polyethersulfone); (iii) heat-curing transparent resins such as heat-curing polyimide and UV-curing acryl resin; and (iv) a combination of them. It is appropriate that the substrate 12 has normally a thickness of approximately 0.3 mm to approximately 1.2 mm.

In this structure, the protecting layer may be made of any material that can protect the super resolution reproducing film 13 and the reflecting film 14. Specifically, the protecting layer may be made of the material of which the substrate 12 is made. Note that the protecting layer may be either transparent or opaque. It is appropriate that the protecting layer normally has a thickness of approximately 1 μm to approximately 100 μm.

Further, it is preferable that the pits and/or the grooves be provided on only one surface of the substrate 12 of the optical information recording medium of the present invention as is the case with the optical information recording medium 1; however, the pits and/or the grooves may be provided on the both surfaces of the substrate 12.

The wavelength corresponding to the optical absorption edge is changed as described above; however, the optical absorption edge and the degree of the shift of the wavelength corresponding to the optical absorption edge vary according to the material of which the super resolution reproducing film 13 is made. Moreover, the degree of the change in the transmittivity varies according to (i) a relative magnitude between the optical absorption edge wavelength and the wavelength of the reproduction beam, and (ii) a relative position between the optical absorption edge wavelength and the wavelength of the reproduction beam. Therefore, a test was carried out so as to find a preferable range in which the transmittivity is changed. The test used the following concrete optical information recording mediums.

Specifically, the following six types of optical information recording medium were used for the test: Examples 1 through 3, and Comparative Examples 1 through 3.

Example 1 corresponds to an optical information recording medium in which a transparent resin layer 11, a super resolution reproducing film 13, a reflecting film 14, and a substrate 12 are provided in this order from the side via which the light beam enters. The transparent resin layer 11 has a film thickness of approximately 0.1 mm. The super resolution reproducing film 13 is made of a ZnO film having a film thickness of approximately 140 nm. The reflecting film 14 is made of an AlNi alloy film having a film thickness of approximately 50 nm. The substrate 12 has an inner surface on which pits made up of a pattern of rises and recesses corresponding to information. The wording "inner surface" of the substrate 12 refers to the surface facing the reflecting film 14.

Example 2 corresponds to an optical information recording medium having the same structure as that of Example 1 except that a $CeO_2$ film is used for the super resolution reproducing film 13 instead of the ZnO film.

Example 3 corresponds to an optical information recording medium having the same structure as that of Example 1 except that a $TiO_2$ film is used for the super resolution reproducing film 13 instead of the ZnO film. The $TiO_2$ film is formed while the substrate 12 is heated at a temperature of 500° C. Further, the substrate 12 is made of glass in which the rises and recesses or grooves are never deformed at a temperature of 500° C.

Comparative Example 1 corresponds to an optical information recording medium having a structure similar to that of Example 1 and having no super resolution film 13. Specifically, Comparative Example 1 provides an optical information recording medium in which a transparent resin layer 11, a reflecting film 14, and a substrate 12 are provided in this order from the side via which the light beam enters. The transparent resin layer 11 has a film thickness of approximately 0.1 mm. The reflecting film 14 is made of an Al film having a film thickness of approximately 30 nm.

Comparative Example 2 corresponds to an optical information recording medium having the same structure as that of Example 1 except that a $SiN_4$ film is used for the super resolution reproducing film 13 instead of the ZnO film.

Comparative Example 3 corresponds to an optical information recording medium having the same structure as that of Example 3 except that: a $TiO_2$ film is used for the super resolution reproducing film 13 but the $TiO_2$ film is formed while the substrate 12 is not heated. The other conditions in forming the $TiO_2$ film are the same as those in Example 3.

The following explains properties of the materials of which the super resolution reproducing films 13 of the six optical information recording mediums are made, respectively. Firstly carried out was a check of crystallinity by using a structural analysis employing X ray crystal diffraction. The structural analysis employing the X ray crystal diffraction was carried out with respect to each of the six samples which respectively corresponded to the aforementioned six optical information recording mediums and which respectively did not have the transparent resin layers. See Table 1 for the results of this.

TABLE 1

| | Crystalline Structure | Surfaces of Crystals Aligned in Normal Line of Film Surface | Optical Absorption Edge (nm) | Super Resolution Effect |
|---|---|---|---|---|
| Example 1 | ZnO (wurtzite type) | (002) | 375 | ○ |
| Example 2 | $CeO_2$ (fluorite type) | (200) | 344 | ○ |
| Example 3 | $TiO_2$ (anatase type) | (004) | 379 | ○ |
| Comparative Example 1 | | | | X |
| Comparative Example 2 | Amorphous | | <300 | X |
| Comparative Example 3 | Amorphous | | 348 | X |

For convenience of the measuring device, the crystallinity of each of the super resolution reproducing films 13 of the six optical information recording mediums was analyzed in the direction of the normal line of the surface (film surface) of the super resolution reproducing film 13. However, in cases where no crystallinity is found in the direction of the normal line in which the crystallinity is most likely to be obtained and in which the crystals are most likely to be aligned, it is considered that no crystallinity and no cyclic orderly structure are found in the thin film as described above. On the other hand, in cases where the crystallinity is found in the super resolution reproducing film 13, Table 1 indicates (i) a type of crystalline structure, and (ii) surfaces of the crystals preferentially aligned in the direction of the normal line of the film surface. Note that, it is publicly known that $TiO_2$ can have either one of a rutile type crystalline structure and an anatase type crystalline structure at a room temperature. The measurement clarified that the $TiO_2$ film formed under the conditions of Example 3 has the anatase type crystalline structure at the room temperature.

Further, the optical absorption edge wavelength was found as follows. That is, an absorption coefficient was found in accordance with the transmittivity spectrum of each of the samples. Then, theoretical calculation for a direct energy-gap semiconductor is carried out.

Indicated by "o" in Table 1 is a case where the super resolution reproducing effect was exhibited. Indicated by "x" is a case where the super resolution reproducing effect was not exhibited. No super resolution reproducing film 13 is provided in Comparative Example 1, so that Comparative Example 1 in Table 1 has only the part concerning whether or not the super resolution reproducing effect was exhibited.

FIG. 5 illustrates wavelength dependencies of the transmittivity of the ZnO film that serves as the super resolution reproducing film 13 of Example 1, and that has a film thickness of approximately 140 nm. That is, FIG. 5 illustrates transmittivity spectrums of a combination of (i) a ZnO film which is formed, for a spectral characteristics evaluation, on a glass substrate (Corning 7059) so as to have a film thickness of 140 nm that is as thick as that of Example 1, and (ii) the glass substrate.

Figure 7:
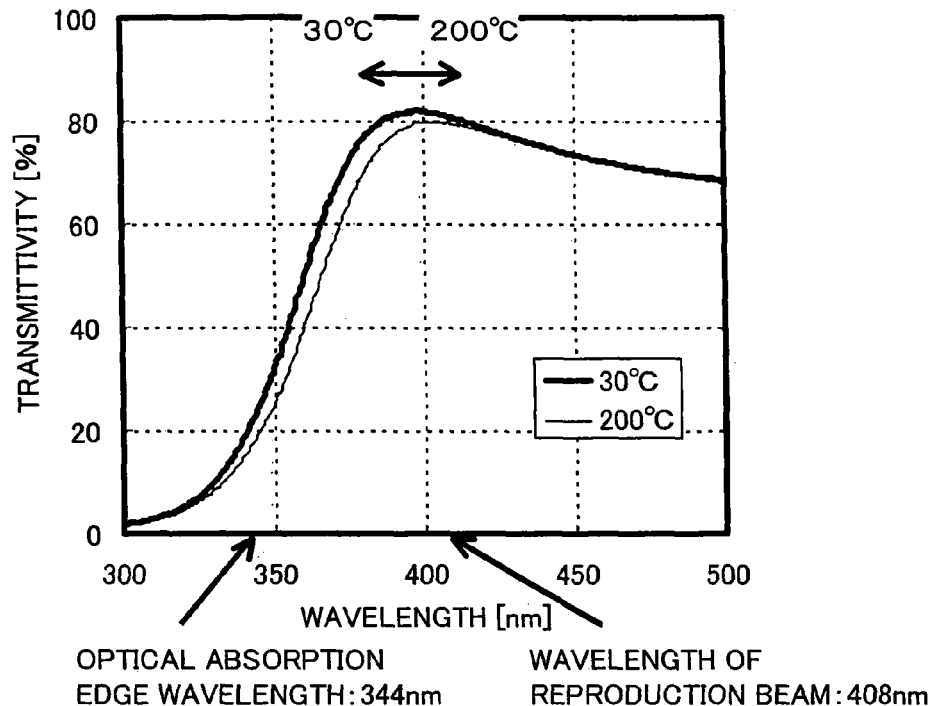
FIG. 7 is a graph illustrating one example of a change of the spectroscopic transmittivity property of the super resolution reproducing film of the optical information recording medium (Example 2) according to the present invention in response to a temperature change.
Figure 8:
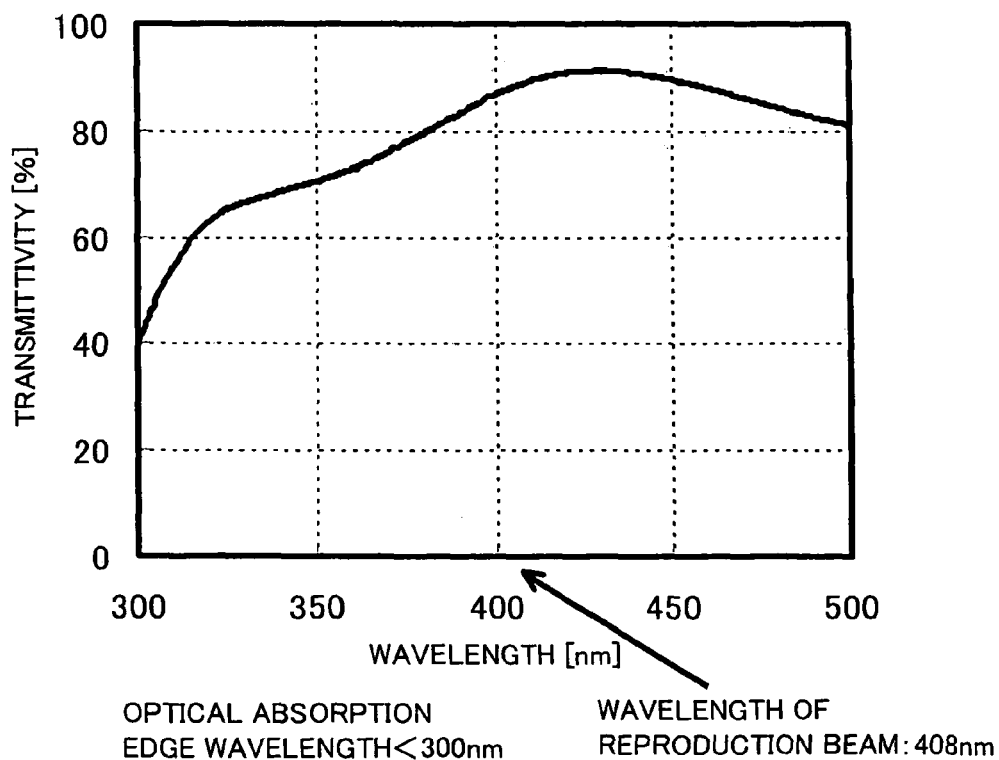
FIG. 8 is a graph illustrating one example of a change of the spectroscopic transmittivity property of a reproducing film of an optical information recording medium of Comparative Example 2 in response to a temperature change.

FIG. 7 illustrates wavelength dependencies of the transmittivity of the $CeO_2$ film of Example 2 (film thickness of approximately 140 nm). FIG. 8 illustrates transmittivity spectrums of the $Si_3N_4$ film of Comparative Example 2 (film thickness of 140 nm).

Each of FIG. 5 and FIG. 7 illustrates (i) the transmittivity spectrum obtained at a temperature of 30° C., and (ii) the transmittivity spectrum obtained at a temperature of 200° C. This clarifies that the temperature increase causes the change of the optical property. Further, it was confirmed that: when the temperature falls down from 200° C. to 30° C., the spectrum coincides with the spectrum obtained at the temperature of 30° C. before the temperature increase. In other words, it was confirmed that the optical property reversibly changes in response to the temperature change.

In the meanwhile, the transmittivity of the $Si_3N_4$ film shown in FIG. 8 was decreased in the vicinity of the wavelength of 300 nm; however, such a decrease was also found when measuring only the transmittivity of the glass substrate. For this reason, the last mentioned decrease is considered to be caused by absorption by the glass substrate, such that such absorption may be ignored. In other words, the transmittivity of the $Si_3N_4$ film that is a dielectric (insulator) is decreased as the wavelength approaches to 300 nm, However, however, the optical absorption edge was not found unlike in the aforementioned ZnO film and the $CeO_2$ film. According to the transmittivity spectrum shown in FIG. 8, it is estimated that the $Si_3N_4$ film has an optical absorption edge wavelength of 300 nm or less. This indicates that the band gap of the $Si_3N_4$ film exceeds 4 eV, and therefore proves that the $Si_3N_4$ film is a dielectric.

Further, the optical absorption edge wavelength of the $Si_3N_4$ film of Comparative Example 2 corresponds to such a short wavelength of 300 nm or less. However, it was confirmed that the light having a wavelength of slightly longer than 400 nm, or the light having a wavelength shorter than that wavelength is absorbed. It is estimated that the wavelength dependency represented by such a gradual light absorption was obtained because the $Si_3N_4$ film was in the amorphous state. The reason for this is explained in the beginning of the present embodiment. Further, as shown in Table 1, the result obtained through the X ray diffraction confirmed that the $Si_3N_4$ film was amorphous. This is because temperature dependency of the $Si_3N_4$ was not found under conditions that the wavelength region corresponding to the absorption done by the glass substrate was disregarded. In other words, it was not found that the transmittivity of the $Si_3N_4$ film was not shifted in response to the temperature change as shown in the spectrum. In addition, the temperature dependency of the $Si_3N_4$ is not illustrated in FIG. 8.

Figure 9:
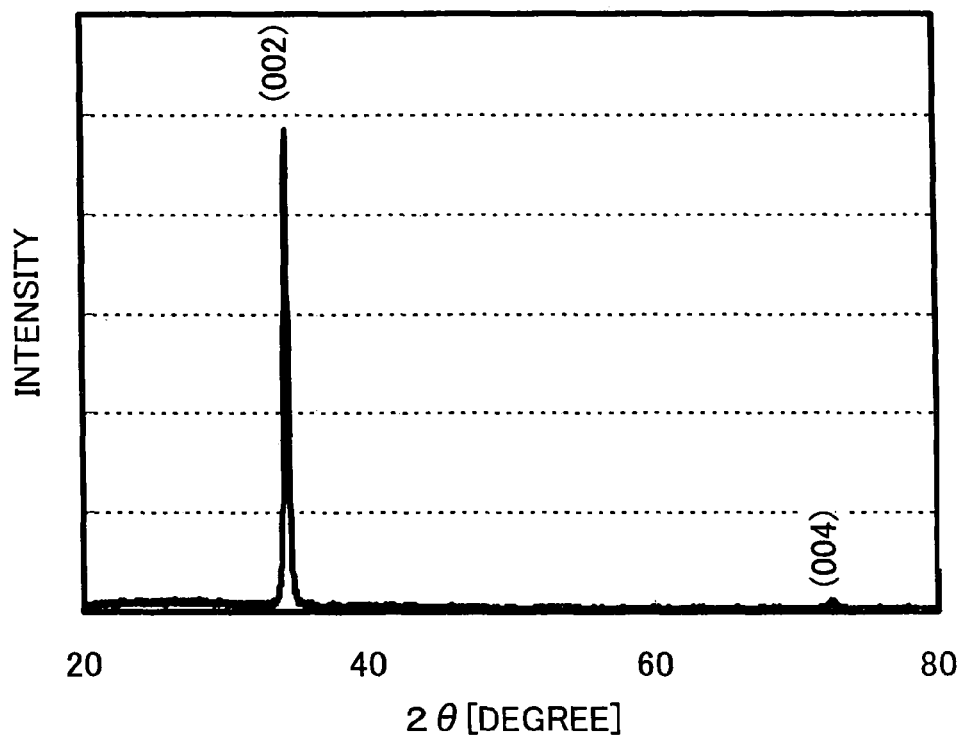
FIG. 9 is a graph illustrating one example of an X ray diffraction measurement carried out with respect to the super resolution reproducing film of the optical information recording medium (Example 1) according to the embodiment of the present invention.
Figure 10:
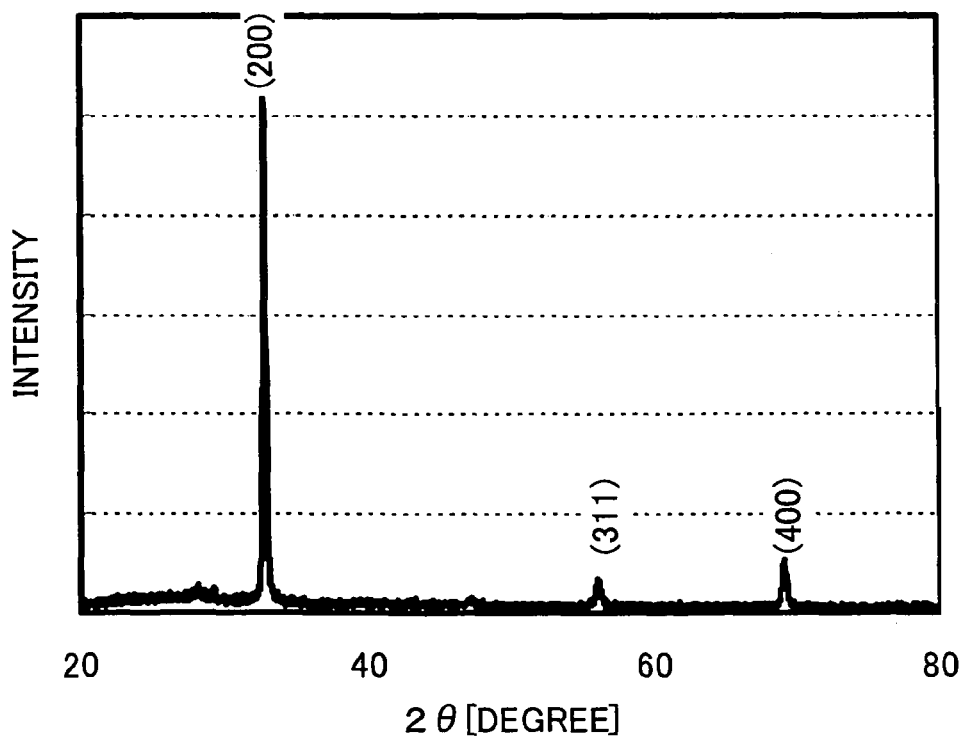
FIG. 10 is a graph illustrating one example of an X ray diffraction measurement carried out with respect to the super resolution reproducing film of the optical information recording medium (Example 2) according to the embodiment of the present invention.
Figure 11:
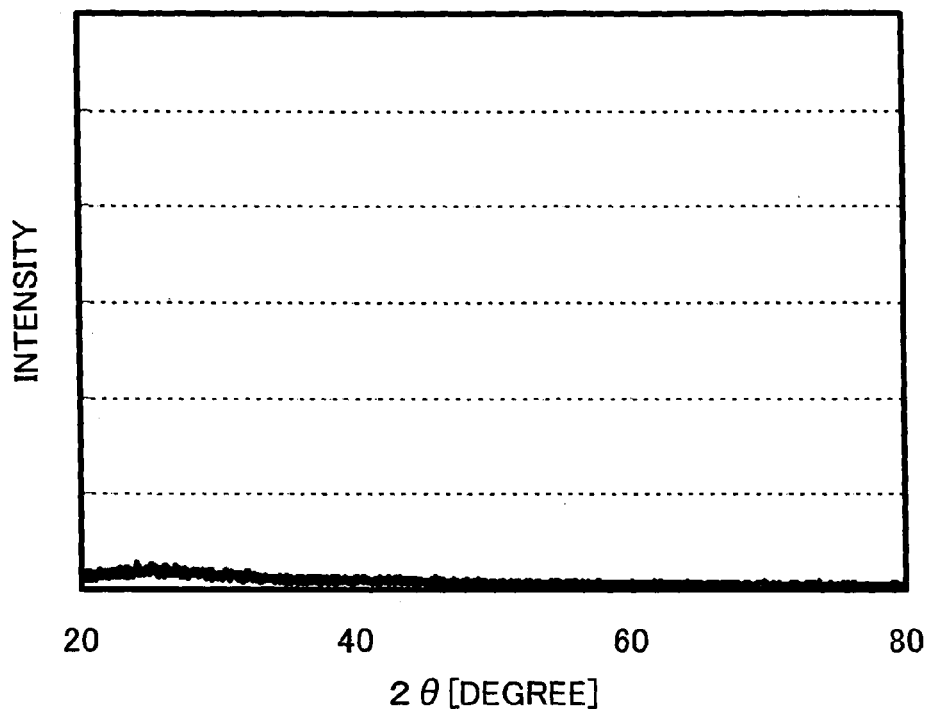
FIG. 11 is a graph illustrating one example of an X ray diffraction measurement carried out with respect to the reproducing film of the optical information recording medium of Comparative Example 1.

Next, FIG. 9, FIG. 10, and FIG. 11 illustrate the results of the X ray diffraction carried out with respect to the samples having the optical properties shown in FIG. 5, FIG. 7, and FIG. 8, respectively. That is, FIG. 9 is a diagram illustrating the X ray diffraction peak of the ZnO film, and FIG. 10 is a diagram illustrating the X ray diffraction peak of the $CeO_2$ film, and FIG. 11 is a diagram illustrating the X ray diffraction peak of the $Si_3N_4$ film. The measurement is carried out in accordance with the 2θ/θ scan X ray diffraction method using Cu-Kα1 radiation.

FIG. 9 clarifies that the (002) surface diffraction peak was observed in the ZnO film, so that the crystals were aligned such that the (002) surfaces of the crystals were oriented in the direction of the normal line of the ZnO film. Generally, it is known that crystals in ZnO (wurtzite type) are hexagon crystals and are likely to be aligned in the c axis, and the same result was obtained in this sample. FIG. 10 clarifies that the crystals were aligned in the $CeO_2$ film such that the (200) surfaces of the crystals were preferentially oriented in the direction of the normal line of the $CeO_2$ film. FIG. 11 clarifies that: no diffraction peak was observed, so that the $Si_3N_4$ film did not have the crystallinity, i.e., was amorphous. Note that the substrate was not heated while forming each of the ZnO film and the $CeO_2$ film thereon, as is the case with Examples 1 and 2. The measurement results clarify that good crystallinity was obtained in each of the ZnO film and the $CeO_2$ film even when the substrate was not heated. Therefore, the use of these materials makes it possible to omit the process of heating the substrate for the sake of the crystallization. This is beneficial in manufacturing the optical information recording medium of the present invention.

See Table 1 for the results of the X ray crystal diffraction carried out with respect to the $TiO_2$ films (there are no figures illustrating the results). Specifically, in cases where each of the $TiO_2$ films was formed without heating the substrate as is the case with Comparative Example 3, the $TiO_2$ film did not have the crystal structure, i.e., was amorphous, and had an estimated optical absorption edge wavelength of 348 nm. Further, the decrease in the transmittivity spectrum of the $TiO_2$ film was broad. Further, as is the case with the $Si_3N_4$ film, the transmittivity spectrum was not shifted in response to the change of the temperature.

In contrast, in cases where the $TiO_2$ film was formed with the substrate (the substrate 12 is a glass substrate in this case) heated at 500° C. as is the case with Example 3, the $TiO_2$ film had crystallinity that crystals were aligned in such a manner that the anatase (004) surfaces thereof are oriented in the direction of the normal line of the $TiO_2$ film. The $TiO_2$ film had an optical absorption edge wavelength of approximately 379 nm. The transmittivity spectrum was shifted in response to the change of the temperature. Further, the change in the optical property of the $TiO_2$ film was observed.

Note that the samples, i.e., the ZnO film, the $CeCO_2$ film, either the crystalline $TiO_2$ film or the amorphous $TiO_2$ film, and the $Si_3N_4$ film were heated under a nitrogen atmosphere so as to have a temperature of 200° C. for the sake of preventing oxidation, and then the samples were subjected to the X ray diffraction measurement again. When the samples cooled down to the room temperature after the measurement, the X ray diffraction measurement was carried out thereto again. The results were substantially the same as the initial results, respectively. Specifically, the diffraction peak was observed at the same angle in each of the samples having the crystal structures, and the amorphous samples were still amorphous. Each of the materials of which the samples are respectively made has a high melting point, so that the samples are substantially never changed in terms of either the crystalline structure or the amorphous state by the temperature change from 30° C. to 200° C. Note that the measurement herein was carried out only at temperature of 30° C. and 200° C.; however, it is difficult to consider that the crystalline structure is changed at a temperature falling within a range between 30° C. and 200° C. and then is back to the initial state, as long as the material intrinsically has a special phase transition point. Further, see the change in the transmittivity spectrum. Except the transmittivity corresponding to the band gap change, the transmittivity was not substantially changed in response to the temperature change. Therefore, it is considered that the crystalline structure was retained and no phenomenon causing the change in the crystalline structure occurred even when the temperature was changed.

A signal evaluation was carried out with respect to each of the optical information recording mediums of Examples 1 through 3 and Comparative Examples 1 through 3, i.e., with respect to each of the optical information recording mediums which include the super resolution reproducing films 13 made of the materials having the aforementioned structures and the optical properties. The following explains the results thereof.

An evaluation apparatus used for the signal evaluation was the aforementioned evaluation system. The signal evaluation was carried out under conditions that the reproduction wavelength was 408 nm, the NA was 0.65, and the linear velocity was 3 m/s.

The signal evaluation was carried out by evaluating the carrier wave noise ratio C/N of a signal generated from a continuous pit row in which pits and spaces both having the same length were alternately provided (for example, the pits were provided every 0.28 μm in the pit row, in cases where each of the pits had a length of 0.4 μm). The cut-off frequency was λ/2NA in the optical system, so that the resolution limit is the half of the cut-off frequency, i.e., λ/4NA. Therefore, the resolution limit of the optical system corresponds to a pit length of 0.16 μm. When the evaluation apparatus detects a carrier wave noise ratio C/N smaller than the carrier wave noise ratio C/N of a signal generated from a continuous pit row in which each pit has a length of 0.16 μm, it is proved that the super resolution reproduction is realized.

Figure 12:
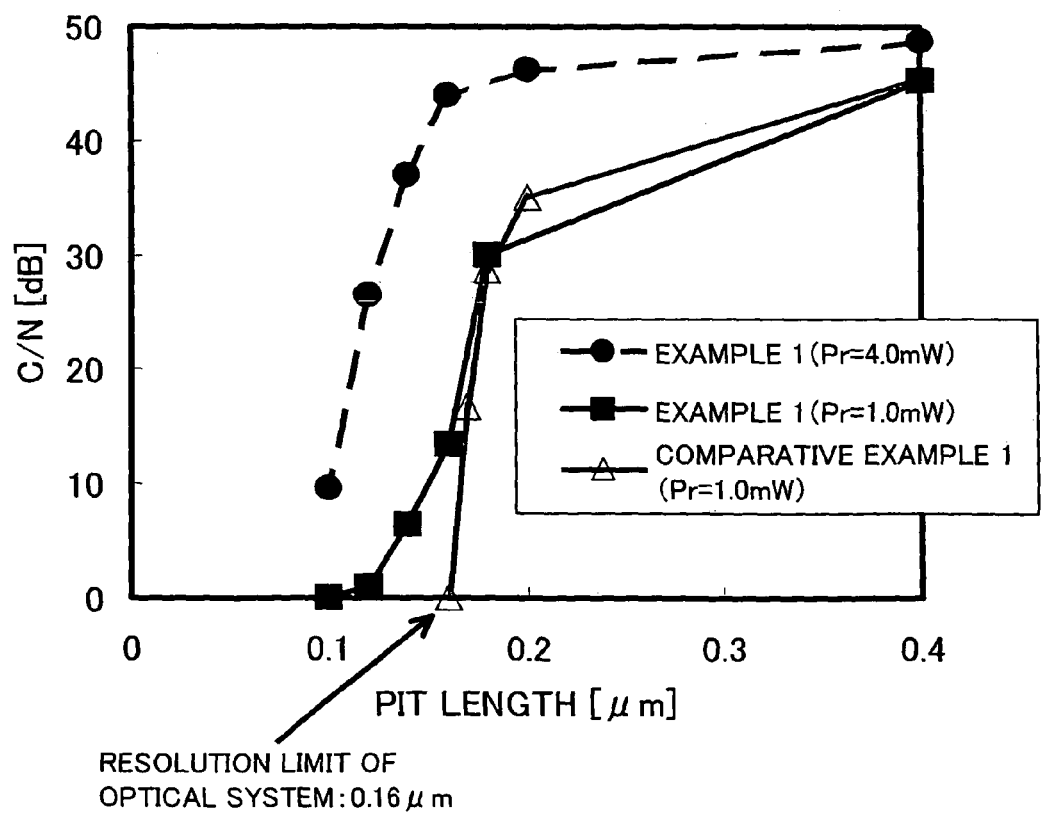
FIG. 12 is a graph illustrating results of evaluating signals respectively generated from (i) the optical information recording medium (Example 1) according to the embodiment of the present invention and (ii) the optical information recording medium of Comparative Example 2, i.e., is a graph illustrating how CNR of each of the signals depends on a pit length.

FIG. 12 illustrates the results of evaluating, with the use of the evaluating apparatus (optical system), the respective carrier wave noise ratios C/N of signals generated from the optical information recording mediums of Example 1 and Comparative Example 2. FIG. 12 has a horizontal axis representing the pit length, and a vertical axis representing each carrier wave noise ratio C/N. Further, the evaluation was carried out under conditions that: a reproduction laser beam having a power Pr of either 1 mW or 4 mW was irradiated to the optical information recording medium of Example 1, and a reproduction laser beam having a power Pr of 1 mW was irradiated to the optical information recording medium of Comparative Example 1. The value of the carrier wave noise ratio C/N of Example 1 was maximum when the reproduction laser beam having the power Pr of 4 mW was irradiated from (i) the optical system whose resolution limit corresponded to the pit length of 0.16 μm, to (ii) the optical information recording medium of Example 1. For this reason, the power Pr of 4 mW is referred to as "optimum power". FIG. 12 does not illustrate the result obtained in cases where the reproduction laser beam having the power Pr of 4 mW was irradiated to the optical information recording medium of Comparative Example 1. This is because the result was the same as the result obtained in cases where the power Pr was 1 mW.

The results clarify that the carrier wave noise ratio C/N was 0 when the optical information recording medium of Comparative Example 1 had a pit length of 0.16 μm or so. This indicates that the pit length corresponded to the resolution limit of the optical system. On the other hand, when the optical information recording medium of Example 1 had a slightly short pit and the reproduction laser beam having the power Pr of 1 mW was irradiated thereto, the carrier wave noise ratio C/N had a positive value. However, the carrier wave noise ratio C/N was close to 0 when the pit length substantially corresponded to the resolution limit.

In the meanwhile, consider a case where the reproduction laser beam having the power Pr of 4 mW was irradiated to the optical information recording medium of Example 1. In this case, the carrier wave noise ratio C/N was approximately 40 dB or greater even when the optical information recording medium had continuously (repeatedly) provided pits each having a length of 0.16 μm corresponding to the resolution limit of the optical system. Moreover, the carrier wave noise ratio C/N was approximately 30 dB or greater even when the optical information recording medium has continuously (repeatedly) provided pits each having a length of 0.14 μm or 0.12 μm. That is, the super resolution effect was exhibited which allows the reproduction of the optical information recording medium having the pits each having a length shorter than the resolution limit of the optical system, with the result that the resolution limit can be reduced to approximately the half of the pit length of 0.16 μm. It is considered that this was achieved because the optical property of the super resolution reproducing film 13 of the optical information recording medium was changed in the high temperature portion (region) that was emerged in the beam spot of the laser light irradiated to the optical information recording medium.

As such, when the power Pr is so weak as to be 1 mW, the temperature increase in the beam spot is low, with the result that a difference in the temperature is small between (i) the low temperature portion having a temperature substantially equal to the room temperature, and (ii) the high temperature portion. Accordingly, the change in the optical property is small in the beam spot. In contrast, when the power Pr is so strong as to be 4 mW, the temperature in the high temperature portion becomes high, with the result that the difference in the temperature is large between (i) the low temperature portion having a temperature substantially equal to the room temperature, and (ii) the high temperature portion. Accordingly, the optical properties in the beam spot become greatly different from each other. It is considered that this allows the super resolution reproducing effect.

Figure 13:
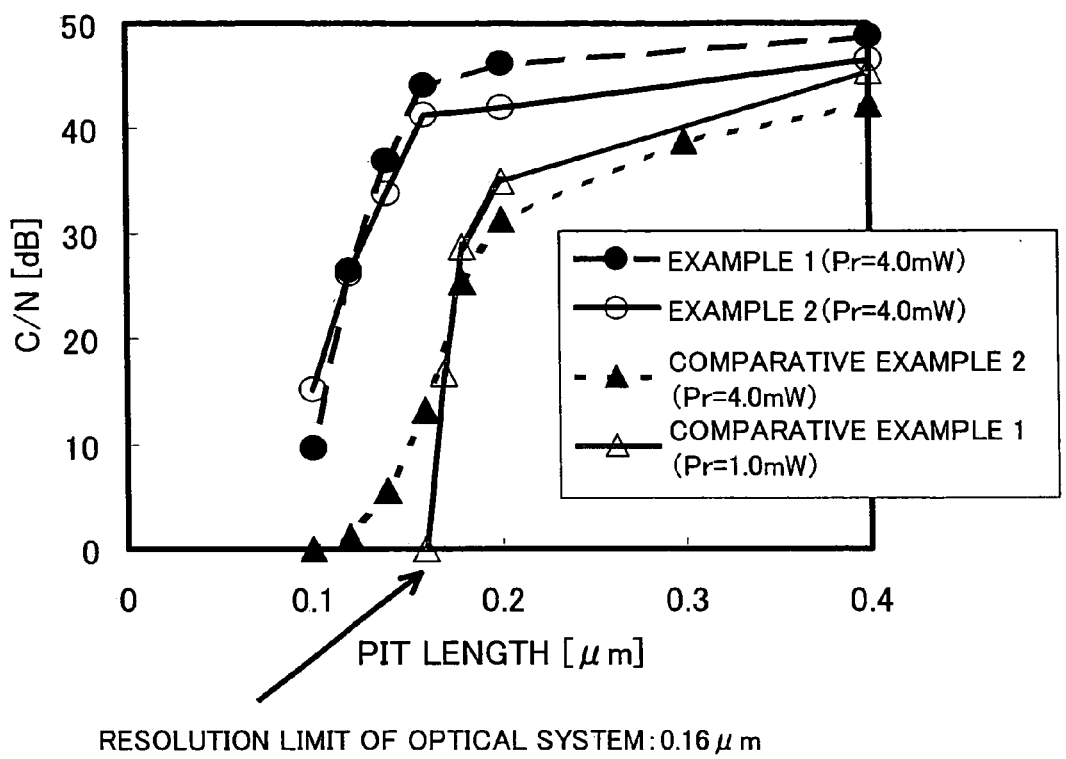
FIG. 13 is a graph illustrating results of evaluating signals respectively generated from (i) the optical information recording mediums (Examples 1 and 2) according to the embodiment of the present invention and (ii) the optical information recording mediums of Comparative Examples 1 and 2, i.e., is a graph illustrating how CNR of each of the signals depends on the pit length.

Next, FIG. 13 illustrates the results of evaluating the carrier wave noise ratios C/N of the signals generated from the optical information recording mediums of Example 1, Example 2, Comparative Example 2, and Comparative Example 1, respectively. The result corresponding to Comparative Example 1 is illustrated in order to show the resolution limit of the optical system. Further, the evaluation was carried out under conditions that the reproduction laser beam having a power Pr of 4 mW was also irradiated to each of the optical information recording mediums of Example 2 and Comparative Example 2.

FIG. 13 clarifies that: the super resolution reproducing effect was exhibited in Example 2 in which the super resolution reproducing film was the $CeO_2$ film, but no super resolution reproducing effect was exhibited in Comparative Example 2 in which the super resolution reproducing film was the $Si_3N_4$ film. As such, it was found that the super resolution reproducing effect is exhibited in a structure such as those of Examples 1 and 2, i.e., a structure having a super resolution reproducing film that has an optical absorption edge wavelength relatively close to the reproduction wavelength, and that has crystals which are likely to be aligned preferentially in the direction of the normal line of the surface of the super resolution reproducing film, and that has an optical property which is therefore changed in response to a band gap energy change caused by a temperature change. A specific example of such a super resolution reproducing film is a ZnO film or a $CeO_2$ film. In contrast, no super resolution reproducing effect was exhibited in Comparative Example 2 having the super resolution reproducing film that had an optical absorption edge wavelength separated from the reproduction wavelength, and that was in the amorphous state, and that had the optical property which was never changed in response to the temperature change.

Figure 14:
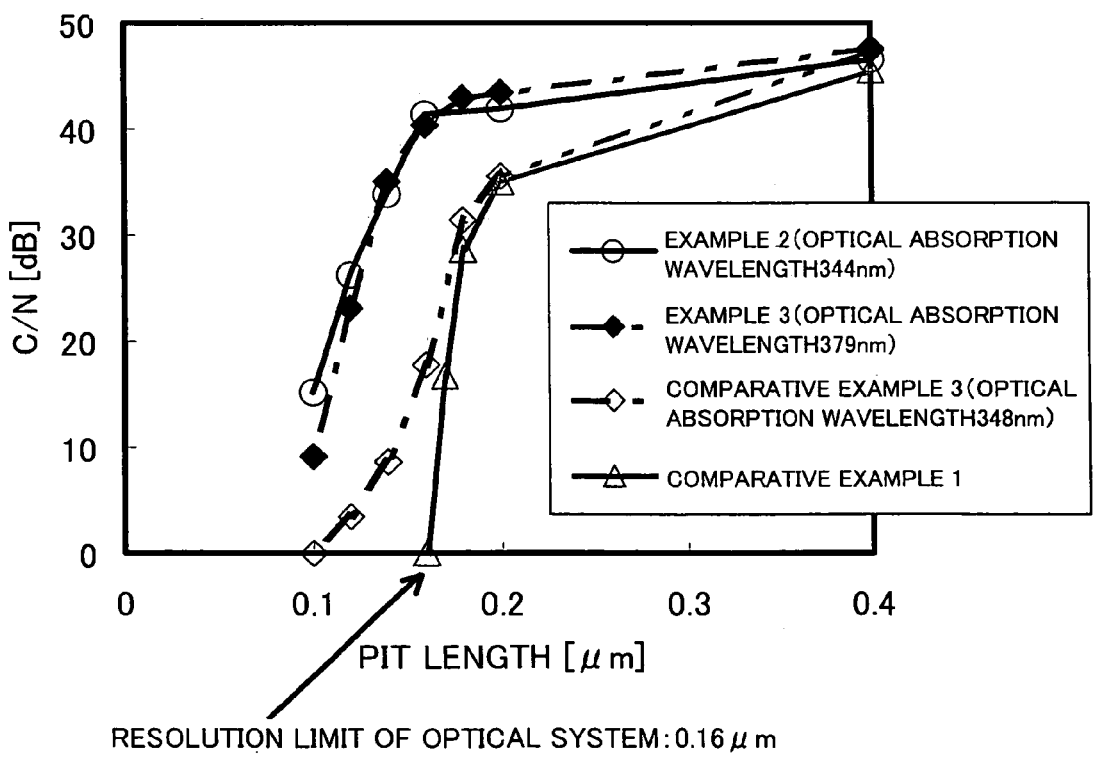
FIG. 14 is a graph illustrating results of evaluating signals respectively generated from (i) the optical information recording mediums (Examples 2 and 3) according to the embodiment of the present invention and (ii) the optical information recording mediums of Comparative Example 1 and 3, i.e., is a graph illustrating how CNR of each of the signals depends on a pit length.

Further, FIG. 14 illustrates the results of evaluating the carrier wave noise ratios C/N of the signals generated from the optical information recording mediums of Example 2, Example 3, Comparative Example 3, and Comparative Example 1, respectively. The result corresponding to Comparative Example 1 is illustrated in order to show the resolution limit of the optical system. Further, the evaluation was carried out under conditions that: the reproduction laser beam having a power Pr of 1 mW was irradiated to the optical information recording medium of Comparative Example 1 and the reproduction laser beam having a power Pr of 4 mW was irradiated to the Example 2 as is the case with the evaluations shown in FIG. 13, and the reproduction laser beam having a power Pr of 4 mW was also irradiated to each of the optical information recording mediums of Example 3 and Comparative Example 3. Further, the optical absorption edge wavelengths are illustrated in FIG. 14, too.

The following explains the respective optical information recording mediums of Example 3 and Comparative Example 3, with reference to FIG. 14. Each of the optical information recording mediums of Example 3 and Comparative Example 3 uses the super resolution reproducing film made of $TiO_2$. However, the $TiO_2$ film of the optical information recording medium of Example 3 was formed while heating the substrate at 500° C. On the other hand, the $TiO_2$ film of the optical information recording medium of Comparative Example 3 was formed without heating the substrate. The other conditions in the film-forming are the same.

The evaluation results clarify that: the crystalline $TiO_2$ film in the optical information recording medium of Example 3 allows the super resolution reproducing effect, whereas the amorphous $TiO_2$ film in the optical information recording medium of Comparative Example 2 allows no super resolution reproducing effect. In other words, the evaluation results clarify that: although the super resolution reproducing films are made of the same material, the super resolution reproducing effect is exhibited in the optical information recording medium of Example 3, and no super resolution reproducing effect is exhibited in the optical information recording medium of Comparative Example 3. Specifically, the super resolution reproducing effect is exhibited in the structure that has crystals which are likely to be aligned preferentially in the direction of the normal line of the surface of the super resolution reproducing film, and that has an optical property which is therefore changed in response to a band gap energy change caused by a temperature change; however, no super resolution reproducing effect is exhibited in the structure having the super resolution reproducing film that is in the amorphous state, and that has an optical property which is never changed in response to the temperature change. Therefore, in terms of the manufacturing, the heating of the substrate upon the formation of the super resolution reproducing film made of $TiO_2$ is beneficial and preferable so as to improve the crystallinity. This allows for the super resolution reproducing effect as is the case with the optical information recording medium of Example 3.

Although the transmittivity spectrum of the optical information recording medium of Comparative Example 3 is distributed broadly, the optical absorption edge wavelength therein is estimated to be approximately 348 nm. This is the substantially the same as the optical absorption edge wavelength (344 nm) in the optical information recording medium of Example 2. However, the super resolution reproducing effect was exhibited only in the optical information recording medium of Example 2. This indicates that: even though the respective optical absorption edge wavelengths in the optical information recording mediums are substantially the same, the super resolution reproducing effect can be obtained in the optical information recording medium having the film in which the crystallinity is good, and in which the band gap energy is uniform in the film, and in which the optical property is changed in response to the temperature change. In other words, it is beneficial that the optical absorption edge wavelength is close to the reproduction wavelength as described above. However, what is more important is that: the crystallinity is good in the super resolution reproducing film, the band gap energy is uniform therein, and the optical property thereof is greatly changed in response to the temperature change.

The above results clarify that: the optical information recording medium of Examples 1 and 2 are beneficial and preferable in terms of the manufacturing. A reason for this is as follows. the crystallinity is good in the super resolution reproducing films respectively made of ZnO and $CeO_2$, even though the substrates are never heated during the film forming. This makes it possible to omit the substrate heating process. Of course, by heating the substrate, each of the above materials has good crystallinity, so that the substrate may be heated during the film forming.

The foregoing description explains Examples 1 through 3 in terms of the crystallinity and the super resolution reproducing effect. Explained next is the alignment property with respect to the surface of the super resolution reproducing film.

Compare Example 3 with Comparative Example 3. The optical information recording medium of Comparative Example 3, which does not allow the super resolution reproducing effect, has the amorphous super resolution reproducing film. On the other hand, the optical information recording medium of Example 3, which allows the super resolution reproducing effect, has the super resolution reproducing film in which the crystals of $TiO_2$ (atanase type) are aligned such that the (004) surfaces thereof are preferentially oriented in the direction of the normal line of the super resolution reproducing film. Similarly, the optical information recording medium of Example 1, which allows the super resolution reproducing effect, has the super resolution reproducing film in which the crystals of ZnO (wurtzite type) are aligned such that the (002) surfaces thereof are preferentially oriented in the direction of the normal line of the surface of the super resolution reproducing film. Moreover, the optical information recording medium of Example 2, which allows the super resolution reproducing effect, has the super resolution reproducing film in which the crystals of $CeO_2$ (fluorite type) are aligned such that the (200) surfaces thereof are preferentially oriented in the direction of the normal line of the surface of the super resolution reproducing film.

As described above, in cases where the super resolution reproducing film is a crystalline thin film, the crystals are generally aligned preferentially in the direction of the normal line of the surface of the super resolution reproducing film. Therefore, in cases where the thin film is such a crystalline thin film in which crystals are at least preferentially aligned in the direction of the normal line of the super resolution reproducing film, the thin film is so judged as to have the crystalline structure, so that the super resolution reproducing effect can be expected. The reproduction light (beam) is collected by the lens; however, the beam waist of the reproduction light is substantially parallel to the direction of the normal line of the super resolution reproducing film, so that the direction in which the reproduction light enters coincides with the direction of the normal line thereof. The wording "beam waist" refers to a portion by which signals are actually read out, and which has the strongest light intensity in the reproduction light. In cases where the super resolution reproducing film has the crystalline structure in which the crystals are preferentially aligned in this direction, the crystalline structure is more like a mono-crystal structure in which crystals are orderly aligned, rather than a poly-crystal structure in which the crystals are randomly oriented. This makes it possible that the material of which the super resolution reproducing film is made exhibits its intrinsic property relatively desirably.

Important in the present application is the uniformity of the band gap property, i.e., the optical absorption edge over the super resolution reproducing film. In cases where the super resolution reproducing film has such a crystalline structure that the crystals are aligned in the direction of the normal line of the super resolution reproducing film, the band gap energy is more uniform in this direction. Accordingly, the optical property of the super resolution reproducing film is greatly changed in response to the temperature change. This is considered to allow for the super resolution reproducing effect.

The foregoing description explains Examples 1 through 3 in terms of the super resolution reproducing effect. Explained next is the reproduction stability and the durability.

Due to the performance of the spectroscopic apparatus, the temperature was changed from 30° C. to 200° C. in the measurement as shown in FIG. 5, FIG. 6, and FIG. 9. However, in the actual optical information reproduction, the high temperature portion of the beam spot is caused to have a temperature higher than 200° C. For this reason, it is considered that the optical property of the super resolution reproducing film is changed to be greater than the optical property change illustrated in each of FIG. 5 through FIG. 7. However, the ZnO used in Example 1 has a melting point of 1,975° C., and the $CeO_2$ used in Example 2 has a melting point of 1,950° C. The melting points are incomparably higher than the maximum temperature reachable by the laser irradiation (the maximum temperature is a recording temperature of approximately 600° C. in a phase change recording medium of currently implemented optical disks). For this reason, it is considered that the ZnO and the $CeO_2$ are never structurally changed. This indicates that the super resolution reproduction never causes deterioration of the super resolution reproducing film.

Here, the super resolution reproduction was repeatedly carried out with a power Pr of 4 mW, with respect to the optical information recording mediums of Examples 1 and 2. Each of the optical information recording mediums has pits each having a length of 0.14 μm smaller than the resolution limit. Even though each of the optical information recording mediums of Examples 1 and 2 was reproduced 100,000 times, the C/N value was maintained to be the same as the initial value. That is, the optical information recording mediums were never deteriorated. This allows realization of a practically usable optical information recording medium that is excellent in terms of the reproduction stability, the durability, and the reliability.

Similarly, the evaluation of the reproduction stability was carried out with respect to the optical information recording medium of Example 3 in the same manner as that of the evaluation carried out with respect to the optical information recording mediums of Example 1 and 2. Even though the optical information recording medium of Example 3 was reproduced 100,000 times, the C/N value was maintained to be the same as the initial value. That is, the optical information recording medium was never deteriorated. This allows realization of a practically usable optical information recording medium that is excellent in terms of the reproduction stability, the durability, and the reliability. The $TiO_2$ has a high melting temperature of approximately 1,800° C.; however, it is known that crystal transition occurs from the atanase type to the rutile type at a temperature (transition temperature) equal to or lower than 1,800° C., and that the transition temperature is greatly influenced by impurities and therefore varies in a range from 500° C. to 800° C. In the evaluation, the reproduction stability of the optical information recording medium of Example 3 was confirmed to be sufficient. This indicates that the $TiO_2$ was never structurally changed, i.e., was maintained to be in the initial state (anatase type). Therefore, it is considered that the temperature of the optical information recording medium of Example 3 never exceeded a temperature of 500° C. or greater.

As such, the super resolution reproducing film of the optical information recording medium of each of Examples is never deteriorated by the temperature increase caused by the reproduction operation, and has an optical property that is never changed in response to the temperature change. Specifically, an optical property, such as the transmittivity spectrum, obtained before the reproduction is substantially the same as the optical property obtained after the reproduction. Therefore, the super resolution reproducing film is never structurally changed due to the reproduction, i.e., the crystalline structure of the super resolution reproducing film is maintained during the reproduction, but the band gap is changed so as to change the optical property.

Each of the ZnO film of Example 1, the $CeO_2$ film of Example 2, and the $TiO_2$ film of Example 3 is used as the super resolution reproducing film 13, and has such a high refractive index n of approximately 2.0 or greater, and is substantially transparent to solely have a transmittivity of 50% or greater. This makes it possible to control the super resolution reproducing effect by using the light interference, and to design the super resolution reproducing film that is so controlled as to allow the super resolution reproducing effect. This is preferable. Further, the transmittivity is high as such, so that light utilization efficiency is high. This indicates that the ZnO film, the $CeO_2$ film, and the $TiO_2$ film are beneficial in cases where the optical information recording medium is provided with a plurality of layers.

Further, in the case where the super resolution reproducing film is made of a single-phase metal oxide consisting of one metal element and oxide as is the case with the present embodiment and Examples, the super resolution reproducing film is more crystalline than (i) a film to which impurities are doped, (ii) an eutectic crystal film, and (iii) a mixed crystal film. Further, it is easy to control the composition of such a super resolution reproducing film, so that the film forming can be carried out with ease. Therefore, such a super resolution reproducing film is advantageous in terms of the manufacturing.

Note that the above description mainly assumes the transmittivity of the super resolution reproducing film 13 as the optical property thereof; however, the index is not limited to the transmittivity as long as the optical property is changed in response to the temperature change.

Examples of the index for the change include: (i) the reflectance of the optical information recording medium 1; (ii) the transmittivity of the super resolution reproducing film 13. Moreover, the index may be any one of (i) the transmittivity of the super resolution reproducing film 13; (ii) the reflectance thereof; (iii) the refractive index thereof; (iv) the complex refractive index thereof; (v) the mortality factor thereof, which is an imaginary part of the transmittivity thereof; (vi) the absorption coefficient thereof, which is an imaginary part of the transmittivity thereof; (vii) the dielectric constant thereof, which is an imaginary part of the refractive index thereof; (vii) the complex dielectric constant thereof, which is an imaginary part of the complex refractive index thereof; and (viii) the loss dielectric constant thereof, which is an imaginary part thereof. Further, the index for use in checking the change may be any optical parameter as long as the object of the present invention is achieved. The object of the present invention is to realize the super resolution reproduction by changing, in response to the temperature change, the optical property of the super resolution reproducing film 13, i.e., the reflectance of the super resolution reproducing film 13 in a part of the spot of the beam irradiated to the optical information recording medium 1.

Embodiment 2

Another embodiment of the present invention will be explained below. For ease of explanation, materials having the equivalent functions as those shown in the drawings pertaining to Embodiment 1 will be given the same reference symbols, and explanation thereof will be omitted here.

Firstly explained is a structure of an optical information recording medium of the present embodiment. See FIG. 15 illustrating the structure of the present embodiment.

Figure 15:
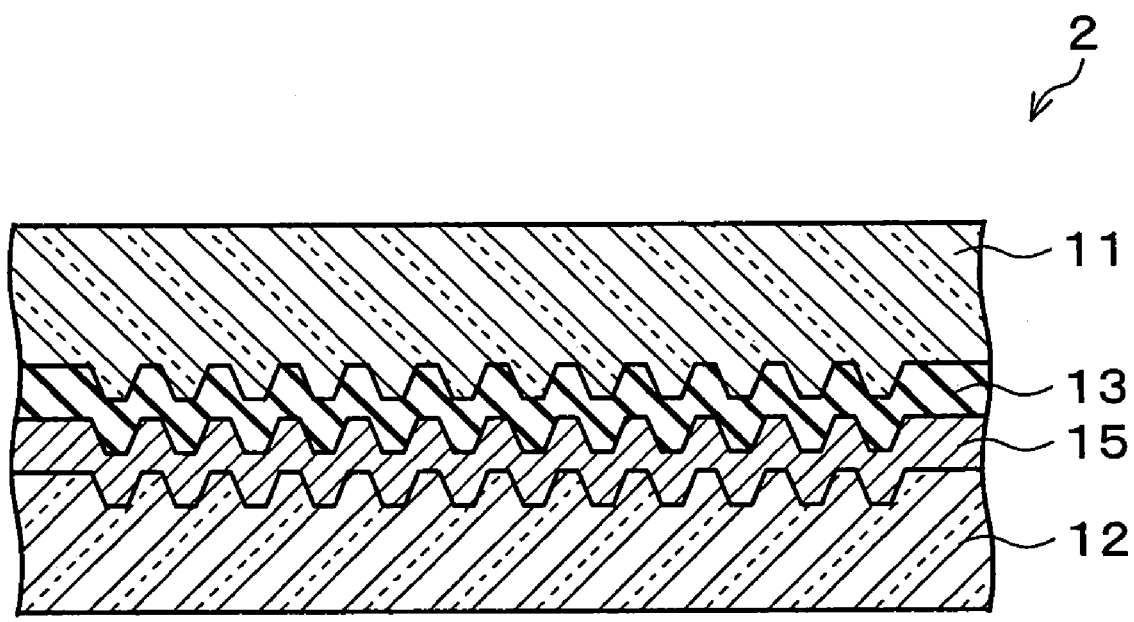
FIG. 15 is a cross sectional view partially illustrating a major portion of an optical information recording medium according to another embodiment of the present invention.

As shown in FIG. 15, the optical information recording medium 2 has a structure obtained by providing a light absorbing film 15 in the optical information recording medium 1 of Embodiment 1 instead of the reflecting film 14. Note that, a reproduction method thereof, a manufacturing method thereof, an evaluation apparatus used herein, and an evaluation method used herein are the same as those in Embodiment 1, respectively.

Unlike the reflecting film 14, the light absorbing film 15 is not made of a metal having a high reflectance. The light absorbing film 15 partially absorbs light used for reproduction of information, with the result that heat is generated. As shown in FIG. 15, the light absorbing film 15 may be provided on the super resolution reproducing film 13. Alternatively, another thin film may be provided between the light absorbing film 15 and the super resolution reproducing film 13. In other words, the light absorbing film 15 may be provided anywhere as long as the light absorbing film 15 partially absorbs the reproduction beam so as to generate the heat.

The light absorbing film 15 assists the temperature increase (see Embodiment 1) in the super resolution reproducing film 13. The reproduction beam irradiated to the structure shown in FIG. 15 causes multiple interferences between the super resolution reproducing film 13 and the light absorbing film 15, with the result that the light is reflected to some extent. However, the light is absorbed in the light absorbing film 15 to some extent, too. The light absorption causes generation of heat, with the result that the super resolution reproducing film 13 is heated by the heat. This makes it possible to efficiently increase the temperature of the super resolution reproducing film 13 with a weaker laser power, as compared with the case of Embodiment 1. This allows the super resolution reproducing effect, i.e., allows improvement of sensitivity (reproduction beam power sensitivity) about the power of the reproduction beam.

A material of which the light absorbing film 15 is not particularly limited as long as the material fairly has a reflectance in the wavelength of the reproduction beam and fairly absorbs the light. A specific example of the material is: (i) semiconductors such as Si and Ge; (ii) a material used as the phase change recording material, such as GeSbTe or AgInSbTe; or (iii) a metal fairly absorbing light, such as Ni or Cu. Note that the optical absorbing film 15 is formed in the same manner as the manner in which the reflecting film 14 described in Embodiment 1 is formed.

Note also that the light absorbing film 15 may be made of any material as long as the desired effect is obtained, i.e., as long as the light absorbing film 15 assists the temperature increase in the super resolution reproducing film 13.

The following specifically explains the optical information recording medium of the present embodiment, with reference to Example 4. The optical information recording medium of Example 4 is arranged as follows.

That is, the optical information recording medium of Example 4 includes the same structure as that of Example 1 except that a Si film having a film thickness of approximately 50 nm is provided as the light absorbing film 15 instead of the reflecting film 14.

Figure 16:
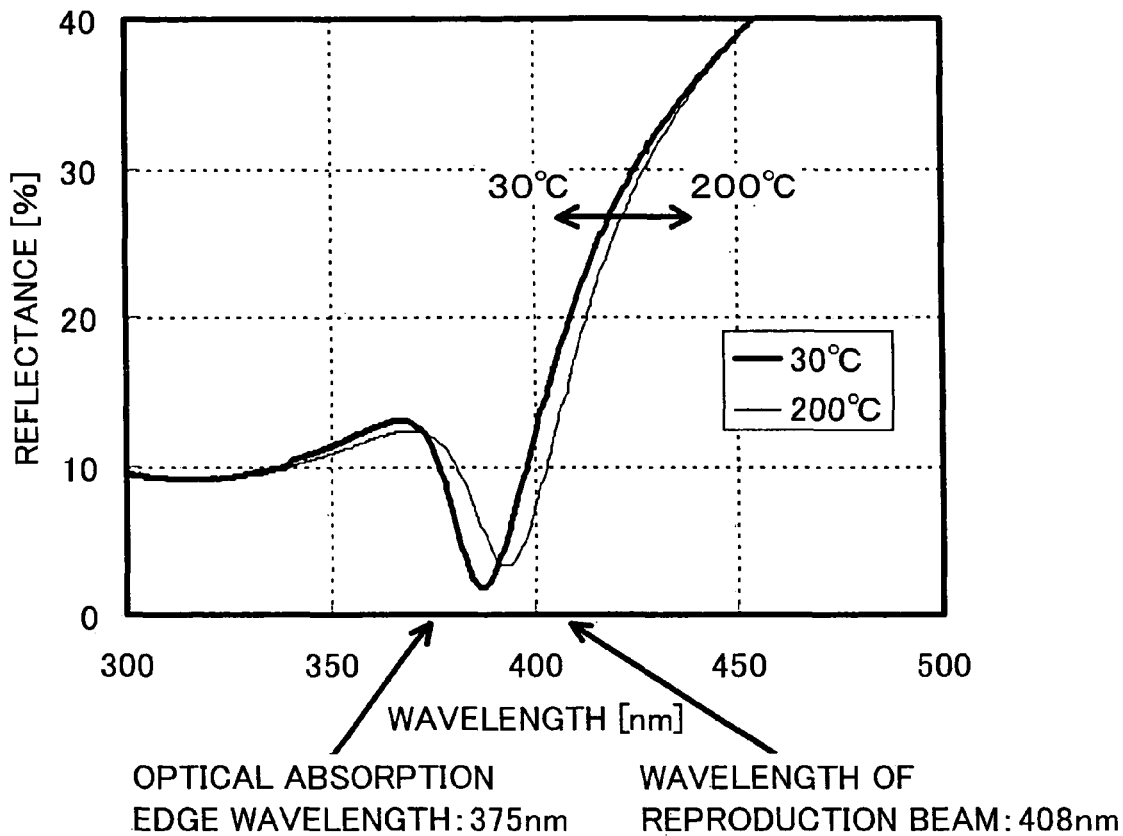
FIG. 16 is a graph illustrating one example of a change of the spectroscopic transmittivity property of a super resolution reproducing film of the optical information recording medium (Example 4) according to the present invention in response to a temperature change.

As is the case with FIG. 6, FIG. 16 illustrates (a) a spectroscopic reflectance property, obtained at a low temperature (30° C.), of a combination of (i) a super resolution reproducing film 13 made of a ZnO film having a film thickness of 140 nm and (ii) a light absorbing film 15 made of a Si film having a film thickness of 50 nm; and (b) a spectroscopic reflectance property, obtained at a high temperature (200° C.), thereof. The following explains the reflectance of such a structure identical to those of the optical information recording medium 2 and Example 4.

In cases where the ZnO film has a film thickness of 140 nm as such, the optical property (specifically, the reflectance) is changed in the reproduction wavelength of 408 nm in response to a temperature change. As such, the structure identical to those of the optical information recording medium 2 of the present embodiment and Example 4 makes it possible that the optical property of the super resolution reproducing film 13 is partially changed in the beam spot by the temperature distribution therein as is the case with Embodiment 1. Further, compare the reflectance of the structure with that of Example 1. The comparison clarifies that the reflectance in the reproduction wavelength is smaller than that in Example 1. It is considered that this is because the light is absorbed in the light absorbing film 15 provided instead of the reflecting film 14.

The optical information recording medium of Example 4 has such a structure as described above. An evaluation was carried out with respect to a signal generated from such an optical information recording medium of Example 4. The evaluation was carried out in the same manner as that in Embodiment 1. The result thereof is explained as follows.

Figure 17:
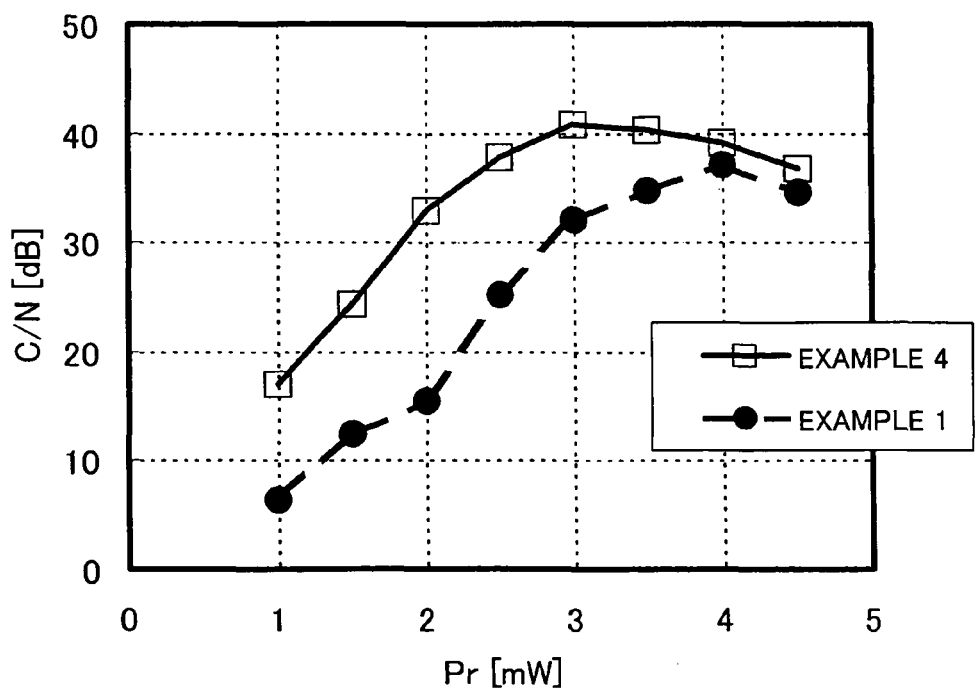
FIG. 17 is a graph illustrating results of evaluating signals respectively generated from the optical information recording mediums (Examples 1 and 4) according to the embodiments of the present invention, i.e., is a graph illustrating how CNR of each of the signals depends on power of reproduction laser.

FIG. 17 illustrates results of evaluating the carrier wave noise ratios C/N of the signals generated from the optical information recording mediums of Examples 4 and 1, respectively. Note that each of the optical information recording mediums of Examples 1 and 4 had pits each having a length of 0.14 µm that was shorter than the resolution limit of the optical system of the evaluating apparatus. FIG. 17 has a horizontal axis indicating the power of the reproduction laser, and has a vertical axis indicating each of the carrier wave noise ratios C/N, thus illustrating how the carrier wave noise ratio C/N depends on the power of the reproduction laser. With this, the reproduction laser power sensitivity of Example 4 can be compared with that of Example 1.

The results clarify that: the carrier wave noise ratio C/N was optimum in Example 1 when the power Pr of the laser power was 4 mw as described above, whereas the carrier wave noise ratio C/N was optimum in Example 4 when the power Pr was lower than 4 mW, i.e., 3 mW. With such a low power, the super resolution reproducing effect can be obtained. It is considered that this is because the light absorbing film 15 partially absorbed the reproduction beam so as to generate heat, with the result that the temperature of the super resolution reproducing film 13 was efficiently increased. Further, the optimum C/N value in Example 4 exceeded 40 dB, which is higher than that in Example 1. It is considered that such an effect was obtained by the effective temperature increase. This allows realization of an optical information recording medium which is excellent in terms of the reproduction laser power sensitivity and the carrier wave noise ratio C/N.

Further, an evaluation of the reproduction stability in Example 4 was carried out as is the case of Examples 1 and 2. Specifically, after reproducing the optical information recording medium of Example 4 100,000 times, the C/N value thereof was the same as the initial value. This indicates that the optical information recording medium of Example 4 was not deteriorated due to the reproduction. This allows realization of a practically usable optical information recording medium that is excellent in terms of the reproduction stability, the durability, and the reliability.

Further, the above evaluations were carried out with respect to each of (i) an optical information recording medium in which the light absorbing film 15 is made of Ge, and (ii) an optical information recording medium in which the light absorbing film 15 is made of AgInSbTe. The results of the evaluations were the same. This indicates that the light absorbing film 15, which assists the temperature increase of the super resolution reproducing film 13, may be made of any material as long as the desired effect can be obtained.

The effect of the light absorbing film 15 was thus confirmed, so that it seems reasonable that the heat allows the super resolution reproducing film 13 of the present invention to exhibit the super resolution reproducing effect. Specifically, the same effect can be obtained with such a lower power of the reproduction laser, so that this effect is not exhibited according to the intensity of the light but is exhibited according to the heat generated by the absorption of the light. In other words, this indicates that the super resolution reproducing effect is an effect obtained by way of so-called a thermal mode.

Embodiment 3

Still another embodiment of the present invention will be explained below with reference to FIG. 18 and FIG. 19. For ease of explanation, materials having the equivalent functions as those shown in the drawings pertaining to Embodiment 1 will be given the same reference symbols, and explanation thereof will be omitted here.

Figure 18:
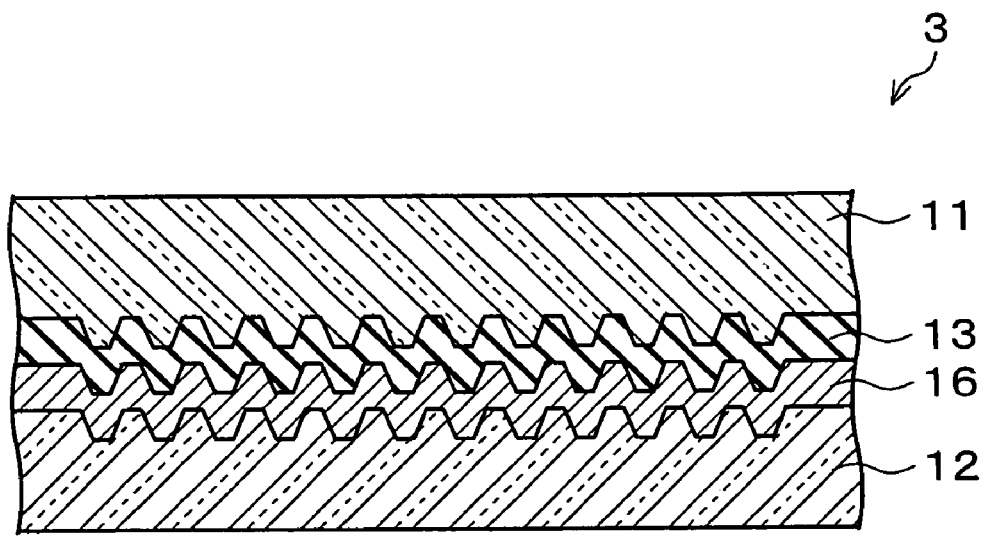
FIG. 18 is a cross sectional view partially illustrating a major portion of an optical information recording medium according to still another embodiment of the present invention.
Figure 19:
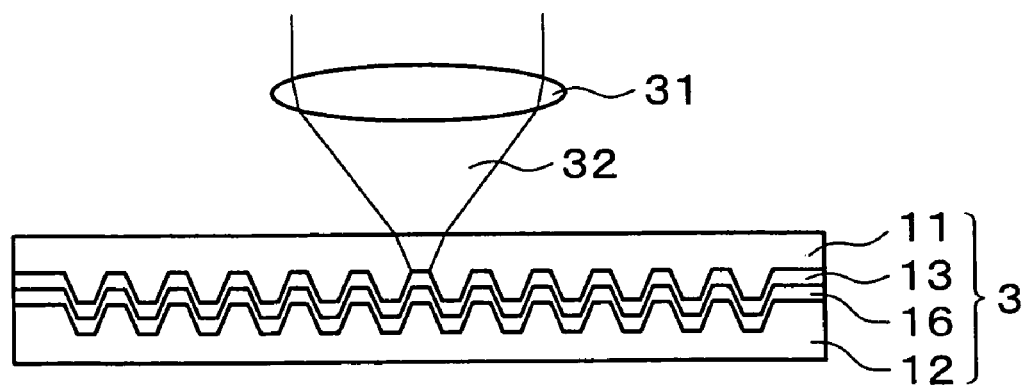
FIG. 19 is a cross sectional view schematically illustrating the optical information recording medium shown in FIG. 18.

An optical information recording medium according to the present embodiment is a readable/recordable (either write-once-read-many or re-writable) optical information recording medium 3 as shown in FIG. 18 and FIG. 19. Provided in the optical information recording medium 3 are a transparent resin layer 11, a super resolution reproducing film 13, a recording layer 16, and a substrate 12 in this order from the side via which a recording/reproduction beam 32 enters. The recording/reproduction beam 32 is a light beam for use in recording and reproduction. The super resolution reproducing film 13 is the same as that of Embodiment 1.

The recording layer 16 can be formed with the use of a recording material normally used in the technical field to which the present invention pertains. For example, in cases where the optical information recording medium 3 is a recordable (write-once-read-many) medium, an organic dye material such as cyanine or phthalocyanine can be used for the formation of the recording layer 16.

On the other hand, in cases where the optical information recording medium 3 is a re-writable medium, either (i) a magnet-optical recording material such as TbFeCo, or (ii) a phase change recording material such as AgInSbTe, GeSbTe, or AgInSb can be used for the formation of the recording layer 16. In cases where the magnet-optical recording material such as TbFeCo is adopted, it is preferable that the recording layer 16 has a three-layer structure made up of (i) a dielectric layer made of a dielectric material such as SiN (silicon nitride), (ii) a recording layer made of the magnet-optical recording material, and (iii) a protective layer made of a protective material such as SiN. Further, in cases where the phase change material such as AgInSbTe, GeSbTe, or AgInSb is adopted for the material for use in forming the recording medium 16, it is preferable that the recording layer 16 has a three-layer structure made up of (i) a dielectric layer that is either a ZnS film or a $SiO_2$ film, (ii) a recording layer made of the phase change recording material such as AgInSbTe, GeSbTe, or AgInSb, and (iii) a protective layer that is either a ZnS film or $SiO_2$ film. Further, the thickness of the recording layer 16 is not particularly limited, but it is appropriate that the recording layer 16 has a thickness of, e.g., approximately 5 nm to 500 nm.

In some cases, the recording layer 16 provided in the recordable optical information recording medium or the re-writable optical information recording medium may further include a reflecting layer for efficiently reflecting light.

As is the case with Embodiment 1, the substrate 12 renders a suitable strength to the optical information recording medium 1. Moreover, the substrate 12 may be transparent or non-transparent. The substrate 12 may be made of the aforementioned materials of which the substrate 12 can be made. The thickness of the substrate 12 is not particularly limited, but it is appropriate that the substrate 12 has a thickness of, e.g., approximately 0.1 mm to approximately 1.2 mm. Note that, in the present embodiment, a flat substrate may be used for the substrate 12 instead of a substrate having pits and grooves.

The transparent resin layer 11 and the super resolution reproducing film 13 are the same as those of Embodiment 1, respectively.

Further, in the optical information recording medium 3 according to the present embodiment, the super resolution reproducing film 13 is provided on and above the recording layer 16 when viewed from the side via which the light beam is irradiated; however, the technical idea of the present application is not limited to such positions. Specifically, the technical idea thereof encompasses a case where the recording medium 16, the super resolution 13, and the reflecting film 14 (in some cases) are provided in this order from the side via which the beam is irradiated.

Such a structure allows realization of an optical information recording medium having a writable recording layer, such as a CD-R (Compact Disc Recordable), a CD-RW (Compact Disc Re-Writable), a DVD-R (Digital Versatile Disc Recordable), a DVD-RW (Digital Versatile Disc Re-Writable), a DVD-RAM (Digital Versatile Disc Random Access Memory), or an MO (Magneto-Optical disc).

Further, the optical information recording medium 3 can be reproduced in accordance with the same reproducing method as the method for reproducing the optical information recording medium 1 of Embodiment 1. Specifically, the optical information recording medium 3 is reproduced as follows. See FIG. 19. The recording/reproduction beam 32 is irradiated to the optical information recording medium 3 by using (i) a laser light source such as the semiconductor laser 121 shown in FIG. 1, and (ii) an optical system such as the light collection lens 31 corresponding to the objective lens 125 shown in FIG. 1. The recording/reproduction beam 32 thus irradiated enters the recording layer 16 via the transparent resin layer 11 and the super resolution reproducing film 13. On this occasion, the high temperature portion and the low temperature portion are emerged within the light beam spot in the super resolution reproducing film 13, with the result that the optical property of the super resolution reproducing film 13 is changed in the high temperature portion. Then, light reflected by the recording layer 16 is detected by an optical head (not shown), with the result that the information stored in the optical information recording medium 3 is reproduced.

In the optical information recording medium 3, the recording layer 16 is provided on the rear surface (surface opposite to the surface receiving the recording/reproduction beam 32) of the super resolution reproducing film 13 when viewed from the side via which the light enters. Therefore, when the recording/reproduction beam 32 is guided by a guiding groove of the transparent substrate so as to reproduce the optical information recording medium 3, the recording/reproduction beam 32 enters the recording layer 16 via the super resolution reproducing film 13. The recording/reproduction beam 32 thus entering the recording layer 16 causes the temperature increase of the super resolution reproducing film 13 as described above, with the result that the high temperature portion 33a is emerged in the rear side of the reproduction beam spot 33, and the low temperature portion 33b is emerged in the front side thereof. The rear portion of the reproduction light beam spot 33 refers to a portion positioned in the rear side with respect to the traveling direction of the reproduction beam spot 33, whereas the front portion of the reproduction light beam spot 33 refers to a portion positioned in the front side with respect to the traveling direction thereof.

In the present embodiment, the super resolution reproducing film 13 has such a characteristic that the optical property thereof is changed in response to the temperature increase. This makes it possible to reproduce the information stored in the recording layer 16 with density not lower than the optical spatial resolution (the resolution limit of the reproduction light beam). Accordingly, the information stored with such high density can be reproduced with high quality. As described above, the optical information recording medium of the present embodiment uses the super resolution reproducing film 13 so that the reproduction can be carried out with respect to the fine recording marks each of which is provided in the recording layer 16, and each of which has a size equal to or smaller than the resolution limit of the reproduction beam.

Further, the temperature of the super resolution reproducing film 13 can be increased with ease with the use of an optical interference, by designing the optical information recording medium 3 in consideration of the film thickness and refractive index of each of the layers. Particularly, for attainment of the optical interference, it is effective to adjust the film thickness and the refractive index of the super resolution reproducing film 13 that is substantially transparent. This makes it possible to reproduce the optical information recording medium 3 with weaker laser power, with the result that an optical information recording medium having a high reproduction sensitivity can be realized.

Further, as is the case with Embodiment 1, the optical information recording medium 3 according to the present embodiment uses the super resolution reproducing film 13 whose optical property is changed in the high temperature portion 33a. This makes it possible that the super resolution reproducing film 13 is made of a metal oxide that is never melted by the temperature increase caused by recording and/or reproduction. Accordingly, the mask effect is never deteriorated even after carrying out recording and/or reproduction repeatedly, so that the optical information recording medium 3 is excellent in terms of the durability. This is advantageous.

Further, a method for carrying out recording onto the optical information recording medium 3 is not particularly limited as long as the recording can be carried out with respect to a medium using the recording layer 16. The recording never deteriorates the super resolution reproducing film 13 because the super resolution reproducing film 13 is made of the metal oxide having a high melting point sufficiently higher than the recording temperature. This is specifically explained as follows. That is, a currently implemented general recording medium does not adopt the optical mode recording directly using intensity of light for the recording, but adopts the thermal mode recording carried out by causing the temperature of a part of the medium to be increased by beam irradiation up to the critical temperature specific to the recording medium. For this reason, even though the optical property of the super resolution reproducing film 13 is changed while carrying out recording with respect to the recording layer 16, the change has no influence over the recording. Therefore, the conventional method can be used so as to carry out the recording with respect to the medium using the recording layer 16. In other words, the recording has no adverse effect over the super resolution reproducing film 13.

Embodiment 4

Another embodiment of the present invention will be described below. For ease of explanation, materials having the equivalent functions as those shown in the drawings pertaining to above Embodiments will be given the same reference symbols, and explanation thereof will be omitted here.

Embodiment 4 examines how a reproduction property of an optical information recording medium using, as the super resolution reproducing film, a metal oxide having a crystalline structure is influenced by the crystallinity in the super resolution reproducing film. The wording "crystallinity" used here refers to how irregularly spaces exist among respective surfaces of crystals oriented in the direction of the normal line of the super resolution reproducing film. Judgment on whether the crystallinity is good or bad is carried out based on the half width of the strongest peak of the diffraction peaks appearing in an X ray diffraction spectrum. Specifically, when the half width of the diffraction peak is narrow, the crystallinity in the super resolution reproducing film is judged to be good (the irregularity is small). On the other hand, when the half width of the diffraction peak is broad, the crystallinity therein is judged to be bad (the irregularity is great).

Firstly explained is a structure of the optical information recording medium of the present embodiment. The optical information recording medium of the present embodiment has basically the same structure as the structure that is described in Embodiment 2 with reference to FIG. 15, and that uses the light absorbing film. More specifically, the optical information recording medium of the present embodiment has such a structure that the transparent resin layer 11, the super resolution reproducing film 13, and the light absorbing film 15 are provided on the substrate 12 in this order when viewed in the direction in which the reproduction beam enters. Further, in the present embodiment, ZnO is used as the material of the super resolution reproducing film 13, and Ge is used as the material of the light absorbing film 15. The transparent resin layer 11 and the substrate 12 are the same as those of Embodiment 2, respectively.

Explained next is a method for manufacturing the optical information recording medium of the present embodiment.

Firstly, a Ge film is formed as the light absorbing film 15 so as to have a thickness of approximately 50 nm. A magnetron sputtering apparatus is used for the formation of the Ge film. Moreover, a Ge target (purity 99.99%) is used as the target for the Ge film. The formation of the Ge film is carried out under conditions that: a throwing power is 200 W, a Ar flow rate is 16 sccm, and a gas pressure is $6.5 \times 10^{-1}$ Pa.

Next, a ZnO film is formed as the super resolution reproducing film 13 on the light absorbing film 15 so as to have a thickness of approximately 130 nm. The formation of the ZnO film is carried out in accordance with the laser abrasion method (Pulsed Laser Deposition method; hereinafter, referred to as "PLD method"), which is one of the thin film forming methods. The PLD method is employed in the present embodiment because the crystallinity of the ZnO film serving as the super resolution reproducing film 13 can be greatly changed by using the PLD method rather than a sputtering apparatus.

Details of a PLD apparatus (apparatus adopting the PLD method) used here are as follows. The PLD apparatus uses a YAG laser that is a quadruple harmonics wave having a wavelength of 266 nm, and uses a ZnO sintering target (purity 99.99%) as the target, and uses a plane-convex lens as a light collection lens for collecting the laser on the target. The plane-convex lens has a focal distance of 400 mm.

Further, the formation of the ZnO film is carried out under conditions that: laser beam energy is 40 mJ/pulse, and a laser beam repetition frequency is 10 Hz. Further, the formation of the ZnO film is carried out under an oxygen atmosphere. Further, the crystallinity of the ZnO film to be formed can be changed by changing (i) an oxygen gas pressure and (ii) a distance between the light collection lens and the target during the formation. Specifically, the formation of the ZnO film is carried out under an oxygen gas pressure of either 10 Pa or 1 Pa. The oxygen gas pressure can be adjusted by adjusting the flow rate of the oxygen, and the degree of opening of a discharging valve. Moreover, the distance between the light collection lens and the target is set at either 450 mm or 435 mm.

Next, the substrate is taken out of the PLD apparatus, and then the transparent resin layer 11 is formed on the super resolution reproducing film 13. The formation of the transparent resin layer 11 is carried out in the same manner as in Embodiment 2.

Here, the following three types of optical information recording medium were manufactured by changing the oxygen gas pressure and the distance between the light collection lens and the target in the super resolution reproducing film forming step of the aforementioned manufacturing steps.

The optical information recording mediums thus actually manufactured in accordance with the aforementioned manufacturing method were used for examination carried out so as to find how much the difference in the crystallinity of the super resolution reproducing films 13 has an influence over the reproduction property of each of the optical information recording mediums.

The three optical information recording mediums used for the examination were following Examples 5 through 7.

Example 5 corresponds to an optical information recording medium having a structure (hereinafter, referred to as "ZnO/Ge structure") in which the super resolution reproducing film 13 is made of ZnO, and in which the light absorbing film 15 is made of Ge. Further, the ZnO film serving as the super resolution reproducing film was formed in accordance with the PLD method under conditions that the oxygen gas pressure was 10 Pa and the distance was 435 mm between the light collection lens and the target.

Example 6 corresponds to an optical information recording medium having the ZnO/Ge structure. The ZnO film serving as the super resolution reproducing film was formed in accordance with the PLD method under conditions that the oxygen gas pressure was 1 Pa and the distance was 450 mm between the light collection lens and the target.

Example 7 corresponds to an optical information recording medium having the ZnO/Ge structure. The ZnO film serving as the super resolution reproducing film was formed in accordance with the PLD method under conditions that the oxygen gas pressure was 1 Pa and the distance was 435 mm between the light collection lens and the target.

Then, comparison was carried out among the three optical information recording mediums of Examples 5 through 7, i.e., the optical information recording mediums whose ZnO films were formed under the different conditions (the oxygen gas pressure and the distance between the light collection lens and the target). Specifically, compared were (i) the crystallinity of the optical information recording mediums, and (ii) properties of signals respectively generated therefrom. The following explains the results of the comparison.

Figure 20:
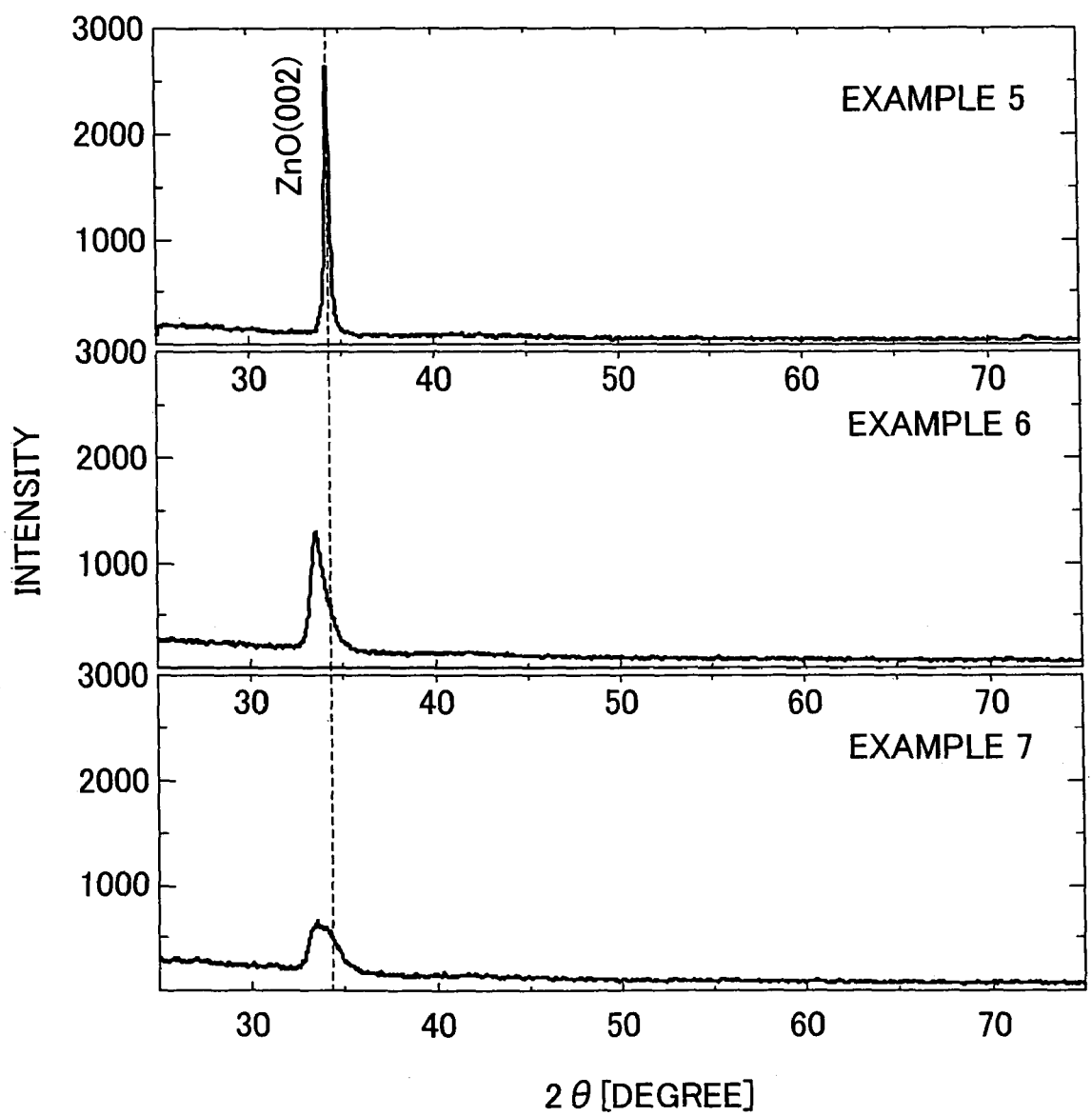
FIG. 20 is a graph illustrating an X ray diffraction measurement carried out with respect to each of super resolution reproducing films of the optical information recording mediums (Examples 5 through 7) according to Embodiment 4 of the present invention.

Firstly, an X ray diffraction measurement was carried out with respect to each of the ZnO films, i.e., the super resolution reproducing films of the information recording mediums of Examples 5 through 7, in order to confirm the difference in the crystallinity among the super resolution reproducing films. Note that the X ray diffraction measurement was carried out with respect to samples prepared by omitting the transparent resin layers from the structures of Examples 5 through 7, respectively. Specifically, in each of the samples, the Ge film serving as the light absorbing film is provided on the substrate so as to have a thickness of approximately 50 nm, and the ZnO film serving as the super resolution reproducing film is provided thereon so as to have a thickness of approximately 130 nm. Further, the X ray diffraction measurement was carried out in accordance with the 2θ/θ scan X ray diffraction method using Cu-Kα1 radiation. FIG. 20 illustrates the result thereof.

FIG. 20 clarifies that only the (002) surface diffraction peak was observed in the ZnO film of each of the optical information recording mediums of Examples 5 through 7, so that crystals were aligned such that the (002) surfaces of the crystals were oriented in the direction of the normal line of the ZnO film. This indicates that each of the optical information recording mediums of Examples 5 through 7 included the super resolution reproducing film made of a metal oxide having a crystalline structure.

Figure 21:
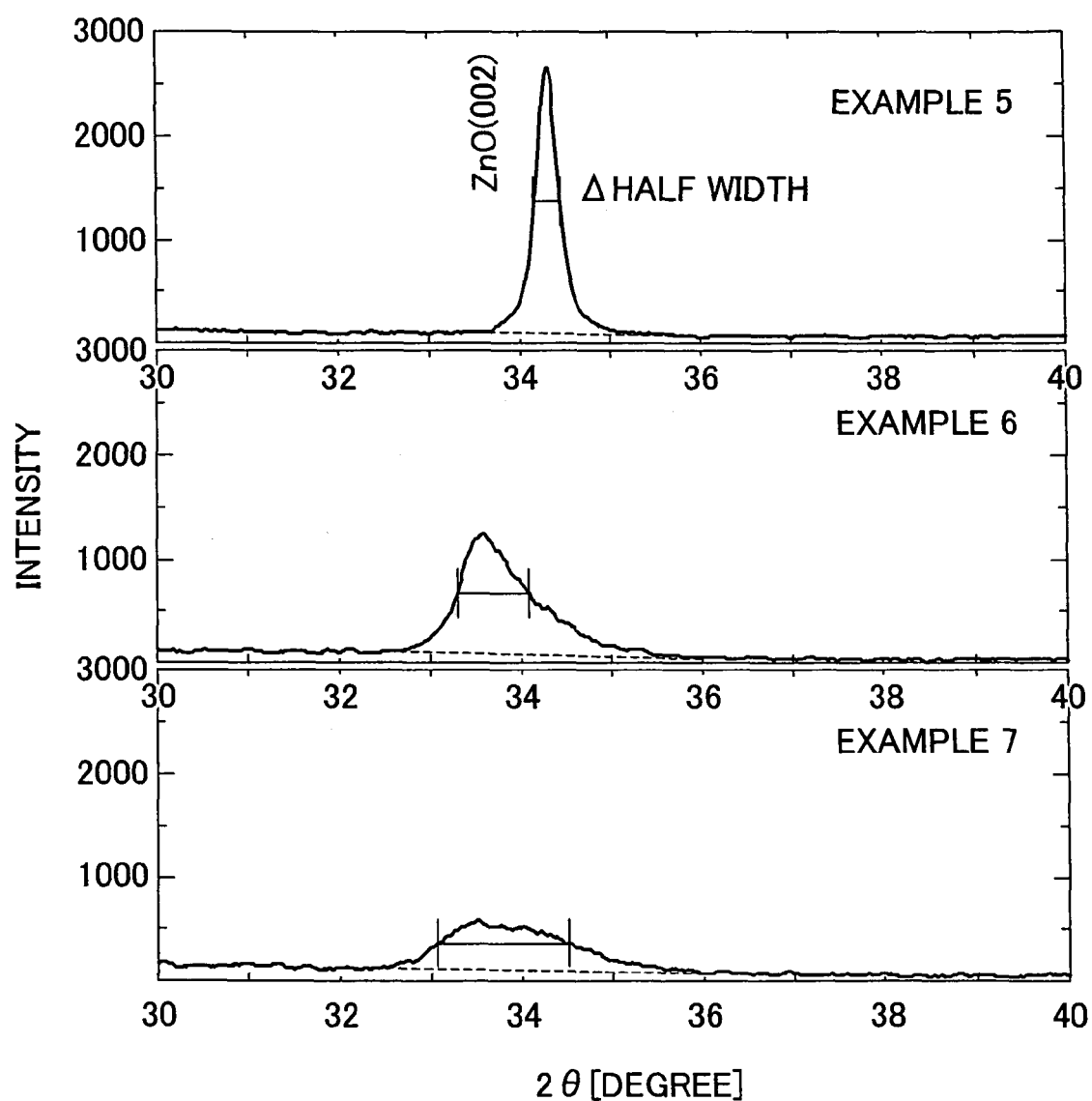
FIG. 21 is a graph enlarging a portion of the X ray diffraction spectrum shown in FIG. 20, which portion covers a range of 2θ degree from 30° to 40°.

FIG. 21 is an enlarged diagram illustrating a part of the X ray diffraction spectrum shown in FIG. 20, which part covers a range of the 2θ degree from 30° to 40°. In order to find the crystallinity of each of the optical information recording mediums, the extent of the breadth of the peak, i.e., the half width of the X ray diffraction peak was examined. Set as a reference value in the examination was the angular position at which the intensity was the strongest. As a result, it was found that the half width in the optical information recording medium of Example 5 was 0.3°, and that the half width in the optical information recording medium of Example 6 was 0.8°, and that the half width in the optical information recording medium of Example 7 was 1.3. Therefore, the half width in the optical information recording medium of Example 5 was the narrowest, so that the crystallinity therein was the best. In contrast, the half width in the optical information recording medium of Example 7 was very broad, so that the crystallinity therein was the worst. The above results confirmed that the crystallinity of the super resolution reproducing films of the optical information recording mediums of Examples 5 through 7 were different from one another.

Carried out next was an evaluation of each of the properties of the signals respectively generated from the optical information recording mediums of Examples 5 through 7. The following explains the result thereof.

For the evaluation of the signal properties, the evaluation system described in Embodiment 1 was used. The signal evaluation was carried out under conditions that: the reproduction wavelength was 404 nm, NA was 0.85, and the linear velocity was 3 m/s.

Figure 22:
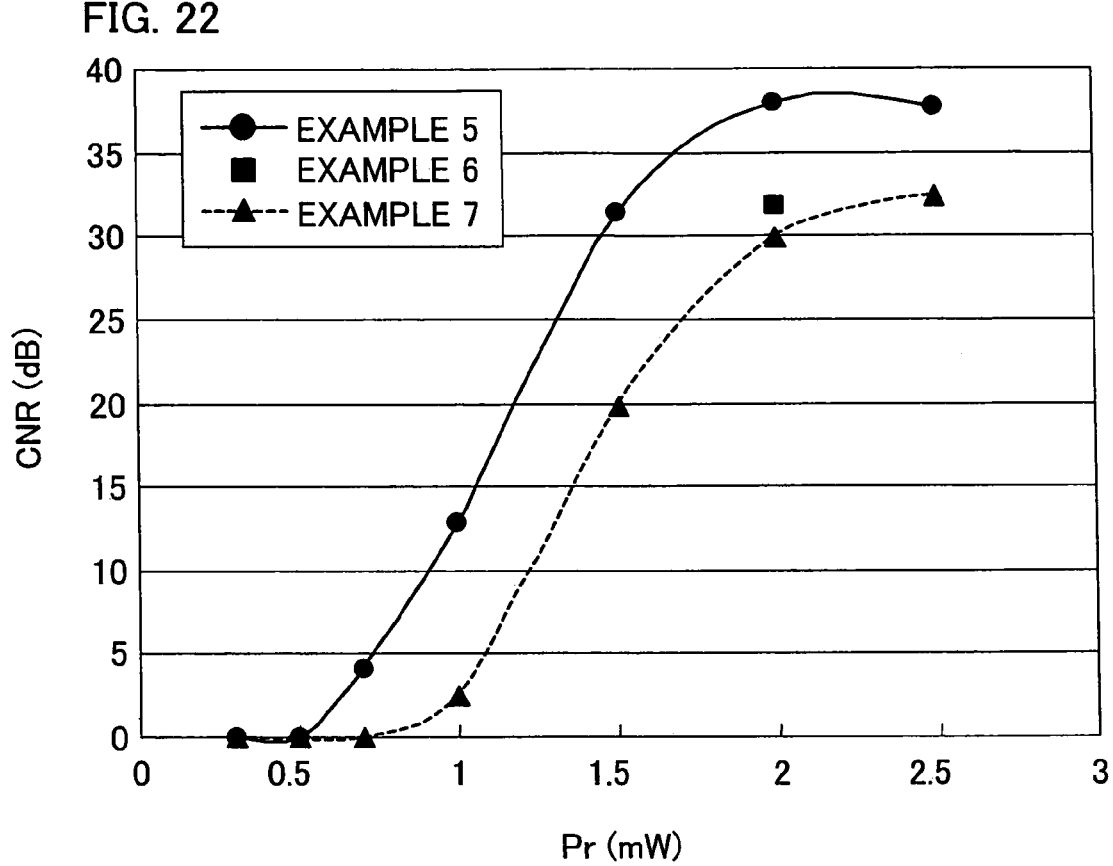
FIG. 22 is a graph illustrating how the carrier wave noise ratio of each of signals respectively generated from the three optical information recording mediums (Examples 5 through 7) according to Embodiment 4 of the present invention depends on reproduction laser power (Pr).

Note that each of the optical information recording mediums of Examples 5 through 7 had pits each having a length of 0.1 μm. FIG. 22 illustrates results of evaluating how the carrier wave noise ratios C/N of the signals respectively generated from the optical information recording mediums of Examples 5 through 7 depend on the reproduction laser power (Pr). FIG. 22 has a horizontal axis illustrating the reproduction laser power, and has a vertical axis illustrating the C/N values.

See FIG. 22. The respective C/N values of the signals generated from the optical information recording mediums of Examples 5 through 7 were different from one another when the reproduction laser power Pr fell within a range from 0.5 mW to 2.5 mW. As shown in FIG. 22, the C/N value of the signal generated from the optical information recording medium of Example 5 was the highest; for example, when the reproduction laser power Pr was 2.0 mW, the C/N value was 38 dB. The C/N value of the signal generated from the optical information recording medium of Example 6 was the second highest; for example, when the reproduction laser power Pr was 2.0 mW, the C/N value was 32 dB. The C/N value of the signal generated from the optical information recording medium of Example 7 was the lowest; for example, when the reproduction laser power Pr was 2.0 mW, the C/N value was 29 dB.

The results clarify that the C/N value is high in the signal generated from the optical information recording medium having the super resolution reproducing film whose half width in the X ray diffraction peak is narrow, i.e., whose crystallinity is good. In other words, the results indicate that the C/N value of the optical information recording medium of the present embodiment depends on the half width (crystallinity) of the X ray diffraction peak of the super resolution reproducing film. Therefore, the narrower the half width of the X ray diffraction peak is, the higher the C/N value becomes.

Further, the results clarify that: for acquirement of the C/N value of 30 dB or higher, it is preferable to use the super resolution reproducing film whose half width of the X ray diffraction peak is 0.8° or less. The C/N value of 30 dB or higher is a requisite in implementing the optical information recording medium, and the half width represents the crystallinity.

Further, the following explains a reason why the properties of the signals respectively generated from the optical information recording mediums of Examples 5 through 7 were different from one another.

One conceivable reason why the signal properties were different from one another lies in that the band gap was less uneven in the super resolution reproducing film whose crystallinity was relatively good, i.e., whose half width of the X ray diffraction peak was relatively narrow. In other words, the band gap was less uneven in the super resolution film of each of the optical information recording mediums of Examples 5 and 6, so that the light was further absorbed in the specific wavelength. Accordingly, the transmittivity was greatly changed in the vicinity of the optical absorption edge. This greatly changed the optical property (either the transmittivity or the reflectance) in the vicinity of the reproduction wavelength during the reproduction of the optical information recording medium, with the result that such a better super resolution reproducing effect was obtained.

Embodiment 5

Another embodiment of the present invention will be described below. For ease of explanation, materials having the equivalent functions as those shown in the drawings pertaining to above Embodiments will be given the same reference symbols, and explanation thereof will be omitted here.

The present embodiment examines how much the reproduction property of an optical information recording medium using a super resolution reproducing film made of a metal oxide having a crystalline structure is influenced by an alignment property in the super resolution reproducing film. The wording "alignment property" used here refers to the number of the surfaces of crystals existing in the super resolution reproducing film and oriented in the direction of the normal line of the super resolution reproducing film. Judgment on whether the alignment property is good or bad is carried out based on the intensity in the strongest peak of the diffraction peaks appearing in an X ray diffraction spectrum. Specifically, when the intensity in the diffraction peak is strong, the alignment property is judged to be good (the number of the surfaces of the crystals is large). On the other hand, when the intensity in the strongest peak of the diffraction peak is weak, the alignment property is judged to be bad (the number of the surfaces of the crystals is small).

Firstly explained is a structure of the optical information recording medium of the present embodiment. The optical information recording medium of the present embodiment has basically the same structure as the structure that is described in Embodiment 2 with reference to FIG. 15, and that uses the light absorbing film. More specifically, the optical information recording medium of the present embodiment has such a structure that the transparent resin layer 11, the super resolution reproducing film 13, and the light absorbing film 15 are provided on the substrate 12 in this order when viewed in the direction in which the reproduction beam enters. Further, in the present embodiment, ZnO is used as the material of the super resolution reproducing film 13, and a mixture film made of Si and Ge (hereinafter, referred to as "Si/Ge mixture film") is used for the light absorbing film 15. The transparent resin layer 11 and the substrate 12 are the same as those of Embodiment 2, respectively.

Explained next is a method for manufacturing the optical information recording medium of the present embodiment.

Firstly, the Si/Ge mixture film is formed as the light absorbing film 15 so as to have a thickness of approximately 50 nm. A magnetron sputtering apparatus is used for the formation of the Si/Ge mixture film. Moreover, a Si/Ge sintering target (composition ratio 3:1) is used as the target for the Si/Ge mixture film. The formation of the Si/Ge mixture film is carried out under conditions that: a throwing power is 200 W, a Ar flow rate is 16 sccm, and a gas pressure is $6.5 \times 10^{-1}$ Pa.

Next, a ZnO film is formed as the super resolution reproducing film 13 on the light absorbing film 15 so as to have a thickness of approximately 170 nm. The formation of the ZnO film is carried out with the use of the magnetron sputtering apparatus. A ZnO sintering target (purity 99.99%) is used as the target. The formation of the ZnO film is carried out under conditions that a throwing power is 200 W. Further, the alignment property in the ZnO film to be formed can be changed by changing (i) ultimate vacuum and (ii) a sputtering gas (types of gas and an amount of the gas) during the formation.

Next, the substrate is taken out of the sputtering apparatus, and then the transparent resin layer 11 is formed on the super resolution reproducing film 13. The formation of the transparent resin layer 11 is carried out in the same manner as in Embodiment 2.

Here, the following two types of optical information recording medium were manufactured by changing the ultimate vacuum and the sputtering gas (types of gas and an amount of the gas) in the super resolution reproducing film forming step of the aforementioned manufacturing steps.

The optical information recording mediums thus actually manufactured in accordance with the aforementioned manufacturing method were used for examination carried out so as to find how much the difference in the alignment property in the super resolution reproducing film 13 has an influence over the reproduction property of each of the optical information recording mediums.

The two optical information recording mediums used for the examination were following Examples 8 and 9.

Example 8 corresponds to an optical information recording medium having a structure (hereinafter, referred to as "ZnO/Si—Ge structure") in which the super resolution reproducing film 13 is made of ZnO, and in which the light absorbing film 15 is made of the Si/Ge mixture film. Further, the ZnO film serving as the super resolution reproducing film was formed under conditions that: the ultimate vacuum was $5.0 \times 10^{-4}$ Pa, a Ar gas of 16 sccm and an $O_2$ gas of 1 ccm were used, and the gas pressure was $7.0 \times 10^{-1}$ Pa.

Example 9 corresponds to an optical information recording medium having the ZnO/Si—Ge structure. The ZnO film serving as the super resolution reproducing film was formed under conditions that: the ultimate vacuum was $1.6 \times 10^{-4}$ Pa, a Ar gas of 16 sccm was used, and the gas pressure was $6.5 \times 10^{-1}$ Pa.

Then, comparison was carried out between the two optical information recording mediums of Examples 8 and 9, i.e., the optical information recording mediums whose ZnO films were formed under the different conditions (the ultimate vacuum and the sputtering gas). Specifically, compared were (i) the alignment property in the optical information recording mediums, and (ii) properties of signals respectively generated therefrom. The following explains the results of the comparison.

Figure 23:
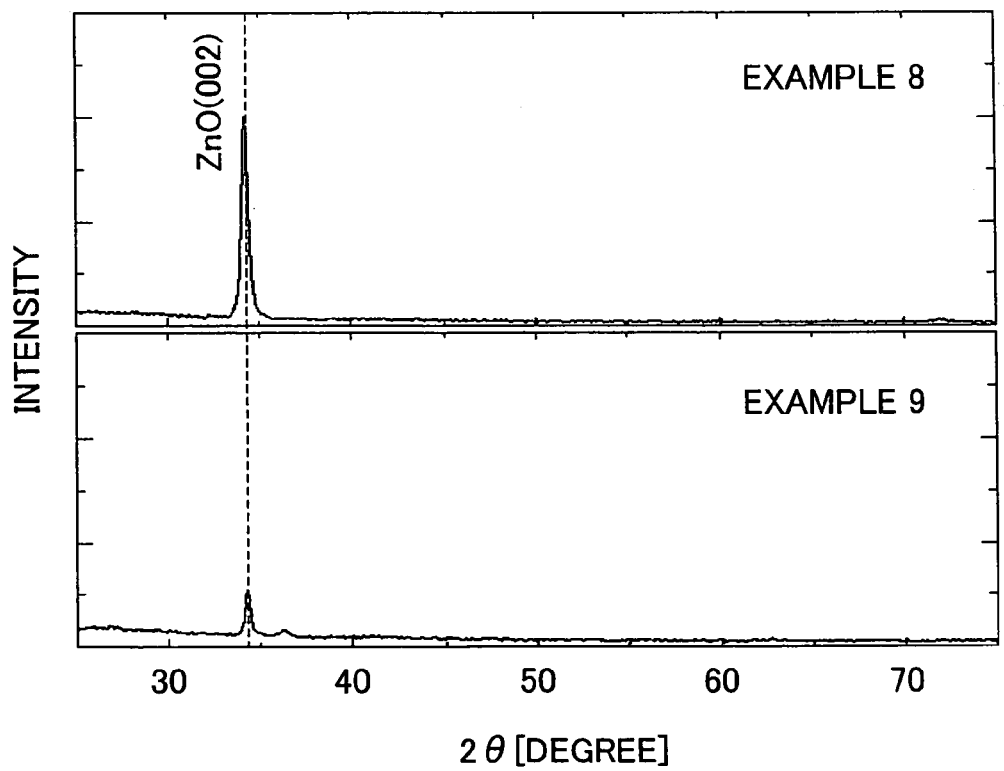
FIG. 23 is a graph illustrating an X ray diffraction measurement carried out with respect to each of super resolution reproducing films of optical information recording mediums (Examples 8 and 9) according to Embodiment 5 of the present invention.

Firstly, an X ray diffraction measurement was carried out with respect to each of the ZnO films, i.e., the super resolution reproducing films of the information recording mediums of Examples 8 and 9, in order to confirm the difference in the alignment property between the super resolution reproducing films. Note that the X ray diffraction measurement was carried out with respect to samples prepared by omitting the transparent resin layers from the structures of Examples 8 and 9, respectively. Specifically, in each of the samples, the Si/Ge mixture film serving as the light absorbing film is provided on the substrate so as to have a thickness of approximately 50 nm, and the ZnO film serving as the super resolution reproducing film is provided thereon so as to have a thickness of approximately 170 nm. Further, the X ray diffraction measurement was carried out in accordance with the 2θ/θ scan X ray diffraction method using Cu-Kα1 radiation. FIG. 23 illustrates the results thereof.

FIG. 23 clarifies that only the (002) surface diffraction peak was observed in the ZnO film of each of the optical information recording mediums of Examples 8 and 9, so that crystals were aligned such that the (002) surfaces of the crystals were oriented in the direction of the normal line of the ZnO film. This indicates that each of the optical information recording mediums of Examples 8 and 9 included the super resolution reproducing film made of a metal oxide having a crystalline structure.

Figure 24:
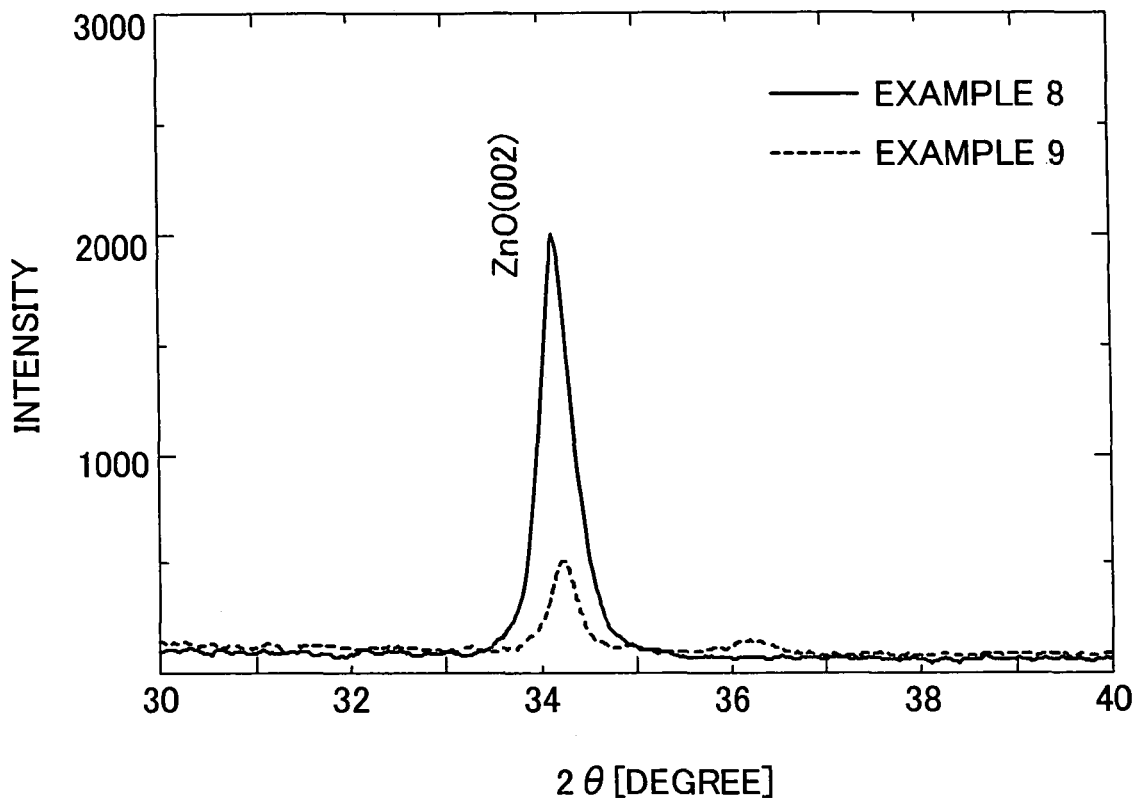
FIG. 24 is a graph enlarging a portion of the X ray diffraction spectrum shown in FIG. 23, which portion covers a range of 2θ degree from 30° to 40°.

FIG. 24 is an enlarged diagram illustrating a part of the X ray diffraction spectrum shown in FIG. 23, which part covers a range of the 2θ degree from 30° to 40°. FIG. 24 has a vertical axis representing the intensity, and illustrates the respective X ray diffraction spectrums of Examples 8 and 9 in the same scale. As shown in FIG. 24, the ZnO films of the optical information recording mediums of Examples 8 and 9 had substantially the same half width (approximately 0.3°). However, the peak intensity of the ZnO film of the optical information recording medium of Example 8 was much stronger than the peak intensity of the ZnO film of the optical information recording medium of Example 9. Each of the intensities represent the alignment property, so that it is apparent that the crystals were more preferentially aligned in the direction of the normal line of the ZnO film of the optical information recording medium of Example 8 as compared with the crystals in the ZnO film of the optical information recording medium of Example 9. As such, it was confirmed that the alignment properties in the super resolution reproducing films of the optical information recording mediums of Examples 8 and 9 were different from each other.

A conceivable reason why the alignment properties in the super resolution reproducing films were different from each other lies in a difference between oxygen amounts in chambers in which the ZnO films were respectively formed. This is specifically explained as follows. That is, the ZnO film of the optical information recording medium of Example 8 was formed under conditions that the ultimate vacuum was relatively bad and the oxygen gas was introduced thereto. Accordingly, the film that was being formed absorbed a large amount of oxygen, with the result that oxygen deficiency was decreased. It is considered that this allowed acquirement of the ZnO film in which the crystals had such a good alignment property. In contrast, the ZnO film of the optical information recording medium of Example 9 was formed under conditions that the ultimate vacuum was relatively good and no oxygen gas was introduced to the chamber. Accordingly, the film that was being formed absorbed a small amount of oxygen, with the result that oxygen deficiency partially occurred. For this reason, the crystals of the ZnO film of the optical information recording medium of Example 9 were aligned in the direction of the normal line of the ZnO film; however, the degree of the alignment was relatively bad.

Carried out next was an evaluation of each of the properties of the signals respectively generated from the optical information recording mediums of Examples 8 and 9. The following explains the result thereof.

For the evaluation of the signal properties, the evaluation system described in Embodiment 1 was used. The signal evaluation was carried out under conditions that: the reproduction wavelength was 404 nm, NA was 0.85, and the linear velocity was 3 m/s.

Figure 25:
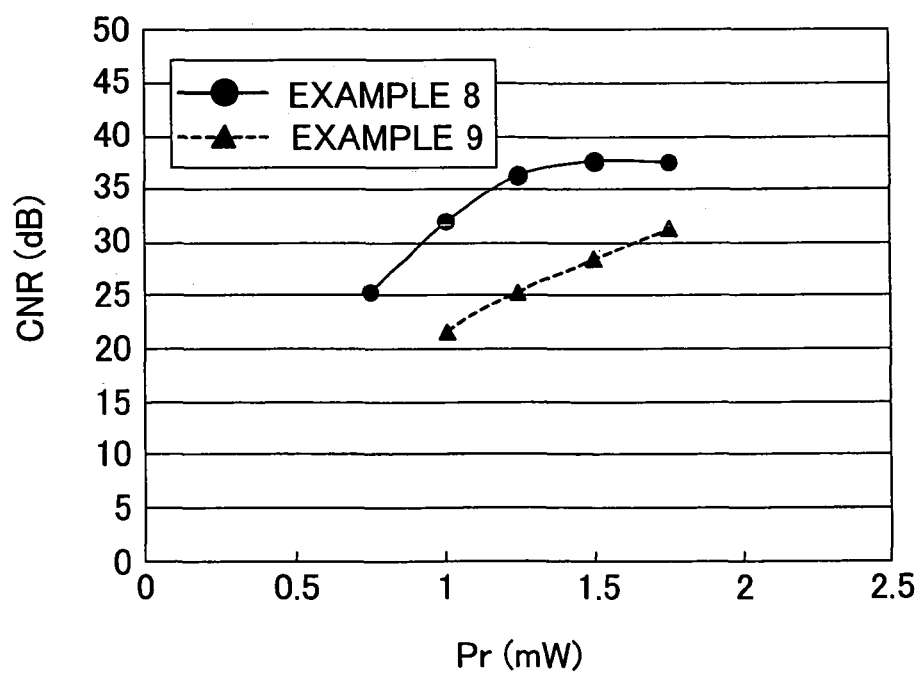
FIG. 25 is a graph illustrating how the carrier wave noise ratio of each of signals respectively generated from the two optical information recording mediums (Examples 8 and 9) according to Embodiment 5 of the present invention depends on reproduction laser power (Pr).

Note that each of the optical information recording mediums of Examples 8 and 9 had pits each having a length of 0.1 μm. FIG. 25 illustrates results of evaluating how the carrier wave noise ratios C/N of the signals respectively generated from the optical information recording mediums of Examples 8 and 9 depend on the reproduction laser power (Pr). FIG. 22 has a horizontal axis illustrating the reproduction laser power, and has a vertical axis illustrating the C/N values.

See FIG. 25. The respective C/N values of the signals generated from the optical information recording mediums of Examples 8 and 9 were different from each other when the reproduction laser power Pr fell within a range from 1.0 mW to 1.7 mW. As shown in FIG. 25, the C/N value of the signal generated from the optical information recording medium of Example 8 was the higher than the C/N value of the signal generated from the optical information recording medium of Example 9.

For example, when the reproduction laser power Pr was 1.7 mW, the C/N value of the signal generated from the optical information recording medium of Example 8 was 37 dB and the C/N value of the signal generated from the optical information recording medium of Example 9 was 31 dB. Further, even when the reproduction laser power Pr was relatively weak, it was found that the C/N values of the signals respectively generated from the optical information recording mediums of Examples 8 and 9 were different from each other. Thus, the optical information recording medium of Example 8 has a better reproduction sensitivity than that of the optical information recording medium of Example 9 as shown in FIG. 25.

The results clarify that the C/N value is high in the signal generated from the optical information recording medium including the super resolution reproducing film in which the intensity of the X ray diffraction peak is strong, i.e., in which the alignment property is good. Moreover, the results clarify that the reproduction sensitivity is secured in such a optical information recording medium. In other words, the results indicate that the C/N value of the optical information recording medium of the present embodiment depends on the intensity (alignment property) of the X ray diffraction peak of the super resolution reproducing film. Therefore, the stronger the intensity of the X ray diffraction peak is, the higher the C/N value becomes, with the result that the reproduction sensitivity becomes better.

Further, the following explains a reason why the properties of the signals respectively generated from the optical information recording mediums of Examples 8 and 9 were different from each other.

One conceivable reason why the signal properties were different from each other lies in the following point. That is, the super resolution film in which the alignment property was good, i.e., in which the intensity of the X ray diffraction peak was relatively strong had such a crystalline structure that the crystals were preferentially aligned in the direction of the normal line of the surface of the super resolution reproducing film, which direction was the direction in which the reproduction light enters. This made it possible that the property intrinsic to the material of which the super resolution reproducing film was made was exhibited in a relatively desirable manner. In other words, the band gap energy was more even in the direction of the normal line of the surface of the super resolution film in which the alignment property was relatively good, so that the light was further absorbed in the specific wavelength. Accordingly, the transmittivity was greatly changed in the vicinity of the optical absorption edge. This greatly changed the optical property (either the transmittivity or the reflectance) in the vicinity of the reproduction wavelength during the reproduction of the optical information recording medium, with the result that such a better super resolution reproducing effect was obtained.

The present invention is not limited to the description of the embodiments above, but may be altered by a skilled person within the scope of the claims. For example, the optical information recording medium of the present invention may have not only a disc-like shape (an optical disc having a circular plate shape), but also have either a card-like shape or a sheet-like shape. Further, the method for optically recording information onto the optical information recording medium of the present invention is not particularly limited as long as the recording is optically carried out. Further, the optical information recording medium of the present invention encompasses either a magnet-optical disk or various optical information recording mediums such as a phase change type optical disk.

Further, the optical information recording medium of the present invention may have such a structure that the layer structure of each of the optical information recording mediums of Embodiment 1 through 3 repeatedly appears. For example, the optical information recording medium of the present invention can have a structure obtained by binding two substrates each including the super resolution reproducing film 13, either the reflecting film 14 or the super resolution film 13, and the recording layer 16. The two substrates are bound such that the super resolution reproducing film 13, the reflecting film 14, or the recording layer 16 of one substrate faces the super resolution reproducing film 13, the reflecting film 14, or the recording layer 16 of the other substrate. Moreover, the light is irradiated via each of the substrates.

Further, an embodiment based on a proper combination of technical means disclosed in different embodiments is encompassed in the technical scope of the present invention. For example, the optical information recording medium of the present invention may be a hybrid medium including (i) a reproduction-only (read-only) surface whose structure is identical to that of Embodiment 1 or 2, and (ii) a recordable and readable surface whose structure whose structure is identical to Embodiment 3.

As described above, the embodiments of the present invention are different from aforementioned Patent documents.

It is also possible to express the optical information recording medium of the present invention as follows: an optical information recording medium, including (i) a substrate having pits each of which is made up of a rise and a recess, and each of which corresponds to recorded information that is optically reproduced by irradiation of a light beam; and (ii) at least one super resolution reproducing film made of a metal oxide having a crystalline structure, the super resolution reproducing film having an optical property to be changed in response to a temperature increase of the optical information recording medium, which temperature increase is caused by the irradiation of the light beam during reproduction of the information; the optical property that the super resolution reproducing film has at a room temperature after the irradiation of the laser beam being substantially identical to the optical property that the super resolution reproducing film had at the room temperature before the irradiation of the light beam.

Further, it is also possible to express the optical information recording medium of the present invention as follows: an optical information recording medium, including (i) a substrate; and (ii) a recording layer, onto which information is optically recorded by irradiating a laser beam, and from which the information is optically reproduced by irradiating the laser beam; and (iii) at least one super resolution reproducing film made of a metal oxide having a crystalline structure, the super resolution reproducing film having an optical property to be changed in response to a temperature increase of the optical information recording medium, which temperature increase is caused by the irradiation of the light beam during reproduction of the information; the optical property that the super resolution reproducing film has at a room temperature after the irradiation of the laser beam being substantially identical to the optical property that the super resolution reproducing film had at the room temperature before the irradiation of the light beam.

It is also possible to express the optical information recording medium of the present invention as follows: an optical information recording medium, including (i) a substrate having pits, each of which is made up of a rise and a recess and each of which corresponds to recorded information that is optically reproduced by irradiation of a light beam; and (ii) at least one super resolution reproducing film made of a metal oxide having a crystalline structure, the optical information recording medium having an optical property to be changed by the super resolution reproducing film in response to a temperature increase of the optical information recording medium, which temperature increase is caused by the irradiation of the light beam during reproduction of the information; the optical property that the optical information recording medium has at a room temperature after the irradiation of the laser beam being substantially identical to the optical property that the optical information recording medium had at the room temperature before the irradiation of the light beam.

it is also possible to express the optical information recording medium of the present invention as follows: an optical information recording medium, including (i) a substrate; and (ii) a recording layer, onto which information is optically recorded by irradiating a laser beam, and from which the information is optically reproduced by irradiating the laser beam; and (iii) at least one super resolution reproducing film made of a metal oxide having a crystalline structure, the optical information recording medium having an optical property to be changed by the super resolution reproducing film in response to a temperature increase of the optical information recording medium, which temperature increase is caused by the irradiation of the light beam during reproduction of the information; the optical property that the optical information recording medium has at a room temperature after the irradiation of the laser beam being substantially identical to the optical property that the optical information recording medium had at the room temperature before the irradiation of the light beam.

The present invention makes it possible to securely and accurately reproduce information stored in density higher than the resolution limit of a reproducing optical system, and is therefore applicable to a general optical information recording medium such as a CD, a CD-ROM, a CD-R, a CD-RW, a DVD, a DVD-ROM, a DVD-R, a DVD-RW, a DVR, a DVR-ROM, a DVD-Blue, and a so-called Blu-ray Disc.

As described above, an optical information recording medium of the present invention includes: at lease one super resolution reproducing film, which is made of a metal oxide having a crystalline structure, and which has an optical property to be changed in response to a temperature increase caused by the irradiation of the laser beam, the optical property of the super resolution reproducing film being reversibly changed depending on a temperature change in the super resolution reproducing film.

Therefore, the optical property is changed in response to the temperature increase of the super resolution reproducing film during the recording and/or reproduction, so that the optical property of a part of the super resolution reproducing film is changed in the spot of the light beam. This makes it possible to provide an optical information recording medium in which information is stored in high density, but from which the information can be precisely and securely reproduced.

Further, the optical property of the super resolution reproducing film is reversibly changed in response to the temperature change thereof, so that the optical property of the low temperature portion in the super resolution reproducing film can be more uniformly maintained. This allows realization of an optical information recording medium that is excellent in terms of the reproduction stability, the durability, and the reliability.

Further, as described above, an optical information recording medium of the present invention includes: at lease one super resolution reproducing film, which is made of a metal oxide having a crystalline structure, and which has an optical property to be changed in response to a temperature increase caused by the irradiation of the laser beam at least during the reproduction of the information, the metal oxide having one or more diffraction peaks in an X ray diffraction spectrum that is obtained as a result of an X ray diffraction using Cu-K$\alpha$1 radiation, and that is an X ray diffraction intensity plot with 2$\theta$ scan, the optical property of the super resolution reproducing film being reversibly changed depending on a temperature change in the super resolution reproducing film.

In cases where each of the diffraction peaks is detected by using the 2$\theta$/$\theta$ scan X ray diffraction method as such, it is preferable that the diffraction peaks of the metal oxide in the X ray diffraction spectrum has a strongest diffraction peak whose half width is 0.8° or less.

According to the above structure, the super resolution reproducing film has the crystalline structure, so that the super resolution reproducing effect is exhibited, i.e., the reproduction can be selectively carried out with respect to a region whose size is smaller than the spot of the light beam. Further, the diffraction peak indicating the strongest diffraction velocity intensity among the diffraction peaks has the half width of 0.8° or smaller, so that it can be considered that the super resolution reproducing film has such a crystalline structure that is less distorted due to oxygen deficiency. Accordingly, the band gap becomes more uniform in the super resolution reproducing film, with the result that the optical absorption edge is greatly changed (the transmittivity in the absorption edge is greatly changed). This further greatly changes the transmittivity in response to the temperature change caused by the irradiation of the reproduction light beam, with the result that the super resolution property is improved. This makes it possible to provide an optical information recording medium in which information is stored in density higher than the resolution limit of the reproduction optical system, but from which the information can be precisely and securely reproduced. Further, the above structure allows the crystalline structure of the super resolution reproducing film to be more stable, so that the durability of the super resolution reproducing film is improved. This allows realization of an optical information recording medium that is excellent in terms of the reproduction stability, the durability, and the reliability.

Further, a reproducing method and an optical information processing apparatus are not greatly different from, i.e., are substantially the same as the conventional reproducing method and the conventional optical information processing apparatus, respectively; however, the reproducing method and the optical information processing apparatus make it possible to precisely and securely reproduce the information stored in density higher than the resolution limit of the reproduction system. Moreover, the use of the reproducing method and the optical information processing apparatus allows realization of information processing on the optical information recording medium that is excellent in terms of the reproduction stability, the durability, and the reliability.

Further, it is preferable to arrange the optical information recording medium of the present invention such that the optical property that the super resolution reproducing film has at a room temperature after the irradiation of the light beam is identical to the optical property that the super resolution reproducing film had at the room temperature before the irradiation of the light beam.

Note that the wording "identical" encompasses "completely identical" and "substantially identical (substantially the same)". Further, the wording "substantially identical" indicates that the optical properties are substantially identical to each other in the limit of detecting the optical property.

According to the above structure, when the irradiation of the light beam is finished, the temperature falls down to the room temperature, with the result that the optical property is brought back to the optical property that the super resolution reproducing film had at the room temperature before the irradiation of the light beam. Accordingly, the optical property of the portion whose temperature fell down to the room temperature can be maintained more uniformly. This allows realization of an optical information recording medium that is excellent in terms of the reproduction stability, the durability, and the reliability.

Note that the optical information recording medium of the present invention may be either (i) a read-only optical information recording medium which only allows reproduction of recorded information, or (ii) a recording/reproducing information recording medium which allows recording and reproduction of information. Further, the optical information recording medium of the present invention may be a recording/reproduction cancelable information recording medium which allows re-writing of stored information.

Further, the optical information recording medium of the present invention may have not only the structure made based on the optical property of only the super resolution reproducing film, but also a structure made based on the optical property of the entire the optical information recording medium including the super resolution reproducing film. In other words, the optical information recording medium of the present invention may be arranged such that: the change of the optical property of the super resolution reproducing film causes a change of an optical property of the optical information recording medium, and the optical property that the optical information recording medium has at a room temperature after the irradiation of the light beam is identical to the optical property that the optical information recording medium had at the room temperature before the irradiation of the light beam.

Further, it is preferable to arrange the optical information recording medium of the present invention such that the optical property of the super resolution reproducing film is transmittivity, and such that the optical property of the optical information recording medium is transmittivity.

Further, it is preferable to arrange the optical information recording medium of the present invention such that the optical property of the super resolution reproducing film is reflectance, and such that the optical property of the optical information recording medium is reflectance.

When the optical property of either the super resolution reproducing film or the optical information recording medium is either the transmittivity or the reflectance as such, the optical property is checked with ease, and the designing of the optical information recording medium is carried out with ease.

Further, the super resolution reproducing film has a small reflectance, so that it is easier to evaluate, as an index for the optical property, the reflectance rather than the transmittivity. Therefore, in cases where the optical property is the optical property of the super resolution reproducing film, it is more preferable that the optical property thereof is the transmittivity. On the other hand, the entire information recording medium has a small transmittivity, so that it is easier to evaluate, as the index for the optical property, the transmittivity rather than the reflectance. Therefore, in cases where the optical property is the optical property of the optical information recording medium, it is more preferable that the optical property thereof is the reflectance.

Therefore, in this case, it is preferable to arrange the optical information recording medium of the present invention such that: the change of the transmittivity of the super resolution reproducing film causes a change of the reflectance of the optical information recording medium, and the reflectance that the optical information recording medium has at a room temperature after the irradiation of the light beam is identical to the reflectance that the optical information recording medium had at the room temperature before the irradiation of the light beam.

Further, it is preferable to arrange the optical information recording medium of the present invention such that: the optical property of the super resolution reproducing film is transmittivity, and the change of the transmittivity in response to the temperature change is adjusted by using a light interference effect between (i) light reflected by one end surface of the super resolution reproducing film, and (ii) light reflected by the other end surface of the super resolution reproducing film.

According to the above structure, the light interference occurs between (i) the light reflected by one surface of the super resolution reproducing film, and (ii) the light reflected by the other surface thereof. By designing the super resolution reproducing film in this way, the super resolution reproducing film has a certain transmittivity, with the result that the entire optical information recording medium has a certain reflectance. Further, such a light interference effect is used for the adjustment of the change of the optical property, i.e., the change of the transmittivity, which change is made in response to the temperature change. This makes it possible that the reflectance change (degree of the change) becomes greater in response to the temperature increase of the optical information recording medium. Therefore, the above structure makes it possible to obtain a strong reproduction signal intensity more securely.

Further, it is preferable to arrange the optical information recording medium of the present invention such that: the transmittivity is not less than 50% but not more than 100% in a reproduction wavelength.

According to the above structure, the transmittivity of only the super resolution reproducing film is 50% or greater in the reproduction wavelength. The transmittivity of the super resolution reproducing film of such a structure is higher than that of a conventional reproducing film used for the super resolution reproduction. This is advantageous in forming a plurality of layers in the medium, with the result that a higher density optical information recording medium is realized. Further, this allows the light interference to be effectively used, thereby effectively attaining the super resolution reproducing effect.

It is preferable to arrange the optical information recording medium of the present invention such that: the super resolution reproducing film has band gap energy to be changed in response to the temperature change from (i) a temperature before the irradiation of the light beam, to (ii) a temperature after the irradiation of the light beam, so that the optical property of the super resolution reproducing film is changed.

According to the above structure, the change of the optical property of the super resolution reproducing film during the information reproduction is caused in response to the band gap energy change caused by the temperature change, i.e., is caused in response to the change of the electronic state. Therefore, the crystalline structure of the material of which the super resolution reproducing film is made is never changed during the super resolution reproduction. Accordingly, less atoms travel in the super resolution reproducing thin film, with the result that the composition and the shape of the material are maintained to be identical to those in the initial state, respectively. On this account, the super resolution reproducing film is substantially never deteriorated even though the reproduction is carried out repeatedly. This allows realization of an optical information recording medium that is excellent in terms of the reproduction stability, the durability, and the reliability.

Further, it is preferable to arrange the optical information recording medium of the present invention such that: the change of the optical property of the super resolution reproducing film causes a change of transmittivity of the optical information recording medium, and the transmittivity that the optical information recording medium has at a room temperature after the irradiation of the light beam is identical to the transmittivity that the optical information recording medium had at the room temperature before the irradiation of the light beam.

Further, it is preferable to arrange the optical information recording medium of the present invention such that: the change of the optical property of the super resolution reproducing film causes a change of reflectance of the optical information recording medium, and the reflectance that the optical information recording medium has at a room temperature after the irradiation of the light beam is identical to the reflectance that the optical information recording medium had at the room temperature before the irradiation of the light beam.

Further, it is preferable that the optical information recording medium further include: a reflecting film, which is so provided as to make contact with a surface of the super resolution reproducing film, which surface is opposite to a surface via which the light beam enters.

Further, it is preferable to arrange the optical information recording medium of the present invention such that: the crystalline structure that the optical information recording medium has at a room temperature after the irradiation of the light beam is identical to the crystalline structure that the optical information recording medium had at the room temperature before the irradiation of the light beam.

According to the above structure, the crystalline structure of the super resolution reproducing film is reversibly changed in response to the change of the temperature. In other words, the crystalline structure before the information reproduction is identical to the crystalline structure after the information reproduction. This allows realization of an optical information recording medium that is excellent in terms of the reproduction stability, the durability, and the reliability.

Further, in cases where the super resolution reproducing film having such a property is subjected to Cu-Kα1 radiation in accordance with the 2θ/θ scan X ray diffraction method at the room temperature after the irradiation of the light beam, the diffraction peak appears in a diffraction angle 2θ position of the X ray diffraction spectrum. The diffraction angle 2θ position coincides with the diffraction angle 2θ position in which the diffraction peak appeared at the room temperature before the irradiation of the light beam. The expression "the diffraction angle 2θ position coincides with the diffraction angle 2θ position" represents that the diffraction angle 2θ positions substantially coincide with each other. In other words, the diffraction peaks appear in substantially the same diffraction angle 2θ position, in terms of the detection limit in the X ray diffraction spectrum measurement for the super resolution reproducing film.

It is preferable to arrange the optical information recording medium of the present invention such that: the metal oxide has a melting point higher than a maximum temperature that the optical information recording medium is caused to have due to the temperature increase.

According to the above structure, the metal oxide is never melted by the irradiation of the light beam, with the result that the composition and the shape of the super resolution reproducing film is maintained to be identical to those in the initial state, i.e., those before the irradiation of the light beam, respectively. Accordingly, the super resolution reproducing film is never deteriorated even though the reproduction is carried out repeatedly. This allows realization of an optical information recording medium that is excellent in terms of the reproduction stability, the durability, and the reliability.

As described above, the mask layer described in Patent document 1 suffers from such a problem that the mask effect is deteriorated due to the repeated recording and/or repeated reproduction. In contrast, the mask effect is not deteriorated in the above structure by the repeated recording and/or repeated reproduction, because the above structure uses the super resolution reproducing film that has the optical property changing in a portion in which the temperature is increased by the irradiation of the light beam, and that is made of the metal oxide which is never melted in response to the temperature increase caused by the irradiation of the light beam. As such, the above structure makes it possible to provide an optical information recording medium that is excellent in terms of the durability.

Further, it is preferable to arrange the optical information recording medium of the present invention such that: the crystalline structure that the super resolution reproducing film has at a maximum temperature reached due to the temperature increase caused by the irradiation of the laser beam is identical to the crystalline structure that the super resolution reproducing film had at a room temperature before the irradiation of the laser beam.

According to the above structure, the optical property of the super resolution film is changed while the crystalline structure thereof is unchanged. With this, the crystalline structure of the super resolution reproducing film is never changed during the super resolution reproduction. Accordingly, less atoms travel in the super resolution reproducing thin film, with the result that the composition and the shape of the super resolution reproduction film are maintained to be identical to those in the initial state, respectively. Therefore, the super resolution reproducing film is substantially free from deterioration. This allows realization of an optical information recording medium that is excellent in terms of the reproduction stability, the durability, and the reliability.

It is preferable to arrange the optical information recording medium of the present invention such that: the crystalline structure of the super resolution reproducing film has crystallinity and/or a preferential orientation in a direction perpendicular to a surface of the super resolution reproducing film.

The super resolution reproducing film of the above structure, i.e., the super resolution reproducing film whose the crystalline structure has the crystallinity and the preferential alignment property in the direction of the normal line thereof can be manufactured in accordance with a normal deposition film forming method such as the sputtering method, depending on a material for the super resolution reproducing film. In other words, the super resolution reproducing film can be manufactured with ease in accordance with such a conventional and general method. Thus, a medium allowing for better super resolution reproduction can be manufactured in accordance with a general film forming method as long as an appropriate material is selected. Further, the crystals are preferentially aligned in the direction in which the reproduction light enters, so that the property intrinsic to the material can be exhibited relatively in a good manner. This is advantageous.

Further, it is preferable to arrange the optical information recording medium of the present invention such that: the metal oxide is a single phase metal oxide only including a single metal element.

The above structure is simple as such but allows realization of the super resolution reproduction, with the result that the manufacturing cost can be reduced. Further, such a super resolution reproducing film made of the single metal element, especially, a super resolution reproducing film made of a stoichiometric oxide is very stable and has a high melting point, so that the super resolution reproducing film has a composition and a shape which are respectively maintained to be identical to those in the initial state. Therefore, the super resolution reproducing film is never deteriorated due to the repeated reproduction. This allows realization of an optical information recording medium that is excellent in terms of the reproduction stability, the durability, and the reliability.

Further, it is preferable to arrange the optical information recording medium of the present invention such that: the super resolution reproducing film is made of zinc oxide, or contains zinc oxide. Further, it is preferable to arrange the optical information recording medium of the present invention such that: the super resolution reproducing film is made of cerium oxide, or contains cerium oxide.

According to the above structures, zinc oxide and cerium oxide are material allowing for a better super resolution reproducing effect.

Further, zinc oxide and cerium oxide are general materials used in fields such as a photocatalyst field, so that zinc oxide and cerium oxide are easily available. Moreover, each of zinc oxide and cerium oxide imposes a small environmental burden when being discarded. Further, a film made of or containing each of zinc oxide and cerium oxide can be formed with ease in accordance with a general method such as the sputtering method, and has the crystallinity and the alignment property in the direction of the normal line of the film even when the substrate is not heated to have a temperature higher than the room temperature. This allows reduction of the manufacturing processes and cost.

Further, in the above structure, zinc oxide and cerium oxide each for use in the super resolution reproducing film are substantially transparent in the initial state. This makes it possible to effectively use the light interference, with the result that the super resolution reproducing effect is effectively obtained.

Further, the super resolution reproducing film is made of the metal oxide as such, so that the durability is secured as is the case with the foregoing cases. Further, the super resolution reproducing film has an optical absorption edge close to the wavelength of the wavelength of the light beam, so that the change in the transmittivity spectrum is steep (great) in the wavelength of the light beam. Therefore, the change of the optical property becomes great in response to the optical absorption shift caused by the temperature increase. This facilitates the super resolution reproducing effect described above. In other words, a better super resolution effect can be obtained with the use of a simple manufacturing method.

Further, it is preferable to arrange the optical information recording medium of the present invention such that: the super resolution reproducing film is made of cerium oxide, or contains cerium oxide.

According to the above structures, titanium oxide is a material allowing for the super resolution reproducing effect. Further, titanium oxide is a general material used in the fields such as the photocatalyst field, so that titanium oxide is easily available. Moreover, titanium oxide imposes a small environmental burden when being discarded. This allows reduction of the manufacturing cost. In other words, a better super resolution effect can be obtained with the use of a simple manufacturing method.

It is preferable to arrange the optical information recording medium of the present invention such that: the super resolution reproducing film has a thickness falling within a range from 100 nm to 300 nm.

The above structure makes it possible to further utilize the multiple interferences, with the result that the change of the optical property becomes great in response to the temperature increase. Further, the rise and recess on the super resolution reproducing film are as definite as the rise and recess on the substrate. This is advantageous in terms of a process and cost.

Further, it is preferable that the optical information recording medium of the present invention further include: a light absorbing film, which is provided adjacent to the super resolution reproducing film, or is provided on the super resolution reproducing film with another thin film therebetween, and which absorbs a part of the light beam and generates heat.

The above structure makes it possible to effectively increase the temperature of the medium by way of the light beam irradiation during the information reproduction. Accordingly, the super resolution reproducing film can be realized with lower reproduction light power. In other words, the reproduction sensitivity is improved. This prevents an irrelevant part of the medium from being heated, with the result that the medium is less deteriorated. This allows realization of an optical information recording medium that is excellent in terms of the reproduction stability, the durability, and the reliability.

Further, it is preferable to arrange the optical information recording medium of the present invention such that: the light absorbing film is made of a phase change recording material, or contains the phase change recording material. Further, it is preferable to arrange the optical information recording medium of the present invention such that: the light absorbing film is made of a semiconductor, or contains the semiconductor. Further, it is preferable to arrange the optical information recording medium of the present invention such that: the light absorbing film is made of either one of silicon and germanium, or contains either one of silicon and germanium.

According to the above structures, the light absorbing film has a heat conductivity lower than that of a metal for use in a general reflecting film, so that the heat generated by light absorption is less likely to be conducted and discharged. This assists the temperature increase of the medium and the super resolution reproducing film, with the result that the reproduction sensitivity is improved. Further, the light absorbing film has a reflectance to some extent, so that the signal can be read sufficiently. Further, silicon and germanium are semiconductors each generally used in the semiconductor industry, so that silicon and germanium are easily available. Moreover, each of silicon and germanium imposes a small environmental burden when being discarded.

It is preferable to arrange the optical information recording medium such that: the irradiation of the light beam causes temperature distribution in a spot of the light beam on the super resolution reproducing film so as to emerge, in the spot, (i) a first portion that is in a change state in which the optical property is changed, and (ii) a second portion that is in an initial state in which the optical property is maintained to be identical to the optical property obtained before the irradiation of the light beam.

According to the above structure, the reproduction signal can be obtained in accordance with either (i) light reflected by the first portion in the change state in which the optical property is changed, or (ii) light reflected by the second portion in which the optical property is maintained to be identical to the optical property obtained before the irradiation of the light beam. This makes it possible to selectively carry out reproduction with respect to a region whose size is smaller than the spot size (resolution limit) of the light beam of the reproduction optical system. Thus, such a simple structure makes it possible to improve the recording density.

As described above, a method of the present invention for reproducing the optical information recording medium includes the step of: reproducing information in accordance with a fine recording mark having a size equal to or smaller than a resolution limit of a reproduction light beam.

More specifically, the method of the present invention includes the step of: irradiating the light beam to the optical information recording medium so as to change a temperature in a spot of the light beam on the super resolution reproducing film, so that a first portion and a second portion are emerged in the spot, the first portion being in a change state in which the optical property is changed, the second portion being in an initial state in which the optical property is maintained to be identical to the optical property obtained before the irradiation of the light beam.

The above structure makes it possible to reproduce the information in accordance with the fine recording mark which never allows reproduction of the information when using a normal method. Thus, such a simple method allows improvement of the recording density.

Further, as described above, an optical information processing apparatus of the present invention for at least reproducing the optical information recording medium, the optical information processing apparatus reproducing information in accordance with a fine recording mark having a size equal to or smaller than a resolution limit of a reproduction light beam.

More specifically, the optical information processing apparatus of the present invention includes: light irradiating means for irradiating the light beam to the optical information recording medium so as to change a temperature in a spot of the light beam on the super resolution reproducing film, so that a first portion and a second portion are emerged in the spot, the first portion being in a change state in which the optical property is changed, the second portion being in an initial state in which the optical property is maintained to be identical to the optical property obtained before the irradiation of the light beam.

According to the above structure, the light irradiating means irradiates the light beam to the optical information recording medium so as to emerge, within the spot of the light beam, (i) the first portion that is in the change state in which the optical property is changed in response to the temperature change of the super resolution reproducing film, and (ii) the second portion that is in the initial state in which the optical property is maintained to be identical to the optical property that the super resolution reproducing film had before the irradiation of the light beam. This makes it possible to reproduce the information in accordance with the fine recording mark which never allows reproduction of the information when using a normal method. Further, the optical information processing apparatus of the present invention can carry out reproduction or recording with respect to the high density optical information recording medium as such, but has substantially the same structure as that of the conventional apparatus. Therefore, no cost increase is required in manufacturing the optical information processing apparatus of the present invention.

Thus, the reproducing method and the optical information processing apparatus are not greatly different from, i.e., are substantially the same as the conventional reproducing method and the conventional optical information processing apparatus, respectively; however, the reproducing method and the optical information processing apparatus makes it possible to precisely and securely reproduce the information stored in density higher than the resolution limit of the reproduction optical system. Moreover, the use of the reproducing method and the optical information processing apparatus allows realization of information processing on the optical information recording medium that is excellent in terms of the reproduction stability, the durability, and the reliability.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical information recording medium, comprising:
   a substrate, having pits and/or grooves, each of which corresponds to recorded information that is optically reproduced by irradiation of a light beam; and
   at least one super resolution reproducing film, which is made of a metal oxide having a crystalline structure, and which has an optical property to be changed in response to a temperature increase caused by the irradiation of the light beam at least during the reproduction of the information,
   the optical property of the super resolution reproducing film being reversibly changed depending on a temperature change in the super resolution reproducing film.

2. An optical information recording medium, comprising:
   a substrate;
   a recording layer for optically storing information, which is optically reproduced by irradiation of a light beam; and
   at least one super resolution reproducing film, which is made of a metal oxide having a crystalline structure, and which has an optical property to be changed in response to a temperature increase caused by the irradiation of the light beam during the reproduction of the information,
   the optical property of the super resolution reproducing film being reversibly changed depending on a temperature change in the super resolution reproducing film.

3. An optical information recording medium, comprising:
   a substrate, having pits and/or grooves, each of which corresponds to recorded information that is optically reproduced by irradiation of a light beam; and
   at least one super resolution reproducing film, which is made of a metal oxide having a crystalline structure, and which has an optical property to be changed in response to a temperature increase caused by the irradiation of the light beam at least during the reproduction of the information,
   the metal oxide having one or more diffraction peaks in an X ray diffraction spectrum that is obtained as a result of an X ray diffraction using Cu-Kα1 radiation, and that is an X ray diffraction intensity plot with 2θ scan,
   the optical property of the super resolution reproducing film being reversibly changed depending on a temperature change in the super resolution reproducing film.

4. An optical information recording medium, comprising:
   a substrate;
   a recording layer for optically storing information, which is optically reproduced by irradiation of a light beam; and
   at least one super resolution reproducing film, which is made of a metal oxide having a crystalline structure, and which has an optical property to be changed at least in response to a temperature increase caused by the irradiation of the laser,
   the metal oxide having one or more diffraction peaks in an X ray diffraction spectrum that is obtained as a result of an X ray diffraction using Cu-Kα1 radiation, and that is an X ray diffraction intensity plot with 2θ scan, the optical property of the super resolution reproducing film being reversibly changed depending on a temperature change in the super resolution reproducing film.

5. The optical information recording medium as set forth in claim 3 or 4, wherein:
   the diffraction peaks of the metal oxide in the X ray diffraction spectrum have a strongest diffraction peak whose half width is 0.8° or less.

6. The optical information recording medium as set forth in any one of claims 1 through 4, wherein:
   the optical property that the super resolution reproducing film has at a room temperature after the irradiation of the light beam is identical to the optical property that the super resolution reproducing film had at the room temperature before the irradiation of the light beam.

7. The optical information recording medium as set forth in any one of claims 1 through 4, wherein:
   the optical property of the super resolution reproducing film is transmittivity, and the change of the transmittivity in response to the temperature change is adjusted by using a light interference effect between (i) light reflected by one end surface of the super resolution reproducing film, and (ii) light reflected by the other end surface of the super resolution reproducing film.

8. The optical information recording medium as set forth in claim 7, wherein:
   the transmittivity is not less than 50% but not more than 100% in a reproduction wavelength.

9. The optical information recording medium as set forth in any one of claim 1 through 4, wherein:
   the super resolution reproducing film has band gap energy to be changed in response to the temperature change from (i) a temperature before the irradiation of the light beam, to (ii) a temperature after the irradiation of the light beam, so that the optical property of the super resolution reproducing film is changed.

10. The optical information recording medium as set forth in any one of claims 1 through 4, wherein:
    the change of the optical property of the super resolution reproducing film causes a change of transmittivity of the optical information recording medium, and
    the transmittivity that the optical information recording medium has at a room temperature after the irradiation of the light beam is identical to the transmittivity that the optical information recording medium had at the room temperature before the irradiation of the light beam.

11. The optical information recording medium as set forth in any one of claims 1 through 4, wherein:
    the change of the optical property of the super resolution reproducing film causes a change of reflectance of the optical information recording medium, and
    the reflectance that the optical information recording medium has at a room temperature after the irradiation of the light beam is identical to the reflectance that the optical information recording medium had at the room temperature before the irradiation of the light beam.

12. The optical information recording medium as set forth in any one of claims 1 through 4, further comprising:
    a reflecting film, which is so provided as to make contact with a surface of the super resolution reproducing film, which surface is opposite to a surface via which the light beam enters.

13. The optical information recording medium as set forth in any one of claims 1 through 4, wherein:
    the crystalline structure that the optical information recording medium has at a room temperature after the irradiation of the light beam is identical to the crystalline structure that the optical information recording medium had at the room temperature before the irradiation of the light beam.

14. The optical information recording medium as set forth in any one of claims 1 through 4, wherein:
    the metal oxide has a melting point higher than a maximum temperature that the optical information recording medium is caused to have due to the temperature increase.

15. The optical information recording medium as set forth in any one of claim 1 through 4, wherein:
the crystalline structure that the super resolution reproducing film has at a maximum temperature reached due to the temperature increase caused by the irradiation of the light beam is identical to the crystalline structure that the super resolution reproducing film had at a room temperature before the irradiation of the light beam.

16. The optical information recording medium as set forth in any one of claims 1 through 4, wherein:
the crystalline structure of the super resolution reproducing film has crystallinity and/or a preferential orientation in a direction perpendicular to a surface of the super resolution reproducing film.

17. The optical information recording medium as set forth in any one of claims 1 through 4, wherein:
the metal oxide is a single phase metal oxide only including a single metal element.

18. The optical information recording medium as set forth in any one of claims 1 through 4, wherein:
the super resolution reproducing film is made of zinc oxide, or contains zinc oxide.

19. The optical information recording medium as set forth in any one of claims 1 through 4, wherein:
the super resolution reproducing film is made of cerium oxide, or contains cerium oxide.

20. The optical information recording medium as set forth in any one of claims 1 through 4, wherein:
the super resolution reproducing film is made of titanium oxide, or contains titanium oxide.

21. The optical information recording medium as set forth in any one of claims 1 through 4, wherein:
the super resolution reproducing film has a thickness falling within a range from 100 nm to 300 nm.

22. The optical information recording medium as set forth in any one of claims 1 through 4, further comprising:
a light absorbing film, which is provided adjacent to the super resolution reproducing film, or is provided on the super resolution reproducing film with another thin film therebetween, and which absorbs a part of the light beam and generates heat.

23. The optical information recording medium as set forth in claim 22, wherein:
the light absorbing film is made of a phase change recording material, or contains the phase change recording material.

24. The optical information recording medium as set forth in claim 22, wherein:
the light absorbing film is made of a semiconductor, or contains the semiconductor.

25. The optical information recording medium as set forth in claim 24, wherein:
the light absorbing film is made of either one of silicon and germanium, or contains either one of silicon and germanium.

26. The optical information recording medium as set forth in any one of claims 1 through 4, wherein:
the irradiation of the light beam causes temperature distribution in a spot of the light beam on the super resolution reproducing film so as to emerge, in the spot, (i) a first portion that is in a change state in which the optical property is changed, and (ii) a second portion that is in an initial state in which the optical property is maintained to be identical to the optical property obtained before the irradiation of the light beam.

27. A method for reproducing the optical information recording medium as set forth in any one of claims 1 through 4, comprising the step of:
reproducing information in accordance with a fine recording mark having a size equal to or smaller than a resolution limit of a reproduction light beam.

28. The method as set forth in claim 27, further comprising the step of:
irradiating the light beam to the optical information recording medium so as to change a temperature in a spot of the light beam on the super resolution reproducing film, so that a first portion and a second portion are emerged in the spot, the first portion being in a change state in which the optical property is changed, the second portion being in an initial state in which the optical property is maintained to be identical to the optical property obtained before the irradiation of the light beam.

29. An optical information processing apparatus for at least reproducing the optical information recording medium as set forth in any one of claims 1 through 4,
said optical information processing apparatus reproducing information in accordance with a fine recording mark having a size equal to or smaller than a resolution limit of a reproduction light beam.

30. The optical information processing apparatus as set forth in claim 29, comprising:
light irradiating means for irradiating the light beam to the optical information recording medium so as to change a temperature in a spot of the light beam on the super resolution reproducing film, so that a first portion and a second portion are emerged in the spot, the first portion being in a change state in which the optical property is changed, the second portion being in an initial state in which the optical property is maintained to be identical to the optical property obtained before the irradiation of the light beam.

* * * * *